United States Patent
Weegels et al.

(10) Patent No.: US 10,676,671 B2
(45) Date of Patent: Jun. 9, 2020

(54) METHOD OF REDUCING ODF MURA IN POLYMER STABILISED LIQUID CRYSTAL DISPLAYS

(71) Applicant: Merck Patent GmbH, Darmstadt (DE)

(72) Inventors: Leo Weegels, Darmstadt (DE); Roger Chang, Taipei (TW); Ky Lin, Taipei (TW)

(73) Assignee: Merck Patent GmbH, Darmstadt (DE)

( * ) Notice: Subject to any disclaimer, the term of this patent is extended or adjusted under 35 U.S.C. 154(b) by 61 days.

(21) Appl. No.: 15/744,114

(22) PCT Filed: Jun. 23, 2016

(86) PCT No.: PCT/EP2016/001071
§ 371 (c)(1),
(2) Date: Jan. 12, 2018

(87) PCT Pub. No.: WO2017/008884
PCT Pub. Date: Jan. 19, 2017

(65) Prior Publication Data
US 2018/0201837 A1  Jul. 19, 2018

(30) Foreign Application Priority Data
Jul. 14, 2015 (EP) ..................................... 15002093

(51) Int. Cl.
*C09K 19/54* (2006.01)
*C09K 19/32* (2006.01)
(Continued)

(52) U.S. Cl.
CPC .......... *C09K 19/542* (2013.01); *C09K 19/062* (2013.01); *C09K 19/3003* (2013.01); *C09K 19/32* (2013.01); *C09K 19/322* (2013.01); *G02F 1/1337* (2013.01); *G02F 1/1339* (2013.01); *G02F 1/1341* (2013.01); *C09K 2019/0448* (2013.01); *C09K 2019/0481* (2013.01); *C09K 2019/122* (2013.01); *C09K 2019/123* (2013.01); *C09K 2019/301* (2013.01); *C09K 2019/3004* (2013.01); *C09K 2019/3009* (2013.01);
(Continued)

(58) Field of Classification Search
CPC ........................................................ C09K 19/12
See application file for complete search history.

(56) References Cited

U.S. PATENT DOCUMENTS 9,556,382 B2    1/2017  Goetz
2009/0213317 A1  8/2009  Jian
(Continued)

FOREIGN PATENT DOCUMENTS

DE    102011105930 A1   1/2012
EP        3020785 A1    5/2016
(Continued)

OTHER PUBLICATIONS

International Search Report PCT/EP2016/001071 dated Oct. 5, 2016.

*Primary Examiner* — Chanceity N Robinson
(74) *Attorney, Agent, or Firm* — Millen White Zelano and Branigan, PC; Csaba Henter

(57) ABSTRACT

The present invention relates to a method of reducing ODF mura in liquid crystal (LC) displays of the polymer sustained alignment (PSA) type and to PSA LC displays made by this method.

25 Claims, 1 Drawing Sheet

(a)

(b)

(51) Int. Cl.
*C09K 19/06* (2006.01)
*C09K 19/30* (2006.01)
*G02F 1/1337* (2006.01)
*G02F 1/1339* (2006.01)
*G02F 1/1341* (2006.01)
C09K 19/12 (2006.01)
C09K 19/04 (2006.01)
C09K 19/34 (2006.01)
G02F 1/1333 (2006.01)

(52) U.S. Cl.
CPC .......... *C09K 2019/3016* (2013.01); *C09K 2019/3425* (2013.01); *C09K 2019/548* (2013.01); *G02F 2001/13415* (2013.01); *G02F 2001/133302* (2013.01)

(56) References Cited

U.S. PATENT DOCUMENTS

2013/0021568 A1 1/2013 Hsieh
2015/0036095 A1 2/2015 Jeong

FOREIGN PATENT DOCUMENTS

| EP | 3029127 A1 | 6/2016 | |
| WO | 2013124040 A1 | 8/2013 | |
| WO | WO-2013124040 A1 * | 8/2013 | ............. C09K 19/44 |

* cited by examiner

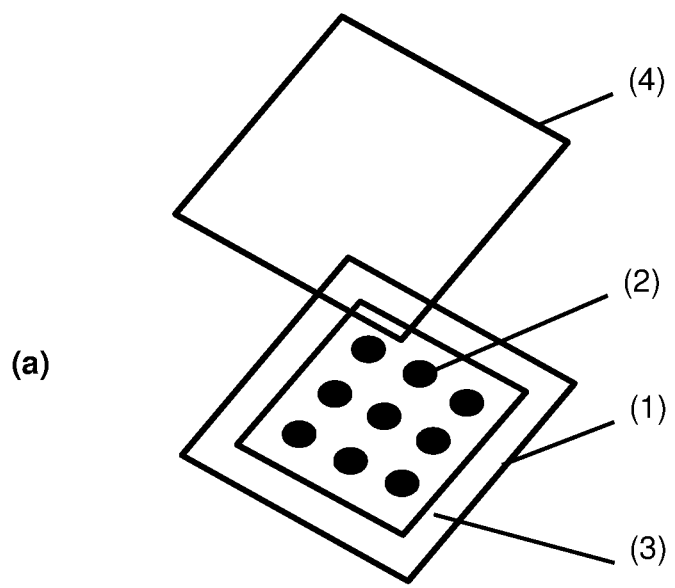
(a)
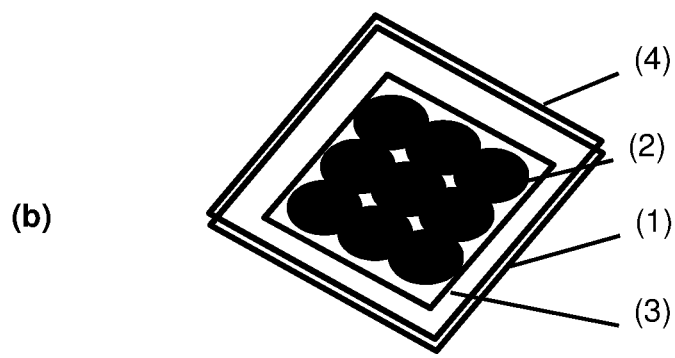
(b)

METHOD OF REDUCING ODF MURA IN POLYMER STABILISED LIQUID CRYSTAL DISPLAYS

The present invention relates to a method of reducing ODF mura in liquid crystal (LC) displays of the polymer sustained alignment (PSA) type and to PSA LC displays made by this method.

BACKGROUND OF THE INVENTION

A liquid crystal display mode which has meanwhile found widespread interest and commercial use is the so-called PS ("polymer sustained") or PSA ("polymer sustained alignment") mode, for which the term "polymer stabilised" is also occasionally used. In PSA displays an LC medium is used that contains an LC mixture (hereinafter also referred to as "host mixture") and a small amount, typically <1% by weight, for example 0.2 to 0.4% by weight, of one or more polymerisable compounds, preferably polymerisable monomeric compounds. After filling the LC medium into the display, the polymerisable compounds are polymerised or crosslinked in situ, usually by UV photopolymerisation, optionally while a voltage is applied to the electrodes of the display. The polymerisation is carried out at a temperature where the LC medium exhibits a liquid crystal phase, usually at room temperature. The addition of polymerisable mesogenic or liquid-crystalline compounds, also known as reactive mesogens or "RMs", to the LC host mixture has proven particularly suitable.

The PS(A) mode is meanwhile used in various conventional LC display types. Thus, for example, PS-VA ("vertically aligned"), PS-OCB ("optically compensated bend"), PS-IPS ("in-plane switching"), PS-FFS ("fringe-field switching"), PS-UB-FFS ("Ultra Brightness FFS) and PS-TN ("twisted nematic") displays are known. The polymerisation of the RMs preferably takes place with an applied voltage in the case of PS-VA and PS-OCB displays, and with or without, preferably without, an applied voltage in the case of PS-IPS displays. As a result a pretilt angle of the LC molecules is generated in the display cell. In case of PS-OCB displays, for example, it is possible for the bend structure to be stabilised so that an offset voltage is unnecessary or can be reduced. In case of PS-VA displays, the pretilt has a positive effect on the response times. For PS-VA displays, a standard MVA ("multidomain VA") or PVA ("patterned VA") pixel and electrode layout can be used. It is also possible to use only one structured electrode without protrusions, which significantly simplifies production and improves contrast and transparency.

Furthermore, the so-called posi-VA mode ("positive VA") has proven to be particularly suitable. Like in conventional VA and PS-VA displays, the initial orientation of the LC molecules in posi-VA displays is homeotropic, i.e. substantially perpendicular to the substrates, in the initial state when no voltage is applied. However, in contrast to conventional VA and PS-VA displays, in posi-VA displays LC media with positive dielectric anisotropy are used. Like in IPS and PS-IPS displays, the two electrodes in posi-VA displays are arranged only on one of the two substrates, and preferably exhibit intermeshed, comb-shaped (interdigital) structures. Upon application of a voltage to the interdigital electrodes, which create an electrical field that is substantially parallel to the layer of the LC medium, the LC molecules are switched to an orientation substantially parallel to the substrates. In posi-VA displays, a polymer stabilisation by addition of RMs to the LC medium, which are then polymerised in the display, has also proven to be advantageous. Thereby a significant reduction of the switching times can be achieved.

PS-VA displays are described for example in EP1170626 A2, U.S. Pat. Nos. 6,861,107, 7,169,449, US2004/0191428A1, US2006/0066793A1 and US2006/0103804A1. PS-OCB displays are described for example in T.-J-Chen et al., Jpn. J. Appl. Phys. 45, 2006, 2702-2704 and S. H. Kim, L.-C-Chien, Jpn. J. Appl. Phys. 43, 2004, 7643-7647. PS-IPS displays are described for example in U.S. Pat. No. 6,177,972 and Appl. Phys. Lett. 1999, 75(21), 3264. PS-TN displays are described for example in Optics Express 2004, 12(7), 1221.

PSA displays can be operated as either active-matrix (AM) or passive-matrix (PM) displays. In case of AM displays individual pixels are usually addressed by integrated, non-linear active elements like for example transistors (such as thin-film transistors or "TFTs"), whereas in PM displays individual pixels are usually addressed by the multiplex method as known from prior art.

A PSA display may also comprise an alignment layer on one or both of the substrates forming the display cell. The alignment layer is usually applied on the electrodes (in case such electrodes are present) such that it is in contact with the LC medium and induces initial alignment of the LC molecules. The alignment layer may comprise or consist of, for example, a polyimide, which may also be rubbed or prepared by a photoalignment method.

In particular for monitor and especially TV applications optimisation of the response times, but also of the contrast and luminance (and thus transmission) of the LC display is still desired. The PSA method can provide significant advantages here. Especially in case of PS-VA, PS-IPS, PS-FFS and PS-posi-VA displays, a shortening of the response times, which correlate with a measurable pretilt in test cells, can be achieved without significant adverse effects on other parameters.

Prior art has suggested biphenyl diacrylates or dimethacrylates, which are optionally fluorinated, as RMs for use in PSA displays However, the problem arises that not all combinations of LC host mixture and RM(s) are suitable for use in PSA displays because, for example, only inadequate tilt angles or no tilt angles at all could be generated or because, for example, the voltage holding ratio (VHR) is inadequate for TFT display applications. In addition, it has been found that the LC mixtures and RMs known from prior art still have some disadvantages when used in PSA displays. Thus, not every known RM which is soluble in the LC host mixture is suitable for use in PSA displays. In addition, it is often difficult to find a suitable selection criterion for the RM besides direct measurement of the pretilt in the PSA display. The choice of suitable RMs becomes even smaller if UV photopolymerisation without the addition of photoinitiators is desired, which is advantageous for certain applications.

In addition, the selected combination of LC host mixture/RM should have a low rotational viscosity and good electrical properties, in particular a high VHR. In PSA displays, a high VHR after irradiation with UV light is particularly important, because UV exposure does not only occur as normal exposure during operation of the finished display, but is also a necessary part of the display production process.

In particular, it is desirable to have available improved materials for PSA displays which produce a particularly small pretilt angle. Preferred materials are those which, compared to prior art materials, can generate a lower pretilt angle after the same exposure time, and/or can generate at least the same pretilt angle after a shorter exposure time. This would allow to reduce the display production time ("tact time") and production costs.

A further problem in the production of PSA displays is the presence and removal of residual amounts of unpolymerised RMs after the polymerisation step that is necessary for generation of the pretilt angle in the display. Unreacted RMs may adversely affect the properties of the display, for example by polymerising in an uncontrolled manner during display operation.

Thus, the PSA displays known from prior art often exhibit the undesired effect of so-called "image sticking" or "image burn", i.e. the image produced in the LC display by temporary addressing of individual pixels still remains visible even after the electric field in these pixels has been switched off, or after other pixels have been addressed.

Image sticking can occur for example if LC host mixtures having a low VHR are used. The UV component of daylight or the display backlight can cause undesired decomposition reactions of the LC molecules and initiate the production of ionic or free-radical impurities. These can accumulate in particular at the electrodes or the alignment layers, where they reduce the effective applied voltage. This effect can also be observed in conventional LC displays without a polymer component.

An additional image sticking effect caused by the presence of unpolymerised RMs is often observed in PSA displays. Uncontrolled polymerisation of the residual RMs is initiated by UV light from the environment or the backlight. In the switched display areas, this changes the tilt angle after a number of addressing cycles. As a result, a change in transmission in the switched areas may occur, while it remains unchanged in the unswitched areas.

During production of the PSA display it is therefore desirable that polymerisation of the RMs proceeds as completely as possible and the presence of unpolymerised RMs in the display can be excluded or reduced to a minimum. Thus, RMs and LC host mixtures are required which enable or support quick and complete polymerisation of the RMs. In addition, a controlled reaction of the residual RM amounts is desirable. This could be achieved by providing improved RMs that polymerise quicker and more effectively than the RMs of prior art.

A further problem that has been observed in the operation of PSA displays is the stability of the pretilt angle. Thus, it was observed that the pretilt angle, which is generated during display manufacture by polymerising the RMs, does not remain constant but can deteriorate after the display was subjected to voltage stress during display operation. This can negatively affect the display performance, e.g. by increasing the black state transmission and hence lowering the contrast.

Another problem to be solved is that the RMs of prior art do often have high melting points, and do only show limited solubility in many commonly used LC mixtures. As a result the RMs tend to spontaneously crystallise out of the LC mixture. In addition, the risk of spontaneous polymerisation prevents that the LC host mixture can be warmed in order to better dissolve the RMs, so that a high solubility even at room temperature is required. In addition, there is a risk of phase separation, for example when filling the LC medium into the LC display (chromatography effect), which may greatly impair the homogeneity of the display. This is further aggravated by the fact that the LC media are usually filled in the display at low temperatures in order to reduce the risk of spontaneous polymerisation (see above), which in turn has an adverse effect on the solubility.

Another problem observed in prior art is that the use of conventional LC media in LC displays, including but not limited to displays of the PSA type, often leads to the occurrence of mura in the display, especially when the LC medium is filled into the display by the one drop filling (ODF) method. This phenomenon is also known as "ODF mura" or "ODF drop mura". It is therefore desirable to provide LC media which lead to reduced ODF mura.

Presently ODF is the preferred method to apply an LC medium to an AM LCD. The ODF process is exemplarily and schematically illustrated in FIG. 1. In a first step (a) an array of droplets (2) of the LC medium is dispensed on one of the LCD glass substrates (1), where a sealant material is provided in the boundary region (3) between the LC droplets (2) and the edges of the substrate (1). In a second step (b), in a vacuum assembly station the counter glass substrate (4) is coupled and fixed to the first substrate (1), thus forcing the LC droplets (2) to spread and form a continuous layer between the two substrates (1, 4). Because of the different flow dynamics during drop dispensing and substrate coupling, various types of non-uniformity in brightness, so-called mura, can be observed as an identifier of the LC dispensing and assembly process.

In particular, if the display mode is a VA type mode, like MVA, PVA or PS-VA, the imprint of the droplets is visible after fabrication because the droplets are not spreading evenly over the entire display area. In conventional VA modes, like for example MVA or PVA, the non-uniformity generally disappears with time passing. In PSA displays, however, the non-uniformity remains, and the droplet imprint is "fixed" by the polymerisation process. The usual way to minimize ODF drop mura is by optimizing the process conditions, the panel design and/or the LC materials used, such as the LC host mixture or the RM contained therein, for example by reducing the RM concentration.

However, a breakout of ODF mura has been observed even after the tact time of the polymerisation process was reduced by increasing the intensity of the short-wave part of the irradiation spectrum. Also, a reduction of the RM concentration can negatively influence the pretilt angle generation.

There is thus still a great demand for PSA displays, and for LC media and polymerisable compounds for use in PSA displays, which do not show the drawbacks as described above, or only do so to a small extent, and have improved properties.

In particular, there is a great demand for PSA displays, and LC mixtures and RMs for use in such PSA displays, which enable a high specific resistance at the same time as a large working-temperature range, short response times, even at low temperatures, a low threshold voltage, a low pretilt angle, a multiplicity of grey shades, high contrast and a broad viewing angle, high reliability and high values of the VHR after UV exposure, and, in case of the RMs, have low melting points and a high solubility in the LC host mixture. In PSA displays for mobile applications, it is especially desired to have available LC media that show low threshold voltage and high birefringence.

Furthermore, there is a great demand for means and methods for reducing the ODF mura in PSA displays, especially in PS-VA displays.

The invention is based on the object of providing improved methods for manufacturing PSA displays and improved materials used therein, like RMs, LC host mixtures, and LC media comprising the same, which do not have the disadvantages indicated above or do so to a reduced extent.

In particular, an object of the invention is to solve the problem of reducing ODF mura in PSA displays which is caused in the display manufacturing process.

Another object of the invention is to provide LC media for use in PSA displays, which enable very high specific resistance values, high VHR values, high reliability, low threshold voltages, short response times, high birefringence, show good UV absorption especially at longer wavelengths, allow quick and complete polymerisation of the RMs contained therein, allow the generation of a low pretilt angle as quickly as possible, enable a high stability of the pretilt even after longer time and/or after UV exposure, reduce or prevent the occurrence of image sticking in the display, and reduce or prevent the occurrence of ODF mura in the display.

The above objects have been achieved in accordance with the present invention by the methods and materials as described and claimed in the present application.

It has surprisingly been found that at least some of the above-mentioned problems can be solved by using an LC medium comprising a polymerisable component and an LC host mixture as disclosed and claimed hereinafter.

In particular it has surprisingly been found that, when adding to the LC medium which contains a first RM a little amount of a second RM with faster polymerisation speed than the first RM, the ODF mura level decreases. By adding a second RM that reacts faster than the first RM at the given UV excitation spectrum the level of the ODF drop mura is reduced. The concentration of the second RM should be sufficiently low not to have an impact on the overall performance of the LC display. A suitable and preferred concentration range for the second RM in the LC medium is for example around 100 ppm, while a suitable and preferred concentration range for the first RM in the LC medium is for example in the range of 0.2 to 0.5%.

In addition, the use of an LC medium as disclosed and claimed hereinafter in PSA displays enables to achieve high VHR, high UV absorption, quick and complete polymerisation, and quick and strong tilt angle generation.

Moreover, the use of LC media according to the present invention facilitates a quick and complete UV-photopolymerisation reaction in particular at low UV energy and/or longer UV wavelengths in the range from 300-380 nm and especially above 340 nm, which are considerable advantages for the display manufacturing process. Besides, the use of LC media according to the present invention allows a fast generation of large and stable pretilt angles, reduces image sticking and ODF mura in the display, leads to a high VHR value after UV photopolymerisation, and enables to achieve fast response times, a low threshold voltage and a high birefringence.

SUMMARY OF THE INVENTION

The invention relates to a method of reducing One Drop Filling (ODF) mura in a liquid crystal display (LCD) of the polymer stabilised alignment (PSA) mode, by using in the PSA display an LC medium comprising, preferably consisting of, a polymerisable component A) comprising, preferably consisting of, from 0.005 to 0.05% of a first polymerisable compound and from 0.1 to 1.0% of a second polymerisable compound, wherein the first polymerisable compound has faster polymerisation speed than the second polymerisable compound under the same polymerisation conditions, and wherein the first polymerisable compound is preferably selected from formulae F1-F6 and the second polymerisable compound is preferably selected from formulae S1-S3, and a liquid-crystalline component B), hereinafter also referred to as "LC host mixture", comprising, preferably consisting of, one or more mesogenic or liquid-crystalline compounds,

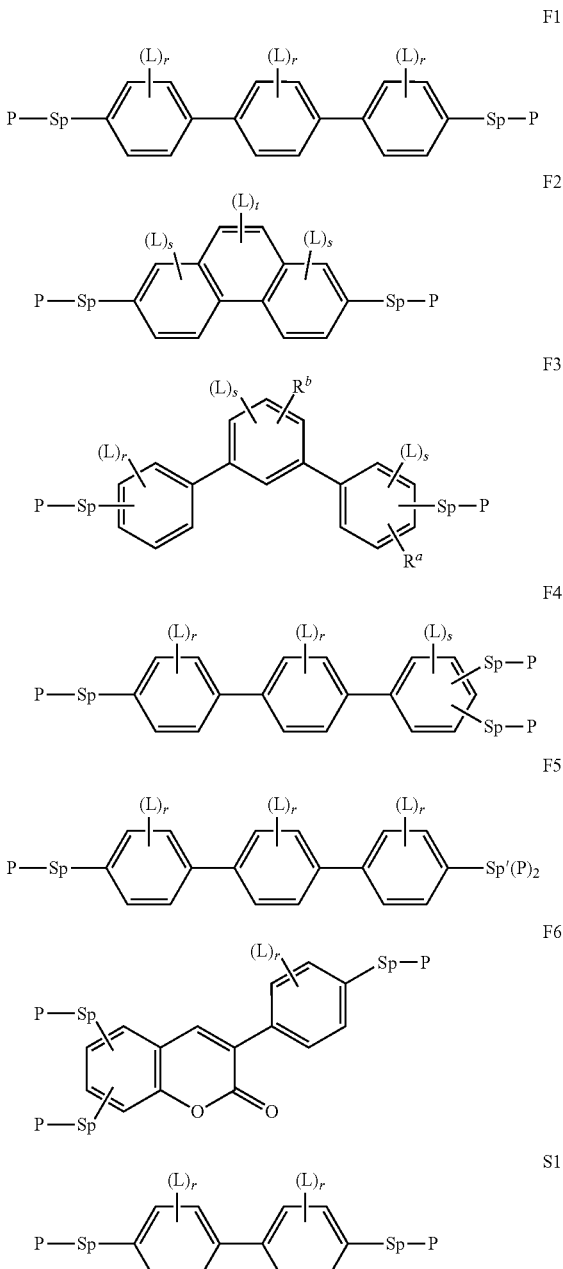

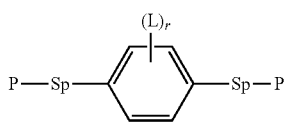

S3 in which the individual radicals, independently of each other and on each occurrence identically or differently, have the following meanings P a polymerisable group, preferably $CH_2=CW^1-CO-O-$, $W^1$ H, F, $CF_3$ or alkyl having 1 to 5 C atoms, Sp a spacer group or a single bond, Sp' a spacer group, L F, Cl, CN or straight-chain or branched, optionally mono- or poly-fluorinated alkyl, alkoxy, alkenyl, alkynyl, alkylcarbonyl, alkoxycarbonyl, alkylcarbonyloxy or alkoxycarbonyloxy having 1 to 12 C atoms, $R^a$, $R^b$ -Sp-P, -Sp'(P)$_2$, H or one of the meanings given for L, r 0, 1, 2, 3 or 4, s 0, 1, 2 or 3, t 0, 1 or 2.

The invention further relates to a method of reducing ODF mura in an LCD of the PSA mode, by using in the PSA display an LC medium comprising
  a polymerisable component A) comprising from 0.005 to 0.05% of a first polymerisable compound selected from formulae F1-F6 and from 0.1 to 1.0% of a second polymerisable selected from formulae S1-S3, and
  a liquid-crystalline component B), hereinafter also referred to as "LC host mixture", comprising, preferably consisting of, one or more mesogenic or liquid-crystalline compounds.

The invention further relates to a method of manufacturing an LCD of the PSA mode, which preferably has reduced ODF mura, comprising the following steps
a) dispensing an array of droplets of an LC medium comprising components A) and B) as described above and below on a first substrate, preferably a glass substrate,
b) providing a second substrate, which is preferably a glass substrate, on top of the surface of the first substrate that is covered by the LC medium, preferably under vacuum condition, causing the droplets of the LC medium to spread and form a continuous layer between the first substrate and the second substrate,
c) exposing the LC medium to UV radiation that causes photopolymerisation of the polymerisable compounds of component A),
  wherein the first substrate is equipped with a first electrode structure and the second substrate is equipped with a second electrode structure, or
    wherein one of the first and second substrate is equipped with a first and second electrode structure and the other of the first and second substrate is not equipped with an electrode structure,
  wherein preferably the first substrate is equipped with a first alignment layer that is in contact with the LC medium, and preferably the second substrate is equipped with a second alignment layer that is in contact with the LC medium,
  wherein preferably the first substrate and the second substrate are fixed or glued together by means of a sealant material that is provided on the first or second substrate, preferably in the region between the droplets of the LC material and the edges of the substrate,
  wherein preferably the sealant material is cured, for example by exposure to heat and/or photoradiation,
  wherein, in case the sealant material is cured by exposure to photoradiation, preferably the photoradiation is selected such that it does not cause polymerisation of the polymerisable component A) of the LC medium, and/or the LC medium is protected from the photoradiation used for curing the sealant material, for example by a photomask,
  wherein preferably in step c) a voltage is applied to the first and second electrode.

The invention furthermore relates to an LC medium comprising a polymerisable component A) and a liquid-crystalline component B), as described above and below.

The liquid-crystalline component B) of an LC medium according to the present invention is hereinafter also referred to as "LC host mixture", and preferably contains only LC compounds that are selected from low-molecular-weight compounds which are unpolymerisable, and optionally contains additives like polymerisation initiators, inhibitors etc.

The invention furthermore relates to an LC medium or LC display as described above and below, wherein the polymerisable compounds of component A) are polymerised.

The invention furthermore relates to a process for preparing an LC medium as described above and below, comprising the steps of mixing an LC host mixture or LC component B) as described above and below with a polymerisable component A) as described above and below, and optionally with further LC compounds and/or additives.

The invention further relates to the use of LC medium in LC displays, especially in PSA displays.

The invention furthermore relates to the use of LC medium according to the invention in PSA displays, in particular the use in PSA displays containing an LC medium, for the production of a tilt angle in the LC medium by in-situ polymerisation of the polymerisable compound(s) of component B) in the PSA display, preferably in an electric or magnetic field.

The invention furthermore relates to an LC display comprising one or more compounds of formula I or an LC medium according to the invention, in particular a PSA display, particularly preferably a PS-VA, PS-OCB, PS-IPS, PS-FFS, PS-UB-FFS, PS-posi-VA or PS-TN display.

The invention furthermore relates to an LC display comprising a polymer obtainable by polymerisation of a polymerisable component A) as described above, or comprising an LC medium according to the invention, which is preferably a PSA display, very preferably a PS-VA, PS-OCB, PS-IPS, PS-FFS, PS-UB-FFS, PS-posi-VA or PS-TN display.

The invention furthermore relates to an LC display of the PSA type comprising two substrates, at least one which is transparent to light, an electrode provided on each substrate or two electrodes provided on only one of the substrates, and located between the substrates a layer of an LC medium that comprises one or more polymerisable compounds and an LC component as described above and below, wherein the polymerisable compounds are polymerised between the substrates of the display.

The invention furthermore relates to a process for manufacturing an LC display as described above and below, comprising the steps of filling or otherwise providing an LC medium, which comprises one or more polymerisable compounds as described above and below, between the substrates of the display, and polymerising the polymerisable compounds.

The PSA displays according to the invention have two electrodes, preferably in the form of transparent layers, which are applied to one or both of the substrates. In some displays, for example in PS-VA, PS-OCB or PS-TN displays, one electrode is applied to each of the two substrates. In other displays, for example in PS-posi-VA, PS-IPS or PS-FFS or PS-UB-FFS displays, both electrodes are applied to only one of the two substrates.

In a preferred embodiment the polymerisable component is polymerised in the LC display while a voltage is applied to the electrodes of the display.

The polymerisable compounds of the polymerisable component are preferably polymerised by photo-polymerisation, very preferably by UV photo-polymerisation.

BRIEF DESCRIPTION OF THE DRAWINGS

FIG. 1 exemplarily and schematically illustrates the ODF process as used in the method and for manufacturing a display according to the present invention.

DETAILED DESCRIPTION OF THE INVENTION

Unless stated otherwise, the polymerisable compounds are preferably selected from achiral compounds.

As used herein, the terms "faster polymerisation speed" and "slower polymerisation speed" mean that the polymerisable compound with faster polymerisation speed shows a lower amount of unreacted compound after a prescribed time than the compound with slower polymerisation speed, when each compound is polymerised under the same conditions, preferably in the LC medium, for the prescribed time, preferably in the range from 30 to 240s, very preferably for 120s, very preferably under conditions as described in the examples. The amount of unreacted compound (also referred to as "residual RM") is preferably measured as described in the example section.

As used herein, the term "electrode structure" includes an electrode layer which may be a continuous layer, or a patterned electrode or pixel electrode, or an array of electrodes, patterned electrodes or pixel electrodes.

As used herein, the terms "active layer" and "switchable layer" mean a layer in an electrooptical display, for example an LC display, that comprises one or more molecules having structural and optical anisotropy, like for example LC molecules, which change their orientation upon an external stimulus like an electric or magnetic field, resulting in a change of the transmission of the layer for polarized or unpolarized light.

As used herein, the terms "tilt" and "tilt angle" will be understood to mean a tilted alignment of the LC molecules of an LC medium relative to the surfaces of the cell in an LC display (here preferably a PSA display). The tilt angle here denotes the average angle (<90°) between the longitudinal molecular axes of the LC molecules (LC director) and the surface of the plane-parallel outer plates which form the LC cell. A low value for the tilt angle (i.e. a large deviation from the 90° angle) corresponds to a large tilt here. A suitable method for measurement of the tilt angle is given in the examples. Unless indicated otherwise, tilt angle values disclosed above and below relate to this measurement method.

As used herein, the terms "reactive mesogen" and "RM" will be understood to mean a compound containing a mesogenic or liquid crystalline skeleton, and one or more functional groups attached thereto which are suitable for polymerisation and are also referred to as "polymerisable group" or "P".

Unless stated otherwise, the term "polymerisable compound" as used herein will be understood to mean a polymerisable monomeric compound.

As used herein, the term "low-molecular-weight compound" will be understood to mean to a compound that is monomeric and/or is not prepared by a polymerisation reaction, as opposed to a "polymeric compound" or a "polymer".

As used herein, the term "unpolymerisable compound" will be understood to mean a compound that does not contain a functional group that is suitable for polymerisation under the conditions usually applied for the polymerisation of the RMs.

The term "mesogenic group" as used herein is known to the person skilled in the art and described in the literature, and means a group which, due to the anisotropy of its attracting and repelling interactions, essentially contributes to causing a liquid-crystal (LC) phase in low-molecular-weight or polymeric substances. Compounds containing mesogenic groups (mesogenic compounds) do not necessarily have to have an LC phase themselves. It is also possible for mesogenic compounds to exhibit LC phase behaviour only after mixing with other compounds and/or after polymerisation. Typical mesogenic groups are, for example, rigid rod- or disc-shaped units. An overview of the terms and definitions used in connection with mesogenic or LC compounds is given in *Pure Appl. Chem.* 2001, 73(5), 888 and C. Tschierske, G. Pelzl, S. Diele, *Angew. Chem.* 2004, 116, 6340-6368.

The term "spacer group", hereinafter also referred to as "Sp", as used herein is known to the person skilled in the art and is described in the literature, see, for example, *Pure Appl. Chem.* 2001, 73(5), 888 and C. Tschierske, G. Pelzl, S. Diele, *Angew. Chem.* 2004, 116, 6340-6368. As used herein, the terms "spacer group" or "spacer" mean a flexible group, for example an alkylene group, which connects the mesogenic group and the polymerisable group(s) in a polymerisable mesogenic compound.

Above and below,

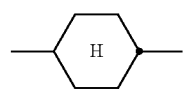

denotes a trans-1,4-cyclohexylene ring, and

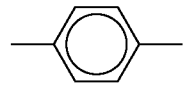

denotes a 1,4-phenylene ring.

Above and below "organic group" denotes a carbon or hydrocarbon group.

"Carbon group" denotes a mono- or polyvalent organic group containing at least one carbon atom, where this either contains no further atoms (such as, for example, —C≡C—) or optionally contains one or more further atoms, such as, for example, N, O, S, B, P, Si, Se, As, Te or Ge (for example carbonyl, etc.). The term "hydrocarbon group" denotes a carbon group which additionally contains one or more H atoms and optionally one or more heteroatoms, such as, for example, N, O, S, B, P, Si, Se, As, Te or Ge.

"Halogen" denotes F, Cl, Br or I.

—CO—, —C(=O)— and —C(O)— denote a carbonyl group, i.e.

A carbon or hydrocarbon group can be a saturated or unsaturated group. Unsaturated groups are, for example, aryl, alkenyl or alkynyl groups. A carbon or hydrocarbon radical having more than 3 C atoms can be straight-chain, branched and/or cyclic and may also contain spiro links or condensed rings.

The terms "alkyl", "aryl", "heteroaryl", etc., also encompass polyvalent groups, for example alkylene, arylene, heteroarylene, etc.

The term "aryl" denotes an aromatic carbon group or a group derived therefrom. The term "heteroaryl" denotes "aryl" as defined above, containing one or more heteroatoms, preferably selected from N, O, S, Se, Te, Si and Ge.

Preferred carbon and hydrocarbon groups are optionally substituted, straight-chain, branched or cyclic, alkyl, alkenyl, alkynyl, alkoxy, alkylcarbonyl, alkoxycarbonyl, alkylcarbonyloxy and alkoxycarbonyloxy having 1 to 40, preferably 1 to 20, very preferably 1 to 12, C atoms, optionally substituted aryl or aryloxy having 5 to 30, preferably 6 to 25, C atoms, or optionally substituted alkylaryl, arylalkyl, alkylaryloxy, arylalkyloxy, arylcarbonyl, aryloxycarbonyl, arylcarbonyloxy and aryloxycarbonyloxy having 5 to 30, preferably 6 to 25, C atoms, wherein one or more C atoms may also be replaced by a hetero atom, preferably selected from N, O, S, Se, Te, Si and Ge.

Further preferred carbon and hydrocarbon groups are $C_1$-$C_{20}$ alkyl, $C_2$-$C_{20}$ alkenyl, $C_2$-$C_{20}$ alkynyl, $C_3$-$C_{20}$ allyl, $C_4$-$C_{20}$ alkyldienyl, $C_4$-$C_{20}$ polyenyl, $C_6$-$C_{20}$ cycloalkyl, $C_4$-$C_{15}$ cycloalkenyl, $C_6$-$C_{30}$ aryl, $C_6$-$C_{30}$ alkylaryl, $C_6$-$C_{30}$ arylalkyl, $C_6$-$C_{30}$ alkylaryloxy, $C_6$-$C_{30}$ arylalkyloxy, $C_2$-$C_{30}$ heteroaryl, $C_2$-$C_{30}$ heteroaryloxy.

Particular preference is given to $C_1$-$C_{12}$ alkyl, $C_2$-$C_{12}$ alkenyl, $C_2$-$C_{12}$ alkynyl, $C_6$-$C_{25}$ aryl and $C_2$-$C_{25}$ heteroaryl.

Further preferred carbon and hydrocarbon groups are straight-chain, branched or cyclic alkyl having 1 to 20, preferably 1 to 12, C atoms, which are unsubstituted or mono- or polysubstituted by F, Cl, Br, I or CN and in which one or more non-adjacent $CH_2$ groups may each be replaced, independently of one another, by —C($R^x$)=C($R^x$)—, —C≡C—, —N($R^x$)—, —O—, —S—, —CO—, —CO—O—, —O—CO—, —O—CO—O— in such a way that O and/or S atoms are not linked directly to one another.

$R^x$ preferably denotes H, F, Cl, CN, a straight-chain, branched or cyclic alkyl chain having 1 to 25 C atoms, in which, in addition, one or more non-adjacent C atoms may be replaced by —O—, —S—, —CO—, —CO—O—, —O—CO—, —O—CO—O— and in which one or more H atoms may be replaced by F or Cl, or denotes an optionally substituted aryl or aryloxy group with 6 to 30 C atoms, or an optionally substituted heteroaryl or heteroaryloxy group with 2 to 30 C atoms.

Preferred alkyl groups are, for example, methyl, ethyl, n-propyl, isopropyl, n-butyl, isobutyl, s-butyl, t-butyl, 2-methylbutyl, n-pentyl, s-pentyl, cyclopentyl, n-hexyl, cyclohexyl, 2-ethylhexyl, n-heptyl, cycloheptyl, n-octyl, cyclooctyl, n-nonyl, n-decyl, n-undecyl, n-dodecyl, dodecanyl, trifluoromethyl, perfluoro-n-butyl, 2,2,2-trifluoroethyl, perfluorooctyl, perfluorohexyl, etc.

Preferred alkenyl groups are, for example, ethenyl, propenyl, butenyl, pentenyl, cyclopentenyl, hexenyl, cyclohexenyl, heptenyl, cycloheptenyl, octenyl, cyclooctenyl, etc.

Preferred alkynyl groups are, for example, ethynyl, propynyl, butynyl, pentynyl, hexynyl, octynyl, etc.

Preferred alkoxy groups are, for example, methoxy, ethoxy, 2-methoxy-ethoxy, n-propoxy, i-propoxy, n-butoxy, i-butoxy, s-butoxy, t-butoxy, 2-methylbutoxy, n-pentoxy, n-hexoxy, n-heptoxy, n-octoxy, n-nonoxy, n-decoxy, n-undecoxy, n-dodecoxy, etc.

Preferred amino groups are, for example, dimethylamino, methylamino, methylphenylamino, phenylamino, etc.

Aryl and heteroaryl groups can be monocyclic or polycyclic, i.e. they can contain one ring (such as, for example, phenyl) or two or more rings, which may also be fused (such as, for example, naphthyl) or covalently bonded (such as, for example, biphenyl), or contain a combination of fused and linked rings. Heteroaryl groups contain one or more heteroatoms, preferably selected from O, N, S and Se.

Particular preference is given to mono-, bi- or tricyclic aryl groups having 6 to 25 C atoms and mono-, bi- or tricyclic heteroaryl groups having 5 to 25 ring atoms, which optionally contain fused rings and are optionally substituted. Preference is furthermore given to 5-, 6- or 7-membered aryl and heteroaryl groups, in which, in addition, one or more CH groups may be replaced by N, S or O in such a way that O atoms and/or S atoms are not linked directly to one another.

Preferred aryl groups are, for example, phenyl, biphenyl, terphenyl, [1,1':3',1"]terphenyl-2'-yl, naphthyl, anthracene, binaphthyl, phenanthrene, 9,10-dihydro-phenanthrene, pyrene, dihydropyrene, chrysene, perylene, tetracene, pentacene, benzopyrene, fluorene, indene, indenofluorene, spirobifluorene, etc.

Preferred heteroaryl groups are, for example, 5-membered rings, such as pyrrole, pyrazole, imidazole, 1,2,3-triazole, 1,2,4-triazole, tetrazole, furan, thiophene, selenophene, oxazole, isoxazole, 1,2-thiazole, 1,3-thiazole, 1,2,3-oxadiazole, 1,2,4-oxadiazole, 1,2,5-oxadiazole, 1,3,4-oxadiazole, 1,2,3-thiadiazole, 1,2,4-thiadiazole, 1,2,5-thiadiazole, 1,3,4-thiadiazole, 6-membered rings, such as pyridine, pyridazine, pyrimidine, pyrazine, 1,3,5-triazine, 1,2,4-triazine, 1,2,3-triazine, 1,2,4,5-tetrazine, 1,2,3,4-tetrazine, 1,2,3,5-tetrazine, or condensed groups, such as indole, isoindole, indolizine, indazole, benzimidazole, benzotriazole, purine, naphthimidazole, phenanthrimidazole, pyridimidazole, pyrazinimidazole, quinoxalinimidazole, benzoxazole, naphthoxazole, anthroxazole, phenanthroxazole, isoxazole, benzothiazole, benzofuran, isobenzofuran, dibenzofuran, quinoline, isoquinoline, pteridine, benzo-5,6-quinoline, benzo-6,7-quinoline, benzo-7,8-quinoline, benzoisoquinoline, acridine, phenothiazine, phenoxazine, benzopyridazine, benzopyrimidine, quinoxaline, phenazine, naphthyridine, azacarbazole, benzocarboline, phenanthridine, phenanthroline, thieno[2,3b]thiophene, thieno[3,2b]thiophene, dithienothiophene, isobenzothiophene, dibenzothiophene, benzothiadiazothiophene, or combinations of these groups.

The aryl and heteroaryl groups mentioned above and below may also be substituted by alkyl, alkoxy, thioalkyl, fluorine, fluoroalkyl or further aryl or heteroaryl groups.

The (non-aromatic) alicyclic and heterocyclic groups encompass both saturated rings, i.e. those containing exclusively single bonds, and also partially unsaturated rings, i.e.

those which may also contain multiple bonds. Heterocyclic rings contain one or more heteroatoms, preferably selected from Si, O, N, S and Se.

The (non-aromatic) alicyclic and heterocyclic groups can be monocyclic, i.e. contain only one ring (such as, for example, cyclohexane), or polycyclic, i.e. contain a plurality of rings (such as, for example, decahydronaphthalene or bicyclooctane). Particular preference is given to saturated groups. Preference is furthermore given to mono-, bi- or tricyclic groups having 5 to 25 ring atoms, which optionally contain fused rings and are optionally substituted. Preference is furthermore given to 5-, 6-, 7- or 8-membered carbocyclic groups, in which, in addition, one or more C atoms may be replaced by Si and/or one or more CH groups may be replaced by N and/or one or more non-adjacent $CH_2$ groups may be replaced by —O— and/or —S—.

Preferred alicyclic and heterocyclic groups are, for example, 5-membered groups, such as cyclopentane, tetrahydrofuran, tetrahydrothiofuran, pyrrolidine, 6-membered groups, such as cyclohexane, silinane, cyclohexene, tetrahydropyran, tetrahydrothiopyran, 1,3-dioxane, 1,3-dithiane, piperidine, 7-membered groups, such as cycloheptane, and fused groups, such as tetrahydronaphthalene, decahydronaphthalene, indane, bicyclo[1.1.1]-pentane-1,3-diyl, bicyclo[2.2.2]octane-1,4-diyl, spiro[3.3]heptane-2,6-diyl, octahydro-4,7-methanoindane-2,5-diyl.

Preferred substituents are, for example, solubility-promoting groups, such as alkyl or alkoxy, electron-withdrawing groups, such as fluorine, nitro or nitrile, or substituents for increasing the glass transition temperature (Tg) in the polymer, in particular bulky groups, such as, for example, t-butyl or optionally substituted aryl groups.

Preferred substituents, hereinafter also referred to as "L", are, for example, F, Cl, Br, I, —CN, —$NO_2$, —NCO, —NCS, —OCN, —SCN, —C(=O)N($R^x$)$_2$, —C(=O)$Y^1$, —C(=O)$R^x$, —N($R^x$)$_2$, straight-chain or branched alkyl, alkoxy, alkylcarbonyl, alkoxycarbonyl, alkylcarbonyloxy or alkoxycarbonyloxy each having 1 to 25 C atoms, in which one or more H atoms may optionally be replaced by F or Cl, optionally substituted silyl having 1 to 20 Si atoms, or optionally substituted aryl having 6 to 25, preferably 6 to 15, C atoms, wherein $R^x$ denotes H, F, Cl, CN, or straight chain, branched or cyclic alkyl having 1 to 25 C atoms, wherein one or more non-adjacent $CH_2$-groups are optionally replaced by —O—, —S—, —CO—, —CO—O—, —O—CO—, —O—CO—O— in such a manner that O- and/or S-atoms are not directly connected with each other, and wherein one or more H atoms are each optionally replaced by F, Cl, P- or P-Sp-, and $Y^1$ denotes halogen.

"Substituted silyl or aryl" preferably means substituted by halogen, —CN, $R^0$, —$OR^0$, —CO—$R^0$, —CO—O—$R^0$, —O—CO—$R^0$ or —O—CO—O—$R^0$, wherein $R^0$ denotes H or alkyl with 1 to 20 C atoms.

Particularly preferred substituents L are, for example, F, Cl, CN, $NO_2$, $CH_3$, $C_2H_5$, $OCH_3$, $OC_2H_5$, $COCH_3$, $COC_2H_5$, $COOCH_3$, $COOC_2H_5$, $CF_3$, $OCF_3$, $OCHF_2$, $OC_2F_5$, furthermore phenyl.

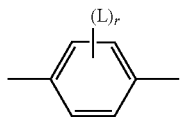

is preferably

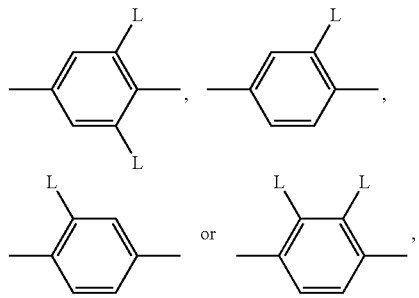

in which L has one of the meanings indicated above.

The polymerisable group P is a group which is suitable for a polymerisation reaction, such as, for example, free-radical or ionic chain polymerisation, polyaddition or polycondensation, or for a polymer-analogous reaction, for example addition or condensation onto a main polymer chain. Particular preference is given to groups for chain polymerisation, in particular those containing a C=C double bond or —C≡C— triple bond, and groups which are suitable for polymerisation with ring opening, such as, for example, oxetane or epoxide groups.

Preferred groups P are selected from the group consisting of $CH_2$=$CW^1$—CO—O—, $CH_2$=$CW^1$—CO—,

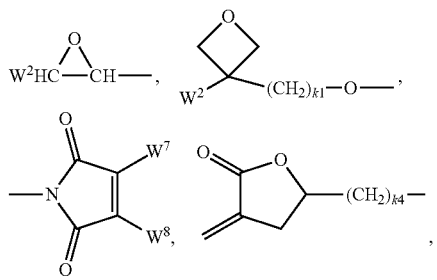

$CH_2$=$CW^2$—(O)$_{3k}$—, $CW^1$=CH—CO—(O)$_{k3}$—, $CW^1$=CH—CO—NH—, $CH_2$=$CW^1$—CO—NH—, $CH_3$—CH=CH—O—, ($CH_2$=CH)$_2$CH—OCO—, ($CH_2$=CH—$CH_2$)$_2$CH—OCO—, ($CH_2$=CH)$_2$CH—O—, ($CH_2$=CH—$CH_2$)$_2$N—, ($CH_2$=CH—$CH_2$)$_2$N—CO—, HO—$CW^2W^3$—, HS—$CW^2W^3$—, $HW^2$N—, HO—$CW^2W^3$—NH—, $CH_2$=$CW^1$—CO—NH—, $CH_2$=CH—(COO)$_{k1}$-Phe-(O)$_{k2}$—, $CH_2$=CH—(CO)$_{k1}$-Phe-(O)$_{k2}$—, Phe-CH=CH—, HOOC—, OCN— and $W^4W^5W^6$Si—, in which $W^1$ denotes H, F, Cl, CN, $CF_3$, phenyl or alkyl having 1 to 5 C atoms, in particular H, F, Cl or $CH_3$, $W^2$ and $W^3$ each, independently of one another, denote H or alkyl having 1 to 5 C atoms, in particular H, methyl, ethyl or n-propyl, $W^4$, $W^5$ and $W^6$ each, independently of one another, denote Cl, oxaalkyl or oxacarbonylalkyl having 1 to 5 C atoms, $W^7$ and $W^8$ each, independently of one another, denote H, Cl or alkyl having 1 to 5 C atoms, Phe denotes 1,4-phenylene, which is optionally substituted by one or more radicals L as defined above which are other than P-Sp-, $k_1$, $k_2$ and $k_3$ each, independently of one another, denote 0 or 1, $k_3$ preferably denotes 1, and $k_4$ denotes an integer from 1 to 10.

Very preferred groups P are selected from the group consisting of $CH_2$=$CW^1$—CO—O—, $CH_2$=$CW^1$—CO—,

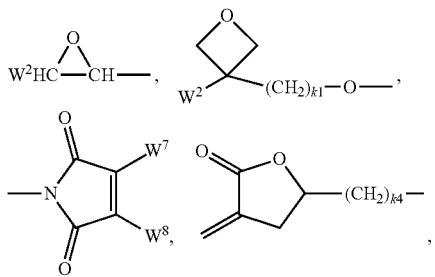

$CH_2$=$CW^2$—O—, $CH_2$=$CW^2$—, $CW^1$=CH—CO—(O)$_{k3}$—, $CW^1$=CH—CO—NH—, $CH_2$=$CW^1$—CO—NH—, ($CH_2$=CH)$_2$CH—OCO—, ($CH_2$=CH—$CH_2$)$_2$CH—OCO—, ($CH_2$=CH—$CH_2$)$_2$CH—O—, ($CH_2$=CH—$CH_2$)$_2$N—, ($CH_2$=CH—$CH_2$)$_2$N—CO—, $CH_2$=$CW^1$—CO—NH—, $CH_2$=CH—(COO)$_{k1}$-Phe-(O)$_{k2}$—, $CH_2$=CH—(CO)$_{k1}$-Phe-(O)$_{k2}$—, Phe-CH=CH— and $W^4W^5W^6$Si—, in which $W^1$ denotes H, F, Cl, CN, $CF_3$, phenyl or alkyl having 1 to 5 C atoms, in particular H, F, Cl or $CH_3$, $W^2$ and $W^3$ each, independently of one another, denote H or alkyl having 1 to 5 C atoms, in particular H, methyl, ethyl or n-propyl, $W^4$, $W^5$ and $W^6$ each, independently of one another, denote Cl, oxaalkyl or oxacarbonyl-alkyl having 1 to 5 C atoms, $W^7$ and $W^8$ each, independently of one another, denote H, Cl or alkyl having 1 to 5 C atoms, Phe denotes 1,4-phenylene, $k_1$, $k_2$ and $k_3$ each, independently of one another, denote 0 or 1, $k_3$ preferably denotes 1, and $k_4$ denotes an integer from 1 to 10.

Very particularly preferred groups P are selected from the group consisting of $CH_2$=$CW^1$—CO—O—, in particular $CH_2$=CH—CO—O—, $CH_2$=C($CH_3$)—CO—O— and $CH_2$=CF—CO—O—, furthermore $CH_2$=CH—O—, ($CH_2$=CH)$_2$CH—O—CO—, ($CH_2$=CH)$_2$CH—O—,

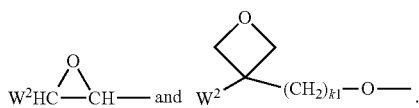

Further preferred polymerisable groups P are selected from the group consisting of vinyloxy, acrylate, methacrylate, fluoroacrylate, chloroacrylate, oxetane and epoxide, most preferably from acrylate and methacrylate.

Preferred spacer groups Sp', and preferred spacer groups Sp that different from a single bond, are selected of the formula Sp"-X", so that the respective radical P-Sp- or P-Sp'- conforms to the formula P-Sp"-X"—, wherein
Sp" denotes alkylene having 1 to 20, preferably 1 to 12, C atoms, which is optionally mono- or polysubstituted by F, Cl, Br, I or CN and in which, in addition, one or more non-adjacent $CH_2$ groups may each be replaced, independently of one another, by —O—, —S—, —NH—, —N($R^0$)—, —Si($R^0R^{00}$)—, —CO—, —CO—O—, —O—CO—, —O—CO—O—, —S—CO—, —CO—S—, —N($R^{00}$)—CO—O—, —O—CO—N($R^0$)—, —N($R^0$)—CO—N($R^{00}$)—, —CH=CH— or —C≡C— in such a way that O and/or S atoms are not linked directly to one another,
X" denotes —O—, —S—, —CO—, —CO—O—, —O—CO—, —O—CO—O—, —CO—N($R^0$)—, —N($R^0$)—CO—, —N($R^0$)—CO—N($R^{00}$)—, —OCH$_2$—, —CH$_2$O—, —SCH$_2$—, —CH$_2$S—, —CF$_2$O—, —OCF$_2$—, —CF$_2$S—, —SCF$_2$—, —CF$_2$CH$_2$—, —CH$_2$CF$_2$—, —CF$_2$CF$_2$—, —CH=N—, —N=CH—, —N=N—, —CH=CR$^0$—, —CY$^2$=CY$^3$—, —C≡C—, —CH=CH—CO—O—, —O—CO—CH=CH— or a single bond,
$R^0$ and $R^{00}$ each, independently of one another, denote H or alkyl having 1 to 20 C atoms, and
$Y^2$ and $Y^3$ each, independently of one another, denote H, F, Cl or CN.
X" is preferably —O—, —S—, —CO—, —COO—, —OCO—, —O—COO—, —CO—NR$^0$—, —NR$^0$—CO—, —NR$^0$—CO—NR$^{00}$— or a single bond.

Typical spacer groups Sp, Sp' and -Sp"-X"- are, for example, —(CH$_2$)$_{p1}$—, —(CH$_2$)$_{p1}$—O—, —(CH$_2$)$_{p1}$—O—CO—, —(CH$_2$)$_{p1}$—CO—O—, —(CH$_2$)$_{p1}$—O—CO—O—, —(CH$_2$CH$_2$O)$_{q1}$—CH$_2$CH$_2$—, —CH$_2$CH$_2$—S—CH$_2$CH$_2$—, —CH$_2$CH$_2$—NH—CH$_2$CH$_2$— or —(SiR$^0$R$^{00}$—O)$_{p1}$—, in which p1 is an integer from 1 to 12, q1 is an integer from 1 to 3, and $R^0$ and $R^{00}$ have the meanings indicated above.

Very preferred groups Sp, Sp' and -Sp"-X"- are —(CH$_2$)$_{p1}$—, —(CH$_2$)$_{p1}$—O—, —(CH$_2$)$_{p1}$—O—CO—, —(CH$_2$)$_{p1}$—CO—O—, —(CH$_2$)$_{p1}$—O—CO—O—, in which p1 has the meanings indicated above, and wherein these groups are linked to the polymerisable group P such that two O-atoms are not directly adjacent to each other.

Particularly preferred groups Sp" are, in each case straight-chain, ethylene, propylene, butylene, pentylene, hexylene, heptylene, octylene, nonylene, decylene, undecylene, dodecylene, octadecylene, ethyleneoxyethylene, methyleneoxybutylene, ethylenethioethylene, ethylene-N-methyliminoethylene, 1-methylalkylene, ethenylene, propenylene and butenylene.

In another preferred embodiment of the invention the compounds of formula F1-F6 and their subformulae contain a spacer group Sp that is substituted by one or more polymerisable groups P, so that the group Sp-P corresponds to Sp(P)$_s$, with s being ≥2 (branched polymerisable groups).

Preferred compounds of formulae F1-F6 according to this preferred embodiment are those wherein s is 2, i.e. compounds which contain a group Sp(P)$_2$ or Sp'(P)$_2$.

Preferred groups Sp(P)$_2$ and Sp'(P)$_2$ in the compounds of formulae F1-F6 and their subformulae are selected from the following formulae:

| | |
|---|---|
| —X-alkyl-CHPP | Sp1 |
| —X-alkyl-CH((CH$_2$)$_{aa}$P)((CH$_2$)$_{bb}$P) | Sp2 |
| —X—N((CH$_2$)$_{aa}$P)((CH$_2$)$_{bb}$P) | Sp3 |
| —X-alkyl-CHP—CH$_2$—CH$_2$P | Sp4 |
| —X-alkyl-C(CH$_2$P)(CH$_2$P)—C$_{aa}$H$_{2aa+1}$ | Sp5 |
| —X-alkyl-CHP—CH$_2$P | Sp6 |
| —X-alkyl-CPP—C$_{aa}$H$_{2aa+1}$ | Sp7 |
| —X-alkyl-CHPCHP-C$_{aa}$H$_{2aa+1}$ | Sp8 | in which P is as defined in formula F6,
alkyl denotes a single bond or straight-chain or branched alkylene having 1 to 12 C atoms which is unsubstituted or mono- or polysubstituted by F, Cl or CN and in which one or more non-adjacent CH$_2$ groups may each, independently of one another, be replaced by —C(R$^0$)=C(R$^0$)—, —C≡C—, —N(R$^0$)—, —O—, —S—, —CO—, —CO—O—, —O—CO—, —O—CO—O— in such a way that O and/or S atoms are not linked directly to one another, where $R^0$ has the meaning indicated above, aa and bb each, independently of one another, denote 0, 1, 2, 3, 4, 5 or 6, X has one of the meanings indicated for X", and is preferably O, CO, SO$_2$, O—CO—, CO—O or a single bond.

Preferred spacer groups Sp(P)$_2$ and Sp'(P)$_2$ are selected from formulae Sp1, Sp2 and Sp3.

Very preferred spacer groups Sp(P)$_2$ and Sp'(P)$_2$ are selected from the following subformulae:

| | |
|---|---|
| —CHPP | Sp1a |
| —O—CHPP | Sp1b |
| —CH$_2$—CHPP | Sp1c |
| —OCH$_2$—CHPP | Sp1d |
| —CH(CH$_2$—P)(CH$_2$—P) | Sp2a |
| —OCH(CH$_2$—P)(CH$_2$—P) | Sp2b |
| —CH$_2$—CH(CH$_2$—P)(CH$_2$—P) | Sp2c |
| —OCH$_2$—CH(CH$_2$—P)(CH$_2$—P) | Sp2d |
| —CO—NH((CH$_2$)$_2$P)((CH$_2$)$_2$P) | Sp3a |

Preferred are compounds of formula F1-F6 and S1-S3 and their subformulae wherein all polymerisable groups P that are present in a compound have the same meaning, and very preferably denote acrylate or methacrylate.

Further preferred is a component A) wherein all the polymerisable groups P that are present in all compounds of formulae F1-F6 and S1-S3 that are present in the component A) have the same meaning, and very preferably denote acrylate or methacrylate.

Further preferred are compounds of formula F1-F6 and S1-S3 and their subformulae comprising at least two polymerisable groups P that are different from each other, and a component A) that comprises one or more such compounds.

Preferred compounds of formula F1-F6 are those wherein at least one group Sp is a single bond, and at least one group Sp is not a single bond.

Further preferred compounds of formula F1-F6 are those wherein all groups Sp are a single bond.

Preferred compounds of formula S1-S3 are those wherein at least one group Sp is a single bond, and at least one group Sp is not a single bond.

Further preferred compounds of formula S1-S3 are those wherein all groups Sp are a single bond.

In the compounds of formula F1-F6 and S1-S3 and their subformulae as described above and below, L and L' preferably denote F, Cl, OCH$_3$, OC$_2$H$_5$, O(CH$_2$)$_2$CH$_3$, OC(CH$_3$)$_3$, OCF$_3$, OCF$_2$H or OCFH$_2$, very preferably F, Cl OCH$_3$ or OCF$_3$, most preferably F or OCH$_3$.

Preferably the first polymerisable compounds in component A) are selected from formulae F1-F5, very preferably from formulae F1, F2 and F3.

Preferred compounds of formulae F1 and F2 are selected from the following subformulae

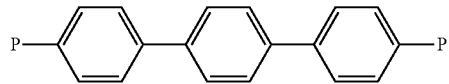
F1a

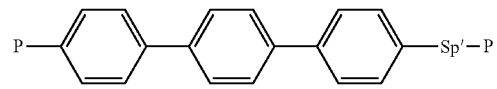
F1b

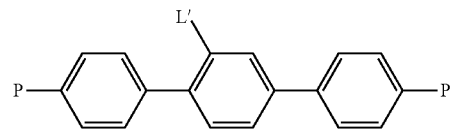
F1c

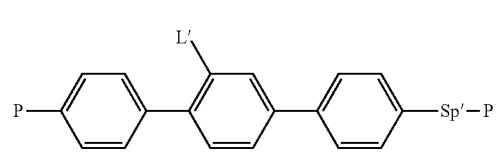
F1d

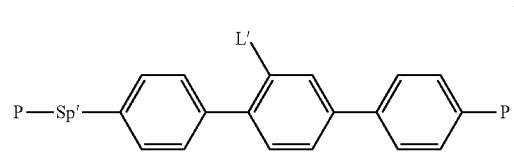
F1e

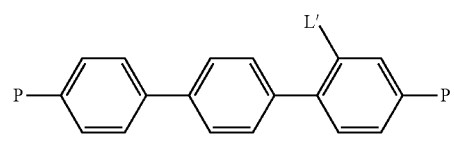
F1f

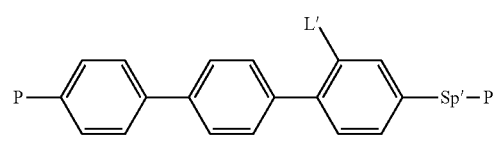
F1g

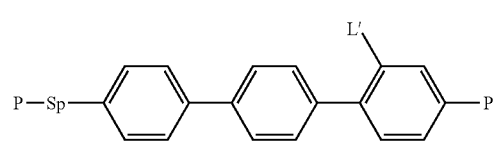
F1h

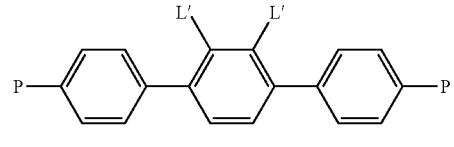
F1i

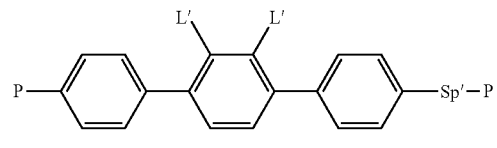
F1k

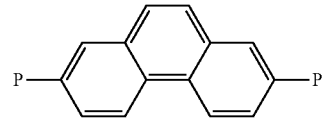
F2a

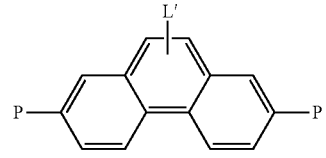
F2b

-continued

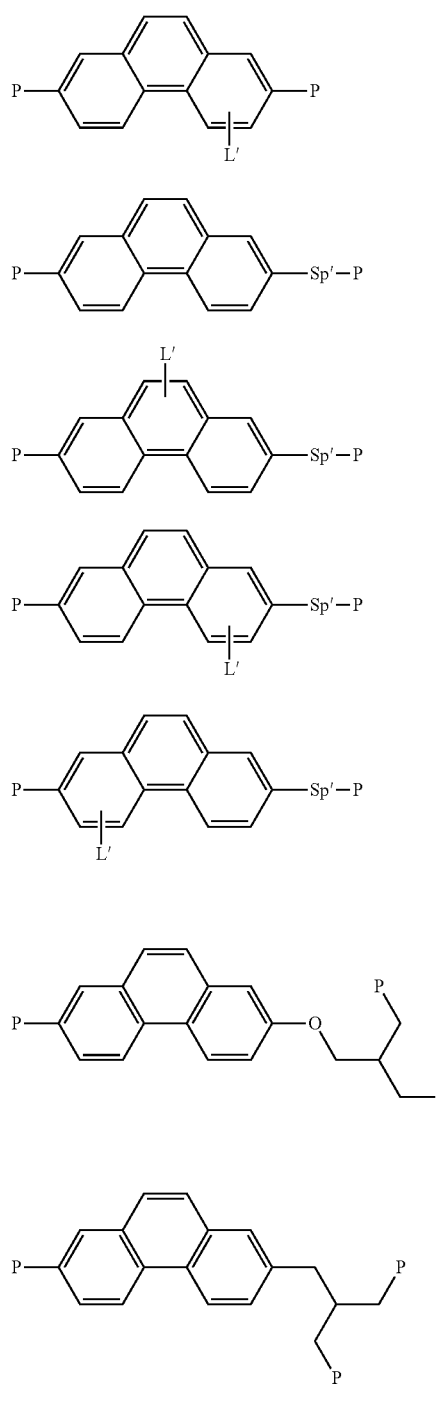

F2c
F2d
F2e
F2f
F2g
F2h
F2i wherein P, Sp', L and r have the meanings given in formulae F1-F6, and L' has one of the meanings of L as given in formula F1 or one of the preferred meanings of L as described above and below.

Preferred compounds of formula F3 are those wherein one of $R^a$ and $R^b$ denotes P-Sp- or -Sp'(P)$_2$ and the other is H.

Further preferred compounds of formula F3 are those wherein both $R^a$ and $R^b$ denote H.

Preferred compounds of formula F3 are selected from the following subformulae

F3a
F3b
F3c
F3d
F3e
F3f

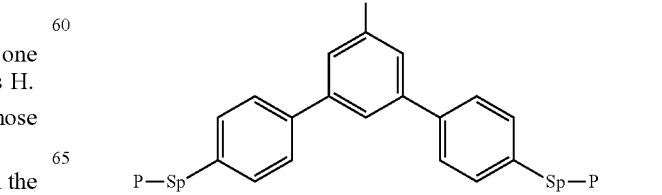

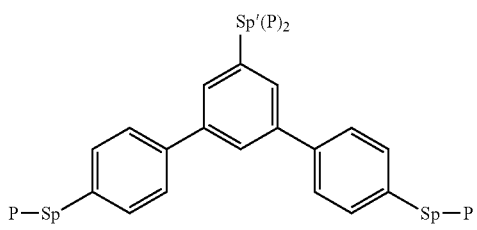
F3g
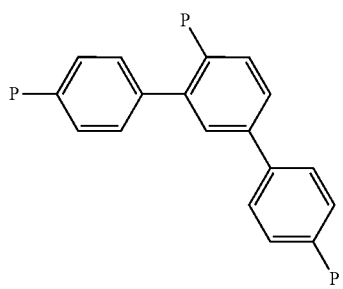
F3e1
wherein P, L, Sp, Sp' and r have the meanings given in formulae F1-F6.
Very preferred compounds of formula F3 are selected from the following subformulae:
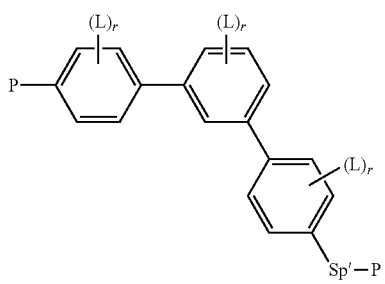
F3a1
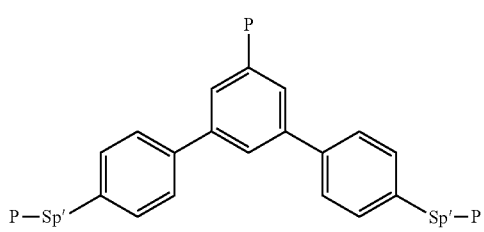
F3f1
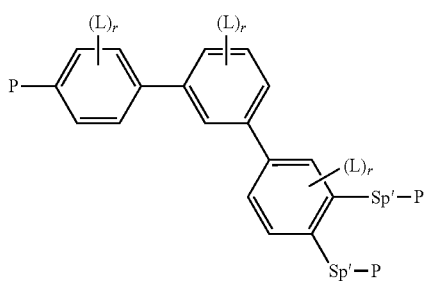
F3b1
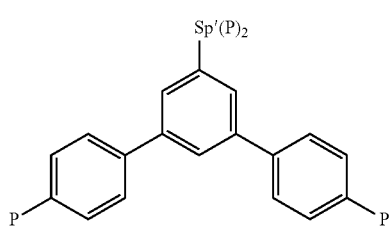
F3g1
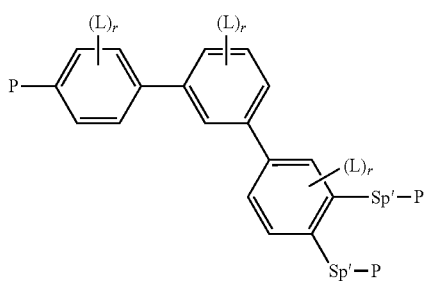
F3c1
wherein P, Sp', L and r have the meanings given in formulae F1-F6.
Preferred compounds of formula F4 are selected from the following subformulae
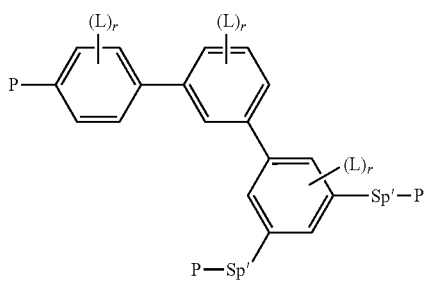
F3d1
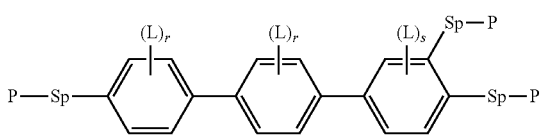
F4a
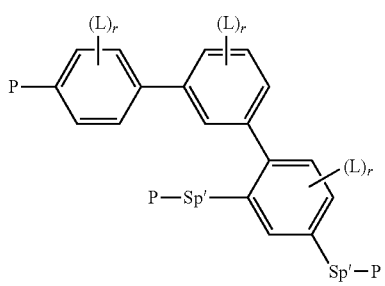
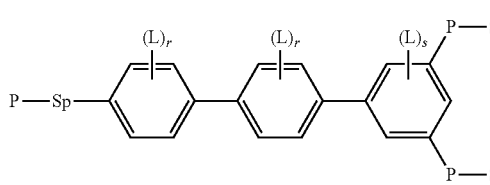
F4b
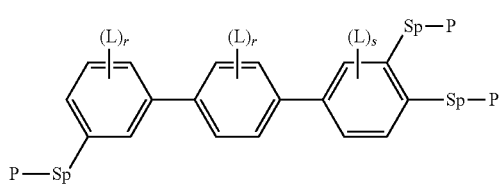
F4c

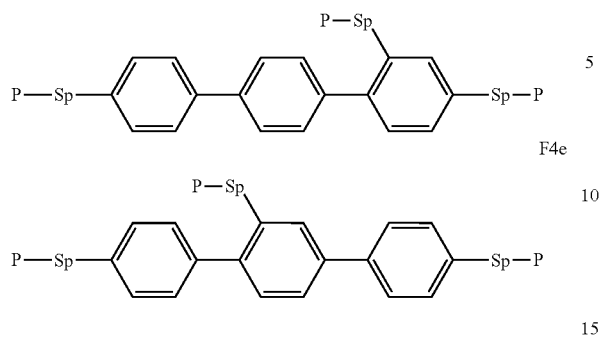

F4d

F4e in which P, Sp, Sp', L, r and s have the meanings given in formulae F1-F6.

Preferred compounds of formula F5 are selected from the following subformulae

F5a

F5b

F5c

F5d

F5e wherein P, L and r have the meanings given in formulae F1-F6.

Preferred compounds of formula F6 are selected from the following subformulae:

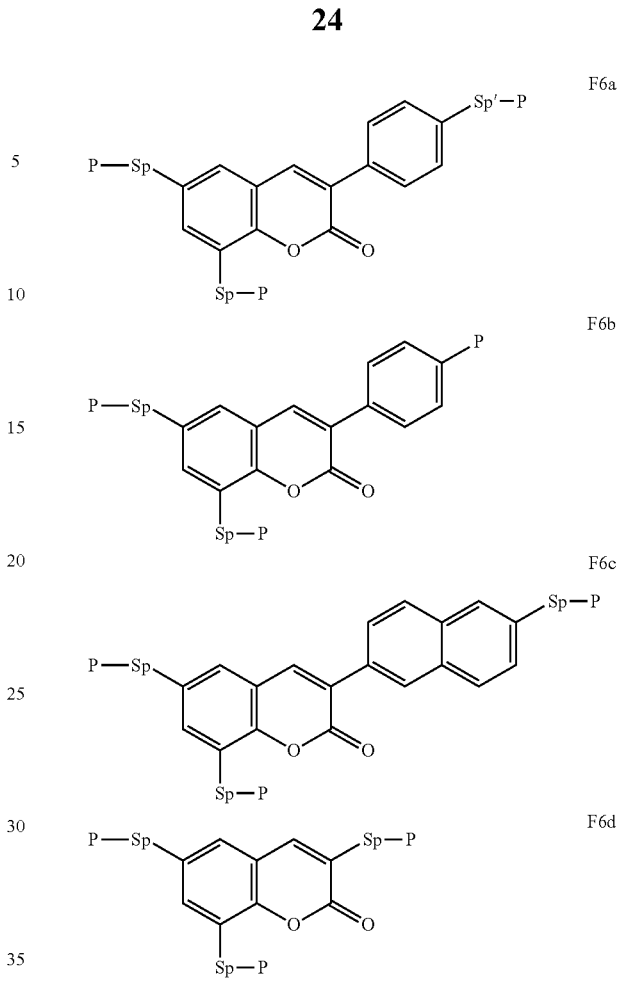

F6a

F6b

F6c

F6d wherein P, Sp and Sp' have the meanings given in formulae F1-F6.

Preferably the second polymerisable compounds in component A) are selected from formula S1 and S2, very preferably of formula S1.

Preferred compounds of formula S1 are selected from the following subformulae

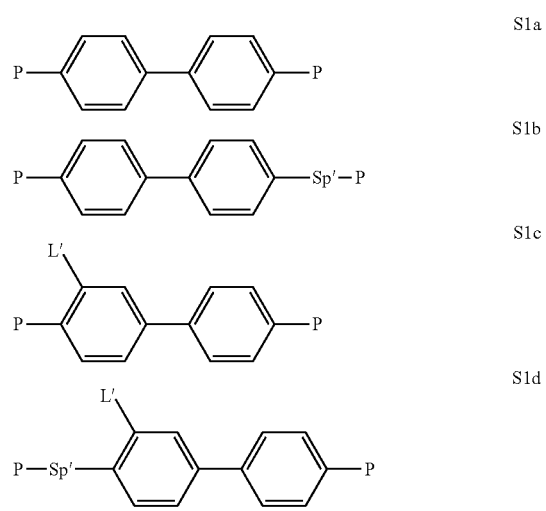

S1a

S1b

S1c

S1d

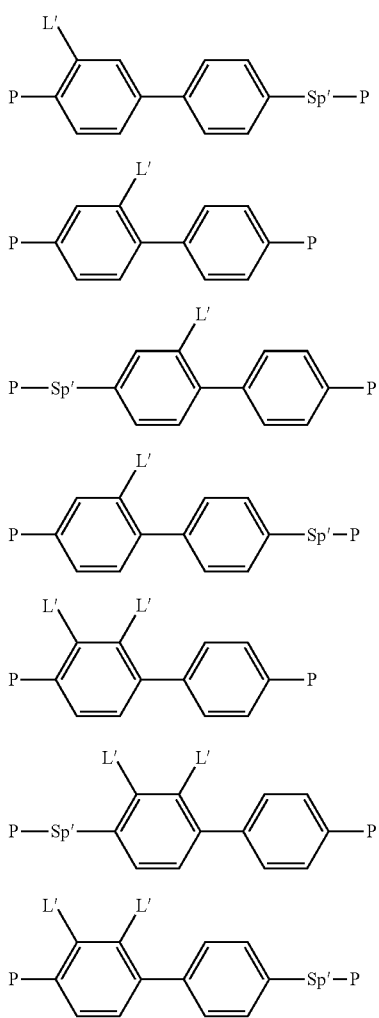

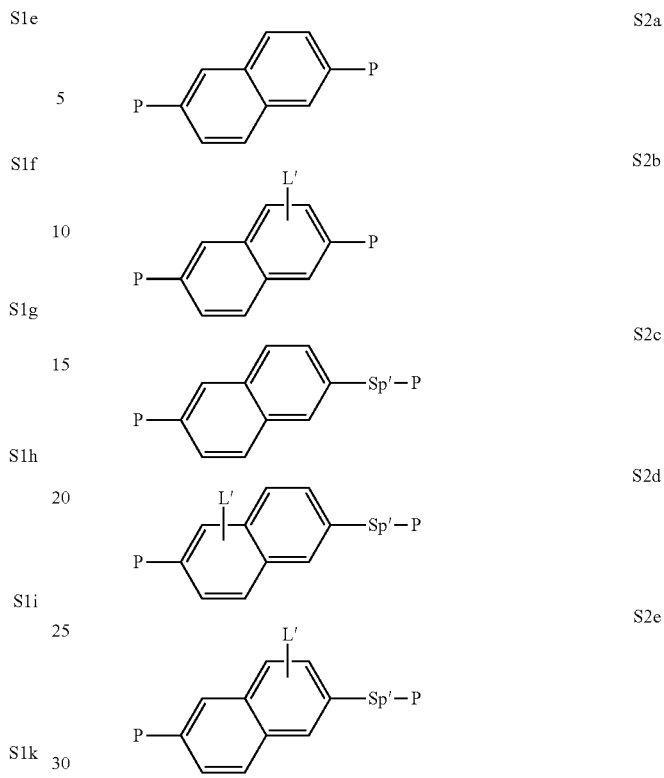

wherein P and Sp' have the meanings given in formulae F1-F6 and S1-S3, and L' has one of the meanings of L as given in formulae F1-F6 and S1-S3 or one of the preferred meanings of L as described above and below.

Preferred compounds of formula S2 are selected from the following subformulae wherein P and Sp' have the meanings given in formulae F1-F6 and S1-S3, and L' has one of the meanings of L as given in formulae F1-F6 and S1-S3 or one of the preferred meanings of L as described above and below.

In the compounds of subformulae F1a-F6d and S1a-S2e preferably Sp' denotes —(CH$_2$)$_{p1}$—, —(CH$_2$)$_{p1}$—O—, —(CH$_2$)$_{p1}$—O—CO—, —(CH$_2$)$_{p1}$—CO—O— or —(CH$_2$)$_{p1}$—O—CO—O—, in which p1 denotes an integer from 1 to 12, preferably from 1 to 6, particularly preferably 1, 2 or 3, and wherein these groups are linked to the polymerisable group P such that two O-atoms are not directly adjacent to each other.

In the compounds of subformulae F1a-F6d and S1a-S2e preferably L' is F.

Very preferred compounds of the formulae F1-F6 are selected from the following subformulae

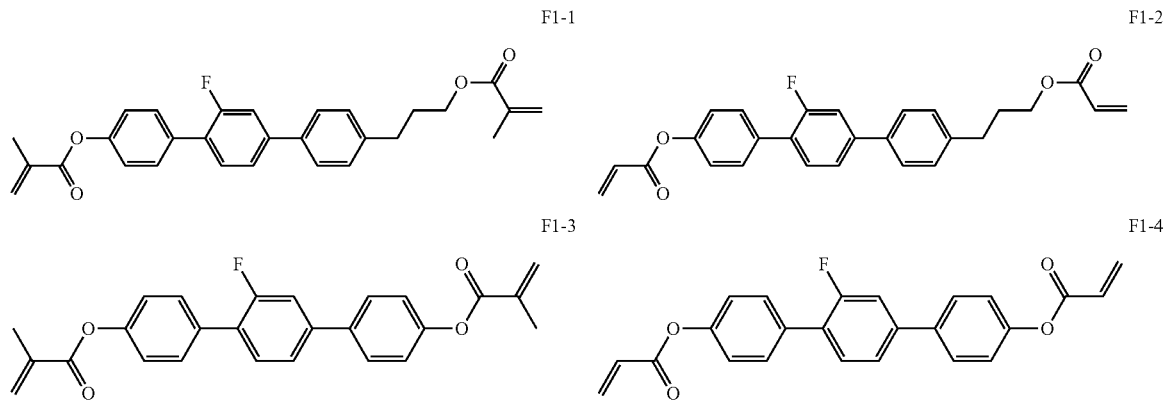

-continued
F1-5
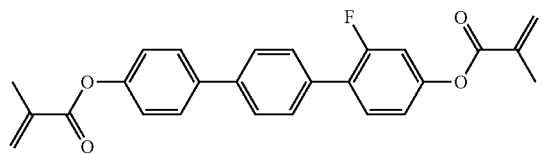
F1-6
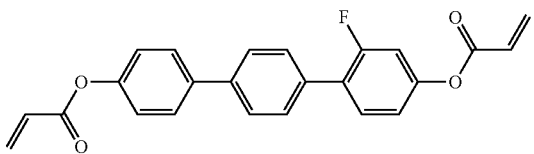
F1-7
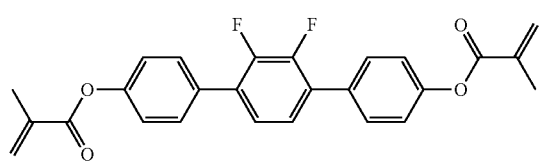
F1-8
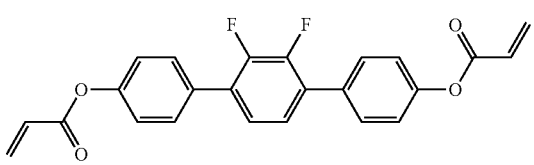
F1-9
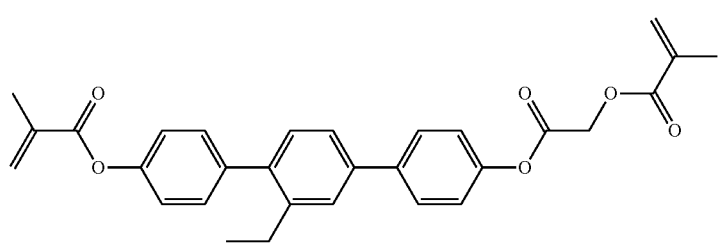
F1-10
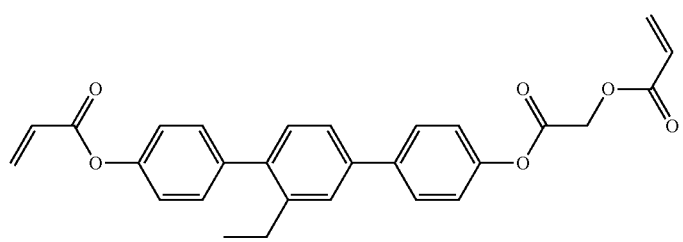
F1-11
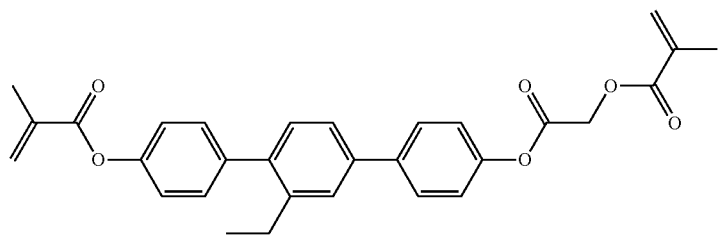
F1-12
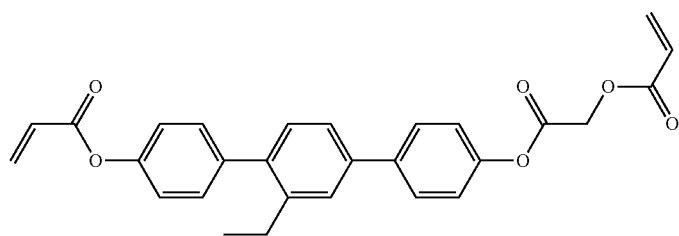
F2-1
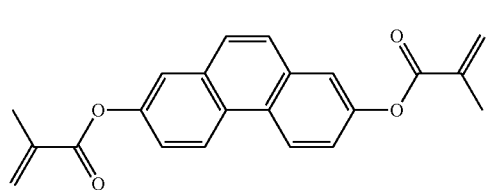
F2-2
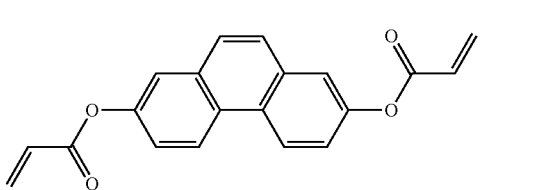

-continued
F2-3
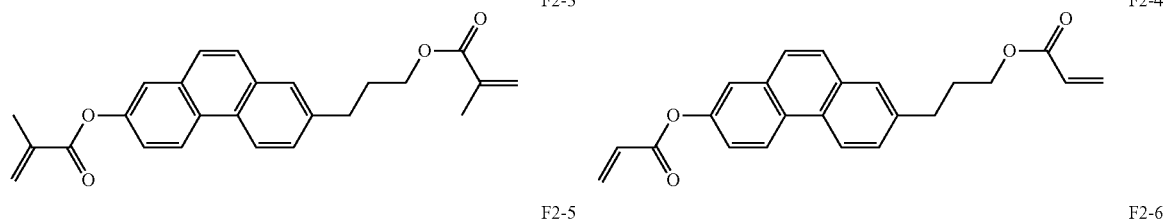
F2-4
F2-5
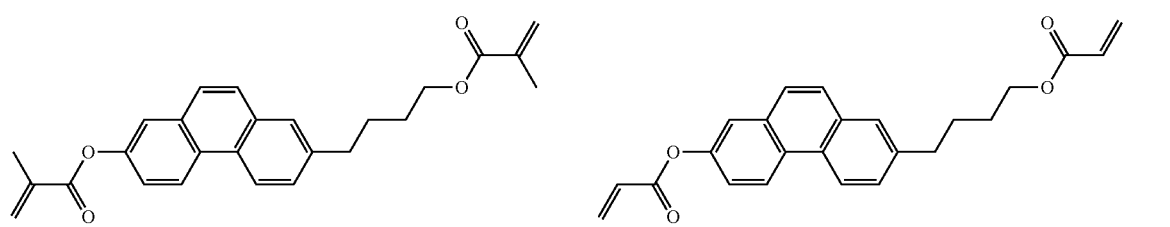
F2-6
F3-1
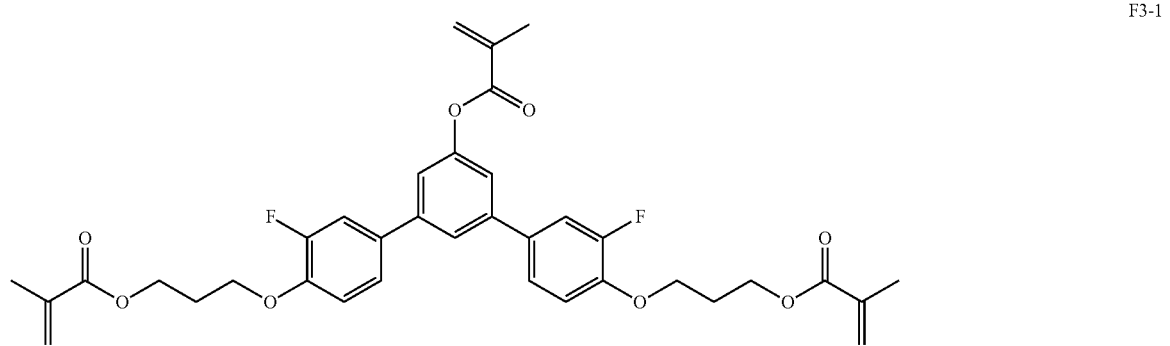
F3-2
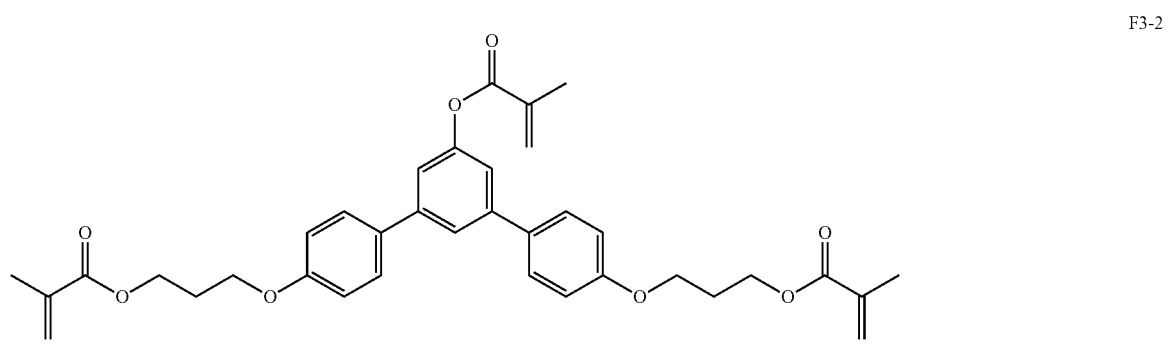
F3-3
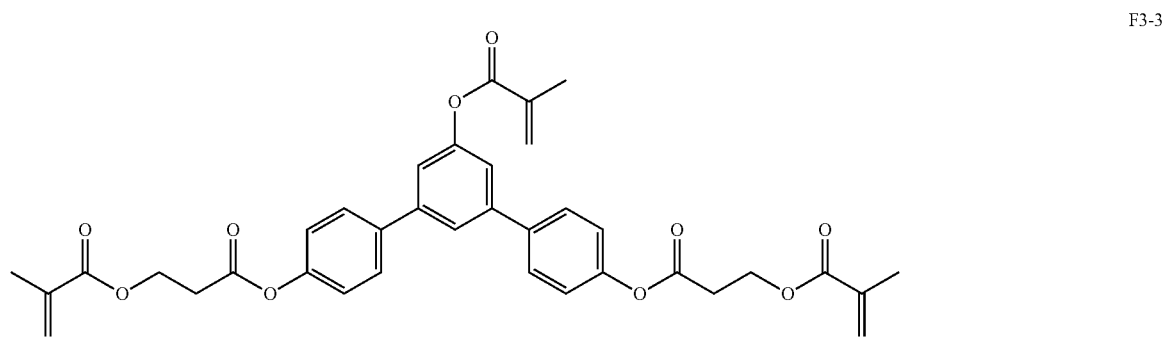

-continued
F3-4
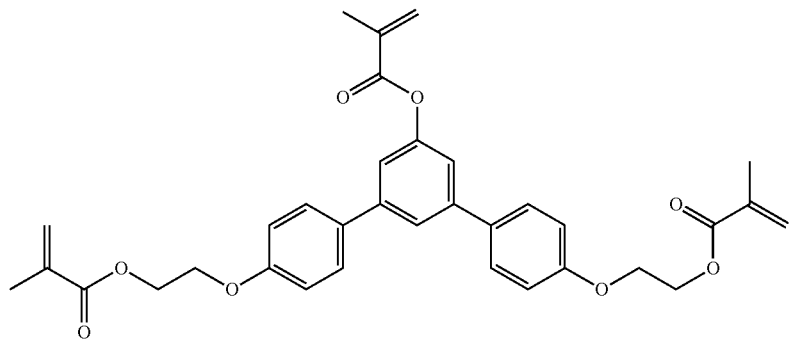
F3-5
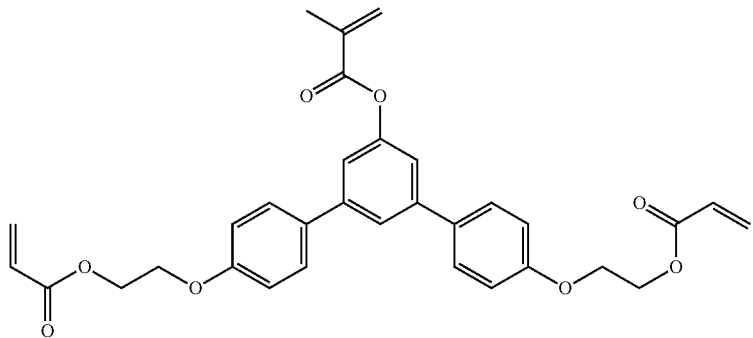
F3-6
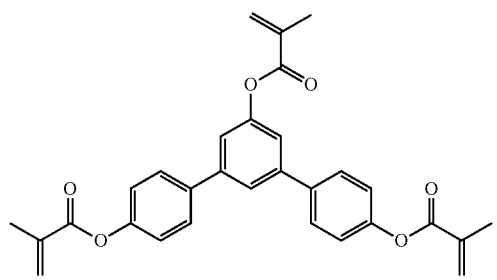
F3-7
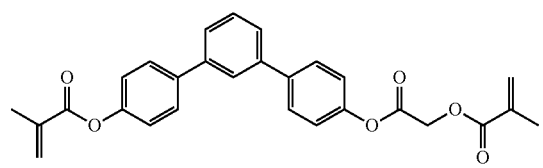
F3-8
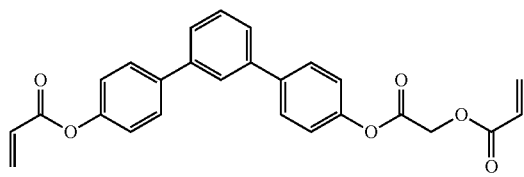
F3-9
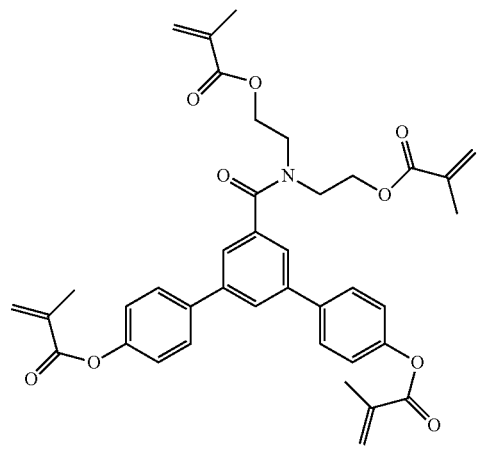

-continued
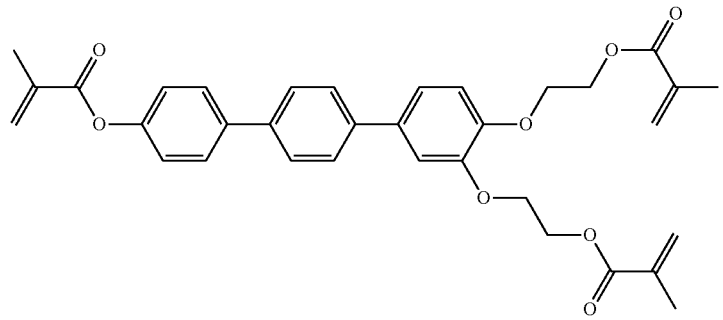
F4-1
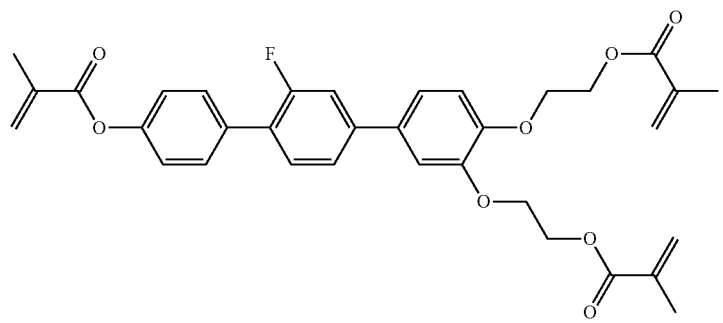
F4-2
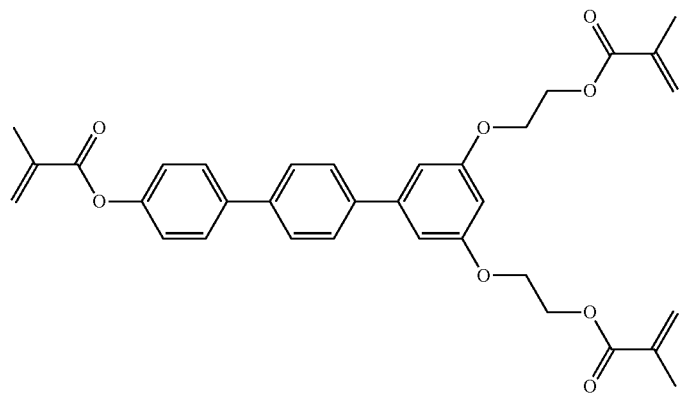
F4-3
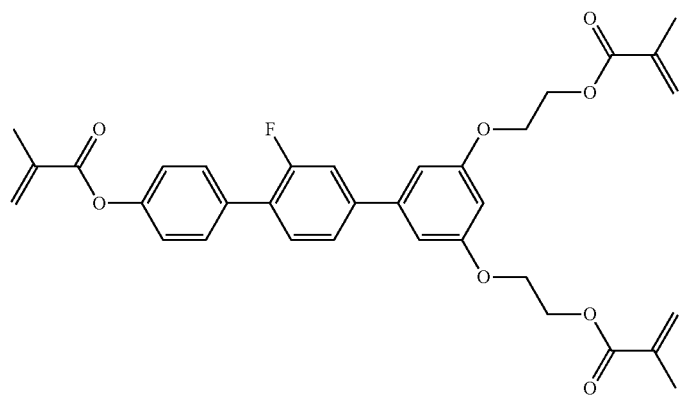
F4-4

-continued
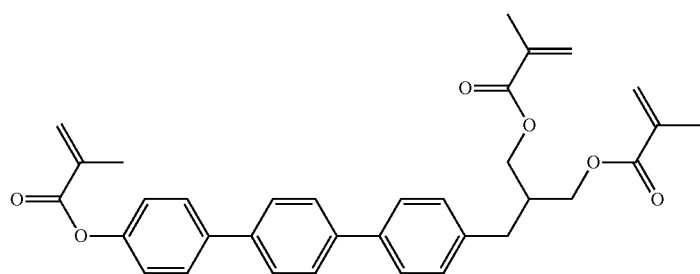
F5-1
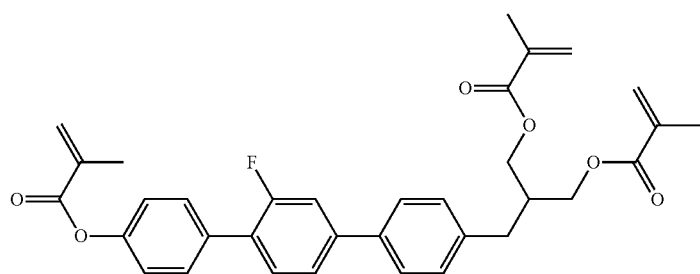
F5-2
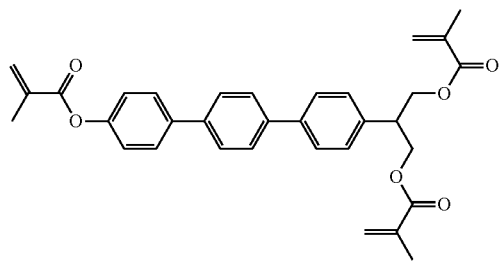
F5-3
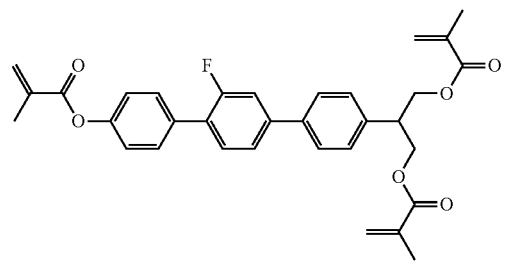
F5-4
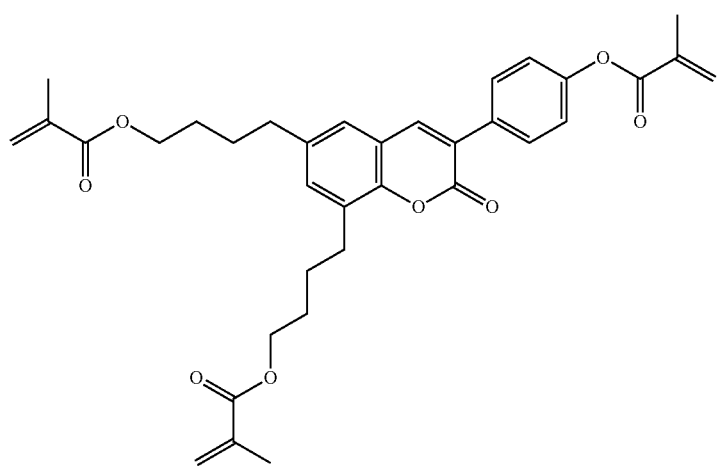
F6-1

-continued
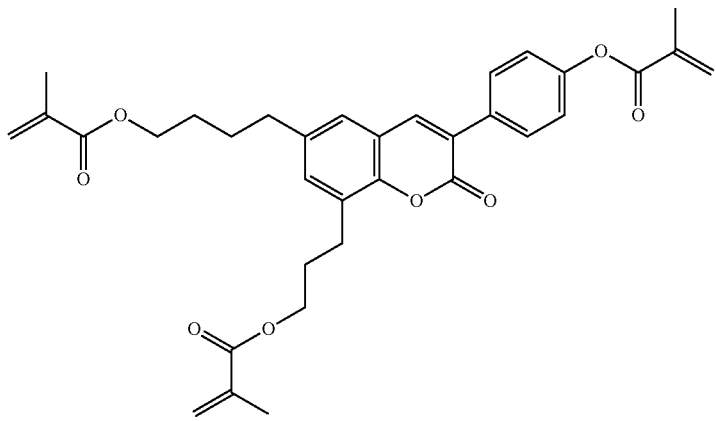
F6-2
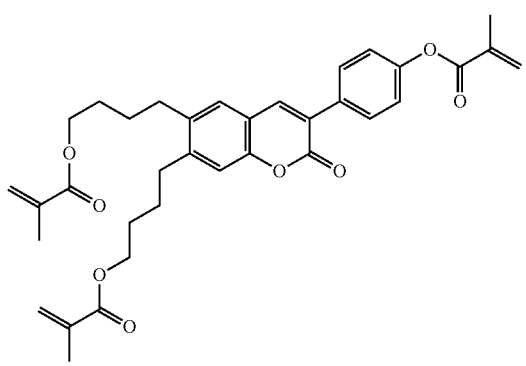
F6-3
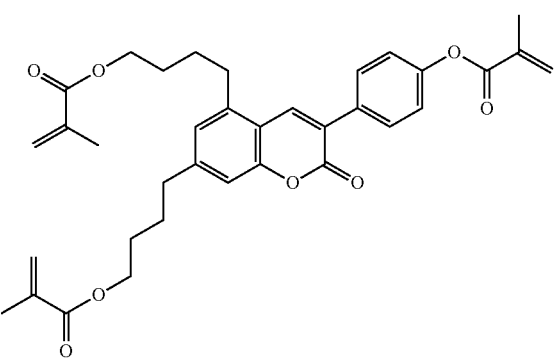
F6-4
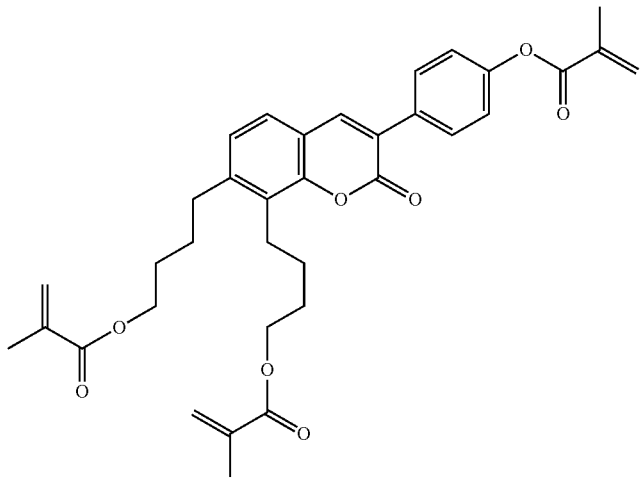
F6-5
Very preferred compounds of the formulae S1-S3 are selected from the following subformulae
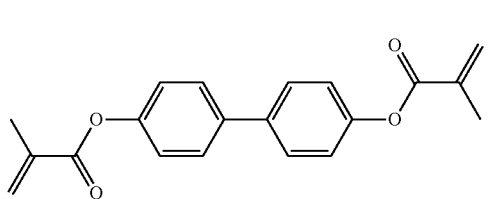
S1-1
-continued
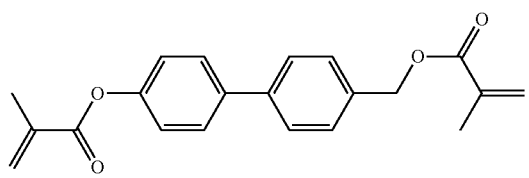
S1-2

S1-3
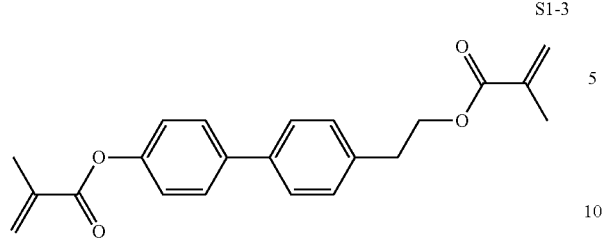
S1-4
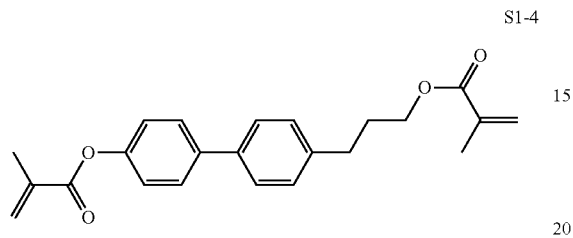
S1-5
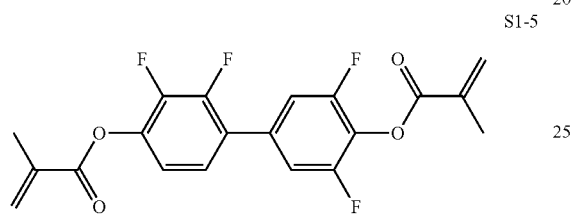
S1-6
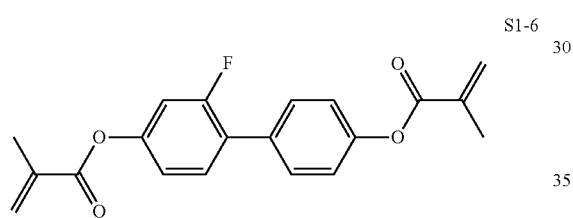
S1-7
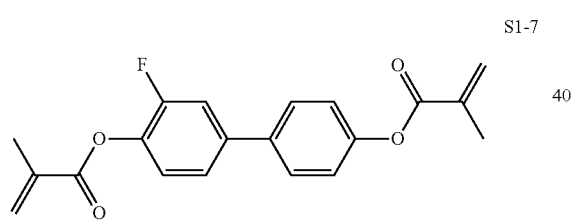
S1-8
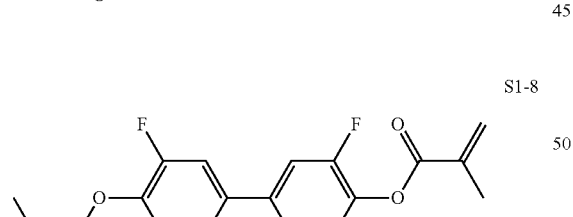
S1-9
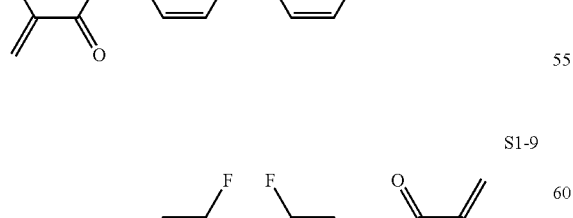
S1-10
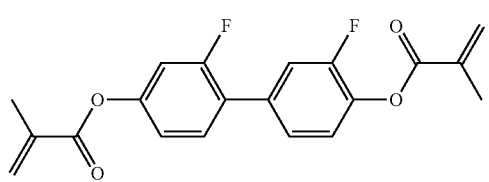
S1-11
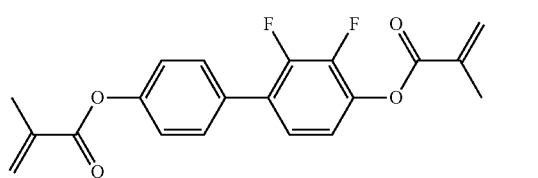
S1-12
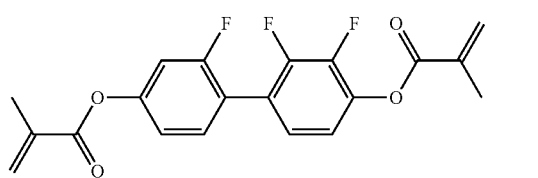
S1-13
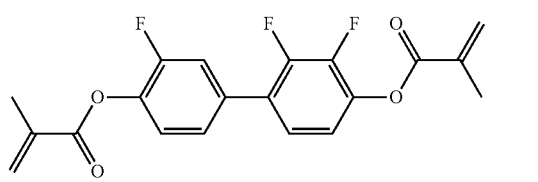
S1-14
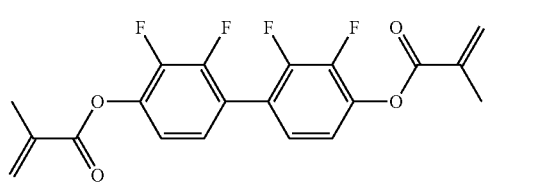
S1-15
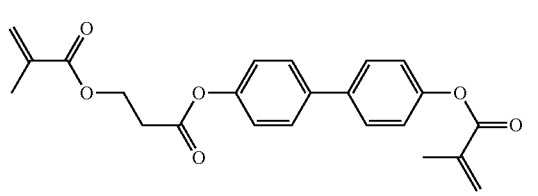
S2-1
In the LC medium according to the present invention, the use of an LC host mixture or component B) together with the use of a polymerisable component A) as described above and below leads to advantageous properties in PSA displays. In particular, one or more of the following advantages could be achieved:
reduced ODF mura,
reduced image sticking, good UV absorption also at longer wavelengths,
quick and complete polymerisation of the RMs,
quick generation of a low pretilt angle, especially already at low UV energy and/or at longer UV wavelengths,
high pretilt angle stability after UV exposure,
high reliability and high VHR value after UV exposure and/or heat treatment,
high birefringence,
reduced viscosity
faster response times.

Since the LC medium according to the present invention shows high absorption at longer UV wavelengths, it is possible to use longer UV wavelengths for polymerisation, which is advantageous for the display manufacturing process.

Particular preference is given to LC media comprising 1, 2 or 3, preferably 1, polymerisable compounds of formula F1-F8, and 1, 2 or 3, preferably 1, polymerisable compounds of formula S1-S3.

Preferably the proportion of compounds of F1-F8 in the LC medium is from 0.005 to 0.05%, very preferably from 0.005 to 0.03%, most preferably from 0.005 to 0.02%.

Preferably the proportion of compounds of S1-S3 in the LC medium is from 0.1 to 1.0%, very preferably from 0.1 to 0.5%, most preferably from 0.2 to 0.4%.

For the production of PSA displays, the polymerisable compounds contained in the LC medium are polymerised or crosslinked (if one compound contains two or more polymerisable groups) by in-situ polymerisation in the LC medium between the substrates of the LC display, optionally while a voltage is applied to the electrodes.

The structure of the PSA displays according to the invention corresponds to the usual geometry for PSA displays, as described in the prior art cited at the outset. Geometries without protrusions are preferred, in particular those in which, in addition, the electrode on the colour filter side is unstructured and only the electrode on the TFT side has slots. Particularly suitable and preferred electrode structures for PS-VA displays are described, for example, in US 2006/0066793 A1.

A preferred PSA type LC display of the present invention comprises:
  a first substrate including a pixel electrode defining pixel areas, the pixel electrode being connected to a switching element disposed in each pixel area and optionally including a micro-slit pattern, and optionally a first alignment layer disposed on the pixel electrode,
  a second substrate including a common electrode layer, which may be disposed on the entire portion of the second substrate facing the first substrate, and optionally a second alignment layer,
  an LC layer disposed between the first and second substrates and including an LC medium comprising a polymerisable component A) and a liquid crystal component B) as described above and below, wherein the polymerisable component A) is preferably polymerised.

The first and/or second alignment layer controls the alignment direction of the LC molecules of the LC layer. For example, in PS-VA displays the alignment layer is selected such that it imparts to the LC molecules homeotropic (or vertical) alignment (i.e. perpendicular to the surface) or tilted alignment. Such an alignment layer may for example comprise a polyimide, which may also be rubbed, or may be prepared by a photoalignment method.

The process of manufacturing a PSA LCD according to the present invention by using an ODF process is exemplarily and schematically illustrated in FIG. 1. In a first step (a) an array of droplets (2) of the LC medium is dispensed on one of the LCD glass substrates (1), where a sealant material (3) is provided in the boundary region between the LC droplets (2) and the edges of the substrate (1). In a second step (b), preferably under vacuum conditions, for example in a vacuum assembly station, the counter glass substrate (4) is coupled and fixed to the first substrate (1), thus forcing the LC droplets (2) to spread and form a continuous layer between the two substrates (1, 4). The polymerisable component A) of the LC medium is then polymerised for example by UV photopolymerisation (not shown).

It was observed that the ODF mura, which may be caused for example by different flow dynamics during droplet dispensing and substrate coupling, is considerably reduced if the LC medium (2) contains a polymerisable component A) as described above and below.

The process according to the present invention of preparing a PSA display by ODF preferably comprises the following steps:
  a) dispensing an array of droplets (2) of an LC medium comprising components A) and B) as described above and below on a first substrate (1), which is preferably a glass substrate,
  b) providing a second substrate (4), which is preferably a glass substrate, on top of the surface of the first substrate (1) covered by the LC medium, preferably under vacuum condition, causing the droplets (2) of the LC medium to spread and form a continuous layer between the first substrate (1) and the second substrate (4),
    wherein the first substrate (1) is equipped with a first electrode structure, and the second substrate (4) is equipped with a second electrode structure, or alternatively one of the first and second substrate (1,4) is equipped with a first and a second electrode structure and the other of the first and second substrate (1, 4) is not equipped with an electrode structure,
  c) exposing the LC medium (2) to UV radiation that causes photopolymerisation of the polymerisable compounds of component A), preferably while applying a voltage to the first and second electrode.

Preferably the first substrate (1) is equipped with a first alignment layer that is in contact with the LC medium. Further preferably the second substrate (4) is equipped with a second alignment layer that is in contact with the LC medium.

Preferably the first substrate (1) and the second substrate (4) are fixed or glued together by means of a sealant material (3) that is provided on the first substrate (1) and/or the second substrate (4), or between the first substrate (1) and the second substrate (4), preferably in the region between the droplets (2) of the LC material and the edges of the respective substrate (1, 4).

Preferably the sealant material (3) is cured, for example by exposure to heat and/or photoradiation. In case the sealant material (3) is cured by exposure to photoradiation, preferably the photoradiation is selected such that it does not cause polymerisation of the polymerisable component A) of the LC medium, and/or the LC medium is protected from the photoradiation used for curing the sealant material (3), for example by a photomask.

The PSA display may comprise further elements, like a colour filter, a black matrix, a passivation layer, optical retardation layers, transistor elements for addressing the individual pixels, etc., all of which are well known to the person skilled in the art and can be employed without inventive skill.

The electrode structure can be designed by the skilled person depending on the individual display type. For example for PS-VA displays a multi-domain orientation of the LC molecules can be induced by providing electrodes having slits and/or bumps or protrusions in order to create two, four or more different tilt alignment directions.

Upon polymerisation the polymerisable compounds of component A) form a crosslinked polymer, which causes a certain pretilt of the LC molecules in the LC medium. Without wishing to be bound to a specific theory, it is believed that at least a part of the crosslinked polymer, which is formed by the polymerisable compounds, will phase-separate or precipitate from the LC medium and form a polymer layer on the substrates or electrodes, or the alignment layer provided thereon. Microscopic measurement data (like SEM and AFM) have confirmed that at least a part of the formed polymer accumulates at the LC/substrate interface.

The polymerisation of the polymerisable compounds of component A) can be carried out in one step. It is also possible firstly to carry out the polymerisation, optionally while applying a voltage, in a first step in order to produce a pretilt angle, and subsequently, in a second polymerisation step without an applied voltage, to polymerise or crosslink the compounds which have not reacted in the first step ("end curing").

Suitable and preferred polymerisation methods are, for example, thermal or photopolymerisation, preferably photopolymerisation, in particular UV induced photopolymerisation, which can be achieved by exposure of the polymerisable compounds to UV radiation.

Optionally one or more polymerisation initiators are added to the LC medium. Suitable conditions for the polymerisation and suitable types and amounts of initiators are known to the person skilled in the art and are described in the literature. Suitable for free-radical polymerisation are, for example, the commercially available photoinitiators Irgacure651®, Irgacure184®, Irgacure907®, Irgacure 189®, Irgacure369® or Darocure1173® (Ciba AG). If a polymerisation initiator is employed, its proportion is preferably 0.001 to 5% by weight, particularly preferably 0.001 to 1% by weight.

The polymerisable compounds used in component A) are also suitable for polymerisation without an initiator, which is accompanied by considerable advantages, such, for example, lower material costs and in particular less contamination of the LC medium by possible residual amounts of the initiator or degradation products thereof. The polymerisation can thus also be carried out without the addition of an initiator. In a preferred embodiment, the LC medium thus does not contain a polymerisation initiator.

The LC medium may also comprise one or more stabilisers in order to prevent undesired spontaneous polymerisation of the RMs, for example during storage or transport. Suitable types and amounts of stabilisers are known to the person skilled in the art and are described in the literature. Particularly suitable are, for example, the commercially available stabilisers from the Irganox® series (Ciba AG), such as, for example, Irganox® 1076. If stabilisers are employed, their proportion, based on the total amount of RMs or the polymerisable component (component A), is preferably 10-500,000 ppm, particularly preferably 50-50,000 ppm.

The polymerisable compounds used in component A) do in particular show good UV absorption in, and are therefore especially suitable for, a process of preparing a PSA display including one or more of the following features:

the polymerisable medium is exposed to UV light in the display in a 2-step process, including a first UV exposure step ("UV-1 step") to generate the tilt angle, and a second UV exposure step ("UV-2 step") to finish polymerization, the polymerisable medium is exposed to UV light in the display generated by an energy-saving UV lamp (also known as "green UV lamps"). These lamps are characterized by a relative low intensity (1/100-1/10 of a conventional UV1 lamp) in their absorption spectra from 300-380 nm, and are preferably used in the UV2 step, but are optionally also used in the UV1 step when avoiding high intensity is necessary for the process.

the polymerisable medium is exposed to UV light in the display generated by a UV lamp with a radiation spectrum that is shifted to longer wavelengths, preferably 340 nm or more, to avoid short UV light exposure in the PS-VA process.

Both using lower intensity and a UV shift to longer wavelengths protect the organic layer against damage that may be caused by the UV light.

A preferred embodiment of the present invention relates to a process for preparing a PSA display as described above and below, comprising one or more of the following features:

the polymerisable LC medium is exposed to UV light in a 2-step process, including a first UV exposure step ("UV-1 step") to generate the tilt angle, and a second UV exposure step ("UV-2 step") to finish polymerization, the polymerisable LC medium is exposed to UV light generated by a UV lamp having an intensity of from 0.5 mW/cm$^2$ to 10 mW/cm$^2$ in the wavelength range from 300-380 nm, preferably used in the UV2 step, and optionally also in the UV1 step, the polymerisable LC medium is exposed to UV light having a wavelength of 340 nm or more, and preferably 400 nm or less.

This preferred process can be carried out for example by using the desired UV lamps or by using a band pass filter and/or a cut-off filter, which are substantially transmissive for UV light with the respective desired wavelength(s) and are substantially blocking light with the respective undesired wavelengths. For example, when irradiation with UV light of wavelengths $\lambda$ of 300-400 nm is desired, UV exposure can be carried out using a wide band pass filter being substantially transmissive for wavelengths 300 nm<$\lambda$<400 nm. When irradiation with UV light of wavelength $\lambda$ of more than 340 nm is desired, UV exposure can be carried out using a cut-off filter being substantially transmissive for wavelengths $\lambda$>340 nm.

"Substantially transmissive" means that the filter transmits a substantial part, preferably at least 50% of the intensity, of incident light of the desired wavelength(s). "Substantially blocking" means that the filter does not transmit a substantial part, preferably at least 50% of the intensity, of incident light of the undesired wavelengths. "Desired (undesired) wavelength" e.g. in case of a band pass filter means the wavelengths inside (outside) the given range of $\lambda$, and in case of a cut-off filter means the wavelengths above (below) the given value of $\lambda$.

This preferred process enables the manufacture of displays by using longer UV wavelengths, thereby reducing or even avoiding the hazardous and damaging effects of short UV light components.

UV radiation energy is preferably from 6 to 100 J, depending on the production process conditions.

Preferably the LC medium according to the present invention does essentially consist of a polymerisable component A) and an LC component B) (or LC host mixture) as described above and below. However, the LC medium may additionally comprise one or more further components or additives, preferably selected from the list including but not limited to co-monomers, chiral dopants, polymerisation initiators, inhibitors, stabilizers, surfactants, wetting agents, lubricating agents, dispersing agents, hydrophobing agents, adhesive agents, flow improvers, defoaming agents, deaerators, diluents, reactive diluents, auxiliaries, colourants, dyes, pigments and nanoparticles.

Preference is given to LC media in which the polymerisable component A) consists exclusively of at least one polymerisable compound selected from formulae F1-F2 and at least one polymerisable compound selected from formulae S1-S3.

Preferably the proportion of the entire polymerisable component A) in the LC medium is from >0 to ≤5%, very preferably from >0 to ≤1%, most preferably from 0.05 to 0.5%.

Preferably the proportion of the LC component B) in the LC medium is from 95 to <100%, very preferably from 99 to <100%.

Besides the polymerisable component A) as described above, the LC media according to the present invention comprise an LC component B), or LC host mixture, comprising one or more, preferably two or more LC compounds which are selected from low-molecular-weight compounds that are unpolymerisable. These LC compounds are selected such that they stable and/or unreactive to a polymerisation reaction under the conditions applied to the polymerisation of the polymerisable compounds.

Examples of these compounds are the compounds shown below.

Preference is given to LC media in which the LC component B), or the LC host mixture, has a nematic LC phase, and preferably has no chiral liquid crystal phase.

Preference is furthermore given to achiral polymerisable compounds, and to LC media in which the compounds of component A) and/or B) are selected exclusively from the group consisting of achiral compounds.

The LC component B), or LC host mixture, is preferably a nematic LC mixture.

In a preferred embodiment the LC medium contains an LC component B), or LC host mixture, based on compounds with negative dielectric anisotropy. Such LC media are especially suitable for use in PS-VA and PS-UB-FFS displays. Particularly preferred embodiments of such an LC medium are those of sections a)-z4) below:

a) LC medium wherein the component B) or LC host mixture comprises one or more compounds selected from formulae CY and PY:

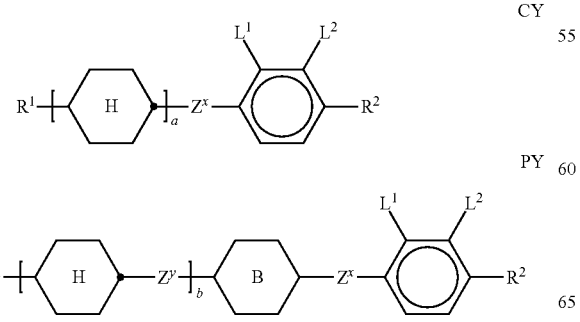

wherein
a denotes 1 or 2,
b denotes 0 or 1,

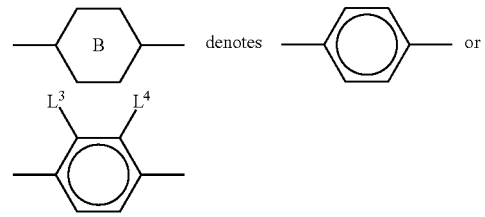

$R^1$ and $R^2$ each, independently of one another, denote alkyl having 1 to 12 C atoms, where, in addition, one or two non-adjacent $CH_2$ groups may be replaced by —O—, —CH=CH—, —CO—, —OCO— or —COO— in such a way that O atoms are not linked directly to one another, preferably alkyl or alkoxy having 1 to 6 C atoms, $Z^x$ and $Z^y$ each, independently of one another, denote —$CH_2CH_2$—, —CH=CH—, —$CF_2O$—, —$OCF_2$—, —$CH_2O$—, —$OCH_2$—, —CO—O—, —O—CO—, —$C_2F_4$—, —CF=CF—, —CH=CH—$CH_2O$— or a single bond, preferably a single bond, $L^{1-4}$ each, independently of one another, denote F, Cl, $OCF_3$, $CF_3$, $CH_3$, $CH_2F$, $CHF_2$.

Preferably, both $L^1$ and $L^2$ denote F or one of $L^1$ and $L^2$ denotes F and the other denotes Cl, or both $L^3$ and $L^4$ denote F or one of $L^3$ and $L^4$ denotes F and the other denotes Cl.

The compounds of the formula CY are preferably selected from the group consisting of the following sub-formulae:

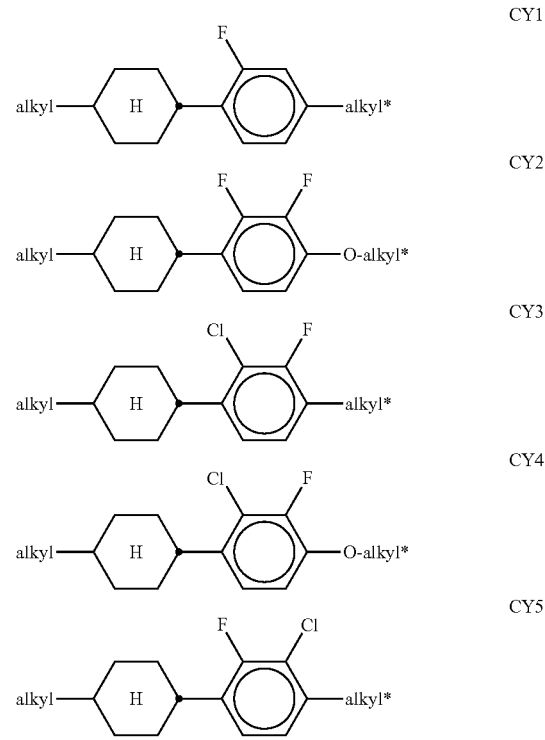

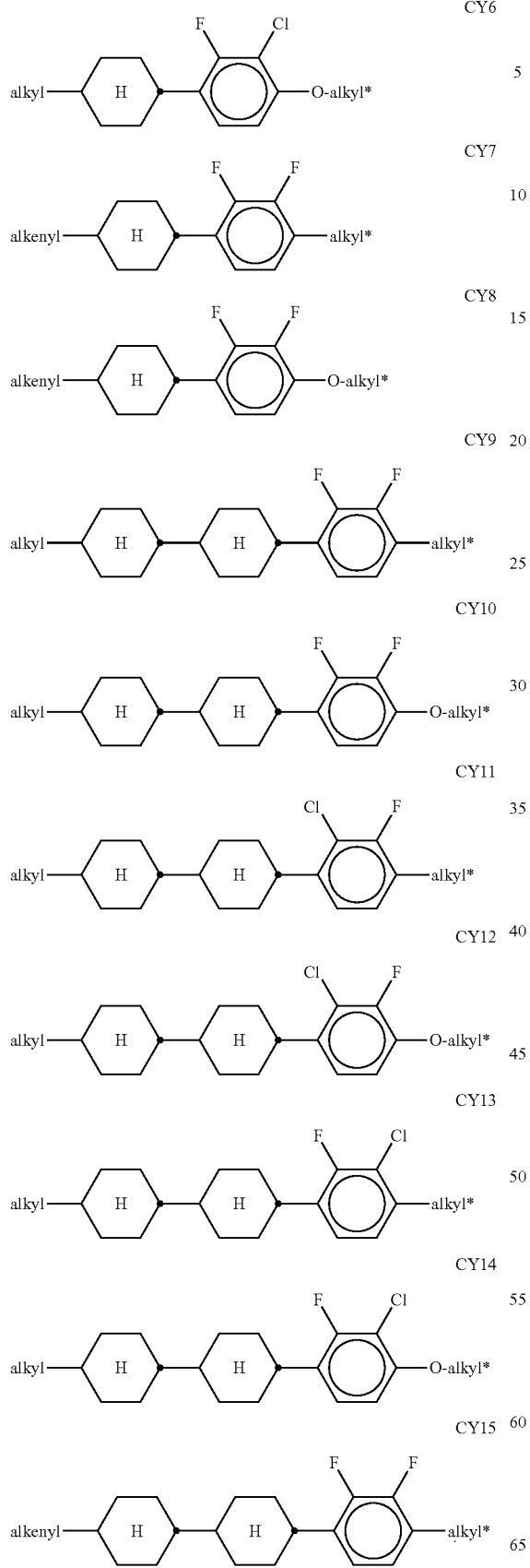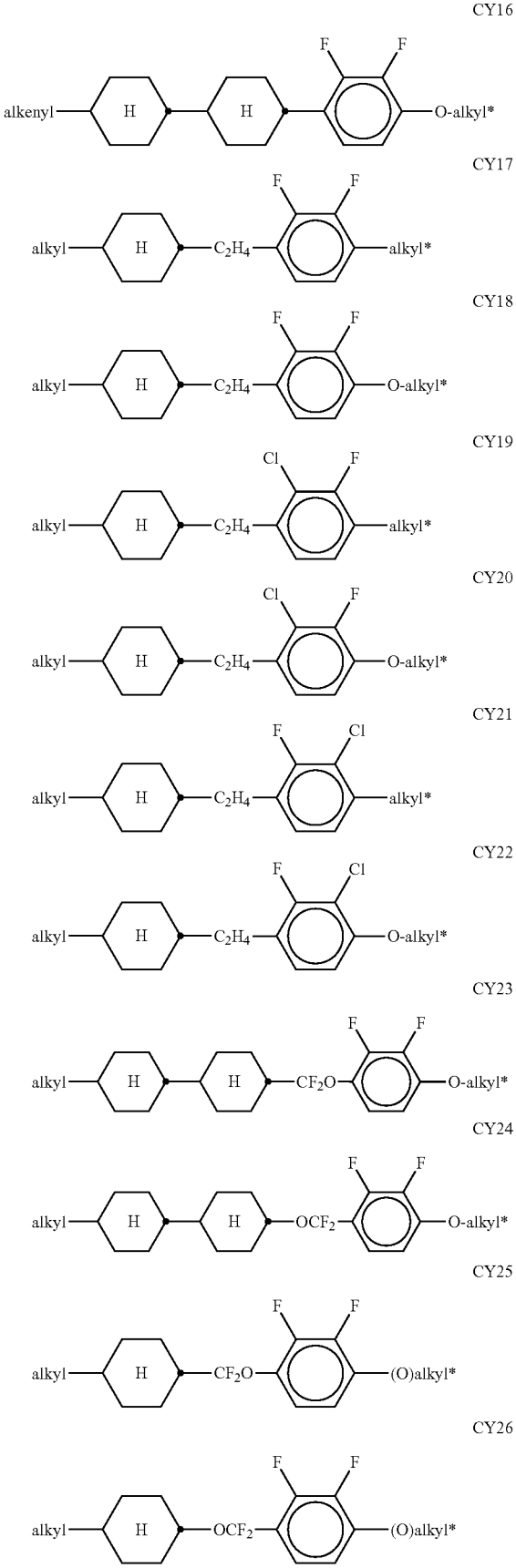

-continued

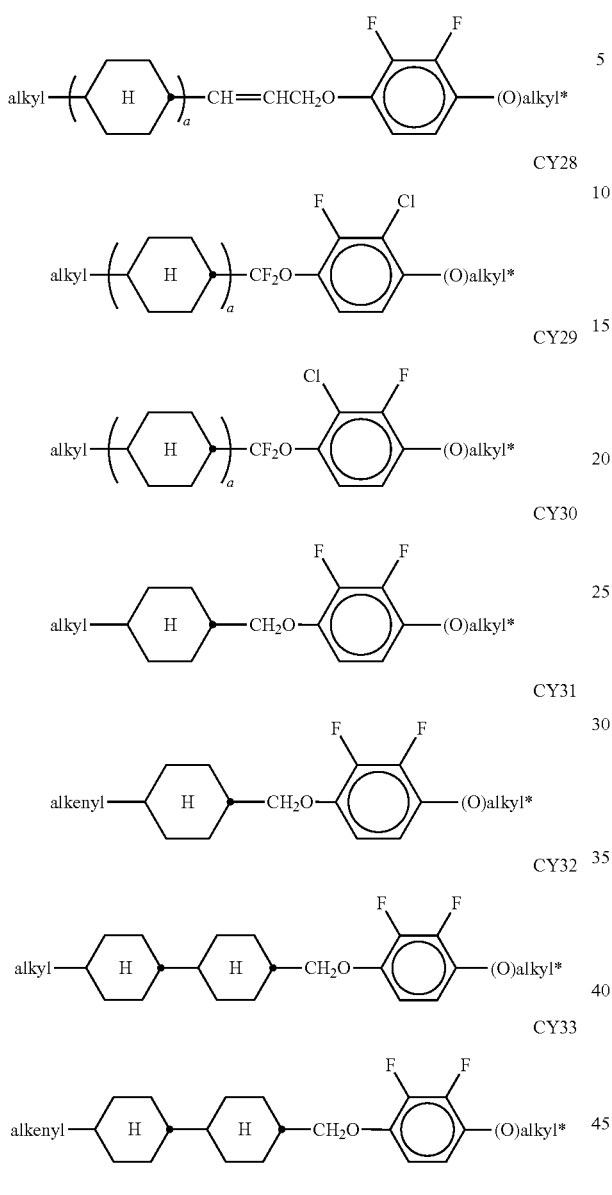

in which a denotes 1 or 2, alkyl and alkyl* each, independently of one another, denote a straight-chain alkyl radical having 1-6 C atoms, and alkenyl denotes a straight-chain alkenyl radical having 2-6 C atoms, and (O) denotes an oxygen atom or a single bond. Alkenyl preferably denotes $CH_2=CH-$, $CH_2=CHCH_2CH_2-$, $CH_3-CH=CH-$, $CH_3-CH_2-CH=CH-$, $CH_3-(CH_2)_2-CH=CH-$, $CH_3-(CH_2)_3-CH=CH-$ or $CH_3-CH=CH-(CH_2)_2-$.

Especially preferred are compounds selected from formulae CY2, CY8, CY10 and CY16, very preferably those of formula CY2 and CY10.

The compounds of the formula PY are preferably selected from the group consisting of the following sub-formulae:

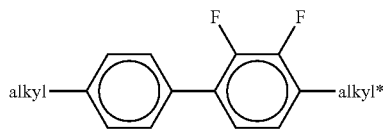
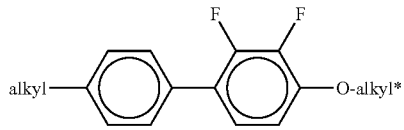
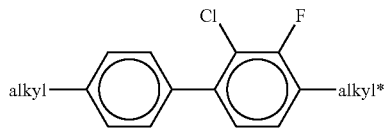
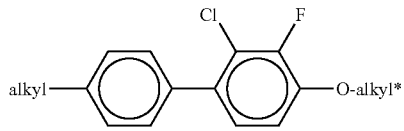
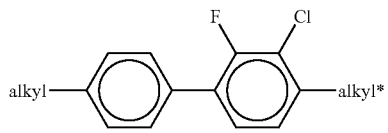
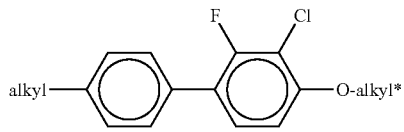
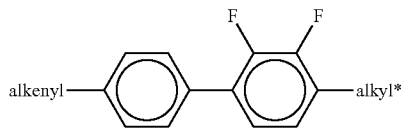
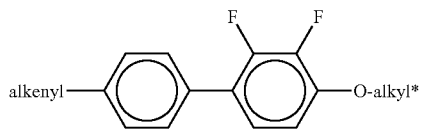
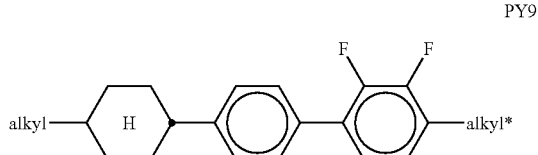
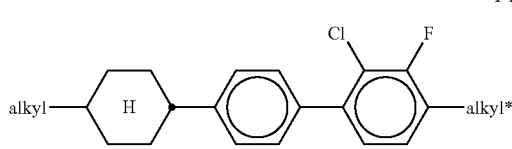

-continued

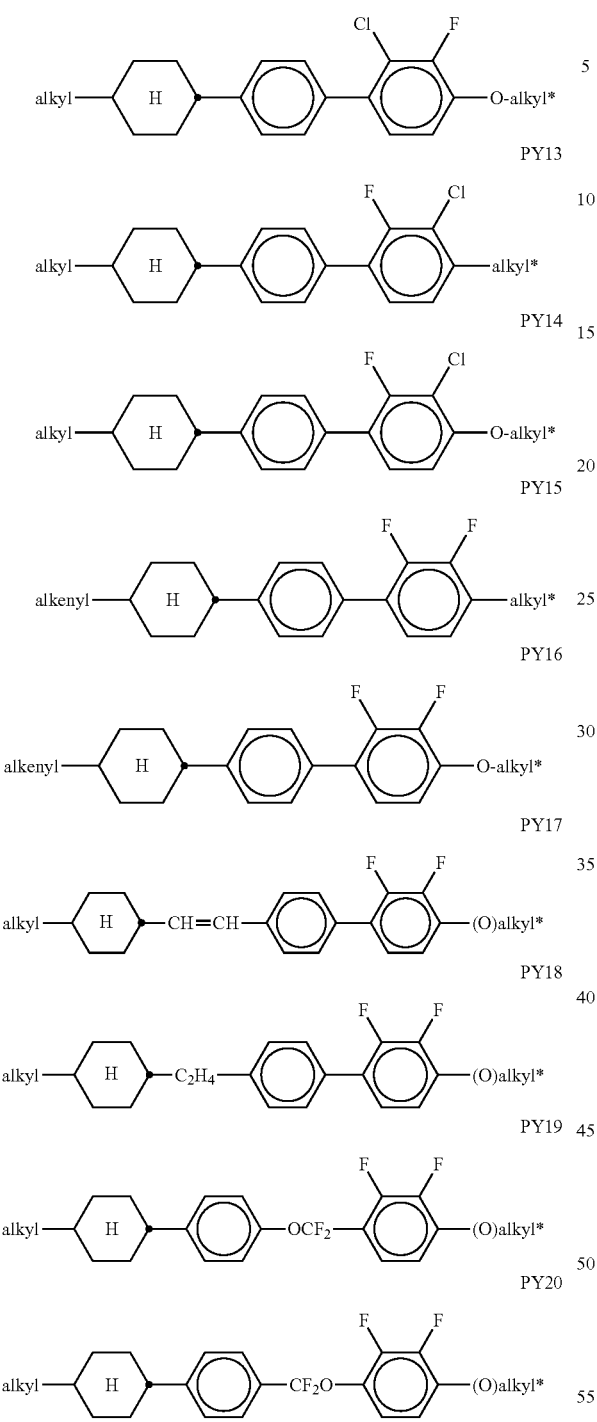

in which alkyl and alkyl* each, independently of one another, denote a straight-chain alkyl radical having 1-6 C atoms, and alkenyl denotes a straight-chain alkenyl radical having 2-6 C atoms, and (O) denotes an oxygen atom or a single bond. Alkenyl preferably denotes CH$_2$=CH—, CH$_2$=CHCH$_2$CH$_2$—, CH$_3$—CH=CH—, CH$_3$—CH$_2$—CH=CH—, CH$_3$—(CH$_2$)$_2$—CH=CH—, CH$_3$—(CH$_2$)$_3$—CH=CH— or CH$_3$—CH=CH—(CH$_2$)$_2$—.

Especially preferred are compounds selected from formulae PY2, PY8, PY10 and PY16, very preferably those of formula PY2 and PY10.

Preferably the component B) or LC host mixture comprises one or more compounds of formula PY2, preferably in an amount from 1 to 20%, very preferably from 8 to 20% by weight.

b) LC medium wherein the component B) or LC host mixture comprises one or more mesogenic or LC compounds comprising an alkenyl group (hereinafter also referred to as "alkenyl compounds"), wherein said alkenyl group is stable to a polymerisation reaction under the conditions used for polymerisation of the polymerisable compounds contained in the LC medium.

Preferably the component B) or LC host mixture comprises one or more alkenyl compounds selected from formulae AN and AY

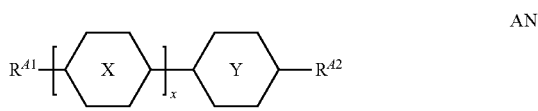

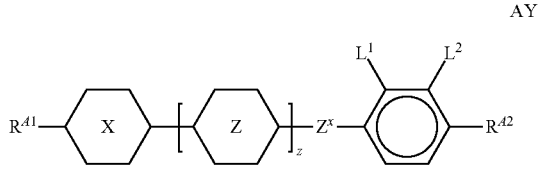

in which the individual radicals, on each occurrence identically or differently, and each, independently of one another, have the following meaning:

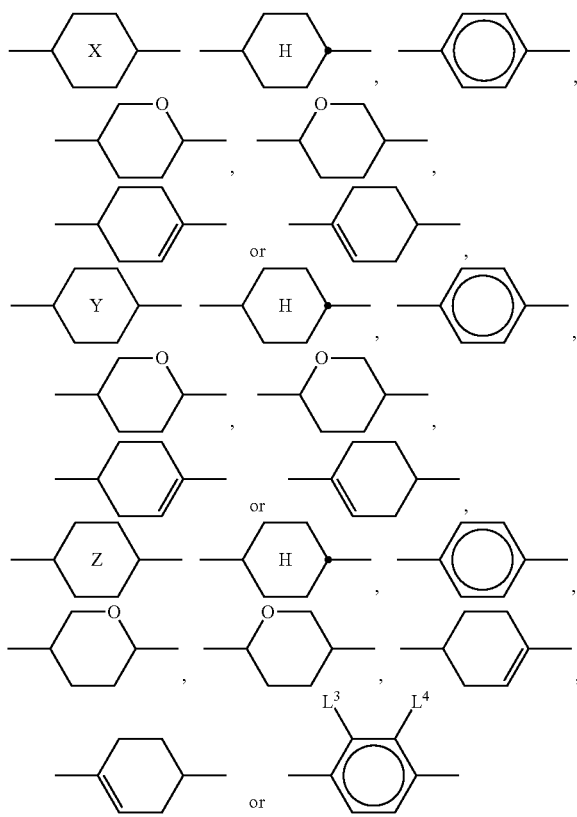

$R^{A1}$ alkenyl having 2 to 9 C atoms or, if at least one of the rings X, Y and Z denotes cyclohexenyl, also one of the meanings of $R^{A2}$, $R^{A2}$ alkyl having 1 to 12 C atoms, in which, in addition, one or two non-adjacent CH$_2$ groups may be replaced by —O—, —CH=CH—, —CO—, —OCO— or —COO— in such a way that O atoms are not linked directly to one another, $Z^x$ —CH$_2$CH$_2$—, —CH=CH—, —CF$_2$O—, —OCF$_2$—, —CH$_2$O—, —OCH$_2$—, —CO—O—, —O—CO—, —C$_2$F$_4$—, —CF=CF—, —CH=CH—CH$_2$O—, or a single bond, preferably a single bond, $L^{1,2}$ H, F, Cl, OCF$_3$, CF$_3$, CH$_3$, CH$_2$F or CHF$_2$H, preferably H, F or Cl, x 1 or 2, z 0 or 1.

Preferred compounds of formula AN and AY are those wherein $R^{A2}$ is selected from ethenyl, propenyl, butenyl, pentenyl, hexenyl and heptenyl.

In a preferred embodiment the component B) or LC host mixture comprises one or more compounds of formula AN selected from the following sub-formulae:

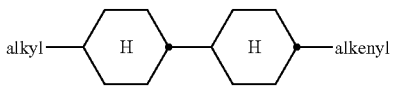
AN1

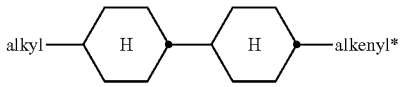
AN2

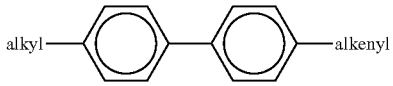
AN3

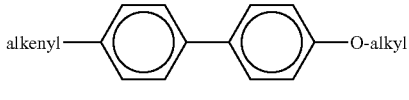
AN4

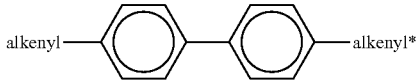
AN5

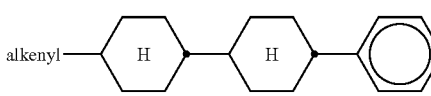
AN6

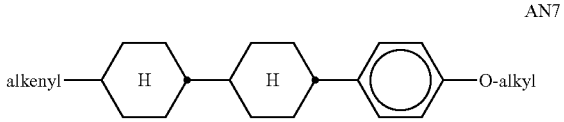
AN7

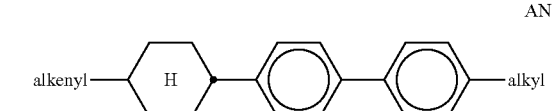
AN8

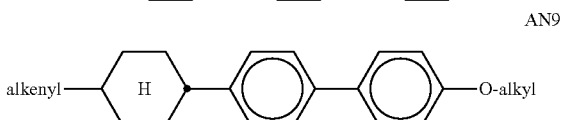
AN9

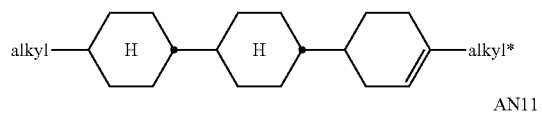
AN10

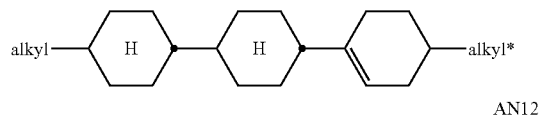
AN11

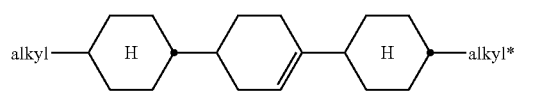
AN12 in which alkyl and alkyl* each, independently of one another, denote a straight-chain alkyl radical having 1-6 C atoms, and alkenyl and alkenyl* each, independently of one another, denote a straight-chain alkenyl radical having 2-7 C atoms. Alkenyl and alkenyl* preferably denote CH$_2$=CH—, CH$_2$=CHCH$_2$CH$_2$—, CH$_3$—CH=CH—, CH$_3$—CH$_2$—CH=CH—, CH$_3$—(CH$_2$)$_2$—CH=CH—, CH$_3$—(CH$_2$)$_3$—CH=CH— or CH$_3$—CH=CH—(CH$_2$)$_2$—.

Preferably the the component B) or LC host mixture comprises one or more compounds selected from formulae AN1, AN2, AN3 and AN6, very preferably one or more compounds of formula AN1.

In another preferred embodiment the component B) or LC host mixture comprises one or more compounds of formula AN selected from the following sub-formulae:

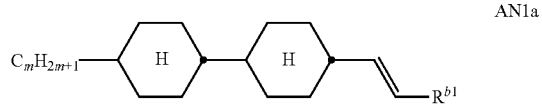
AN1a

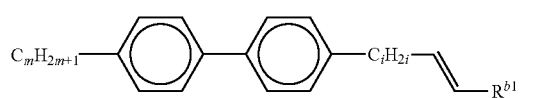
AN3a

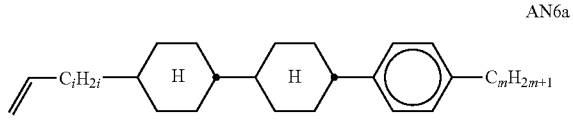
AN6a in which m denotes 1, 2, 3, 4, 5 or 6, i denotes 0, 1, 2 or 3, and $R^{b1}$ denotes H, CH$_3$ or C$_2$H$_5$.

In another preferred embodiment the component B) or LC host mixture comprises one or more compounds selected from the following sub-formulae:

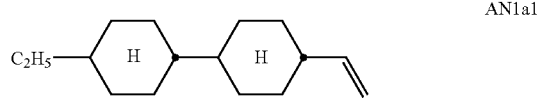
AN1a1

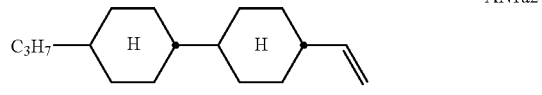
AN1a2

-continued
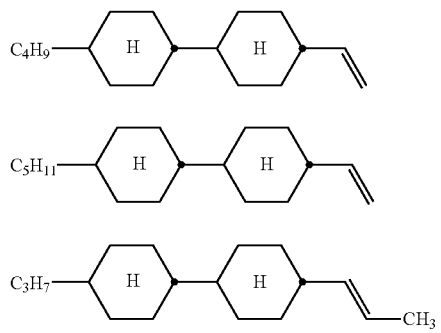
AN1a3
AN1a4
AN1a5
Most preferred are compounds of formula AN1a2 and AN1a5.
In another preferred embodiment the component B) or LC host mixture comprises one or more compounds of formula AY selected from the following sub-formulae:
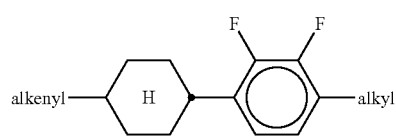
AY1
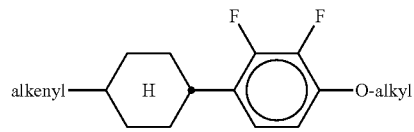
AY2
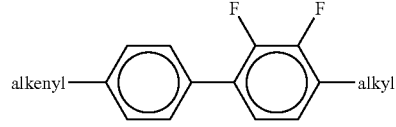
AY3
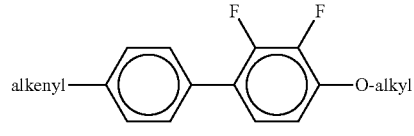
AY4
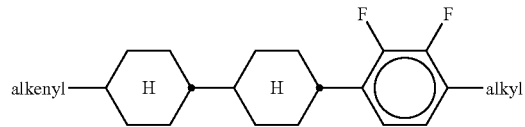
AY5
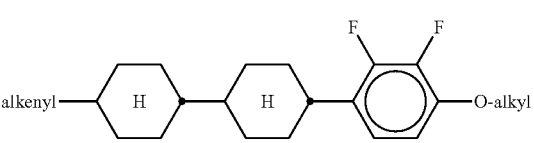
AY6
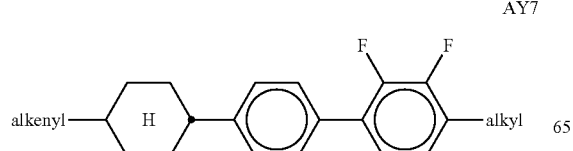
AY7
-continued
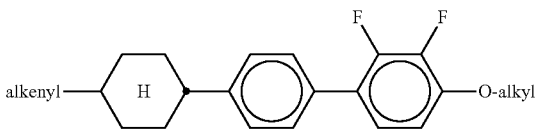
AY8
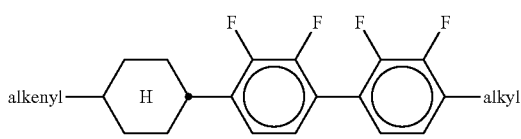
AY9
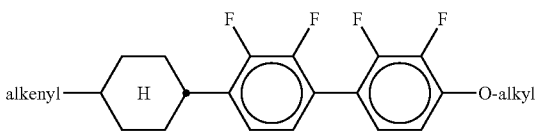
AY10
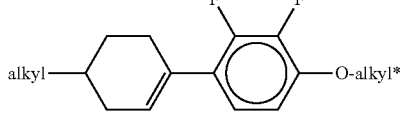
AY11
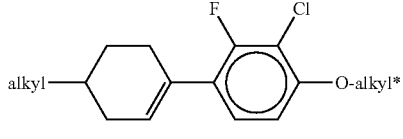
AY12
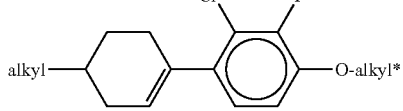
AY13
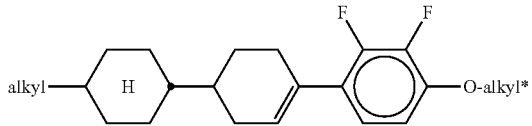
AY14
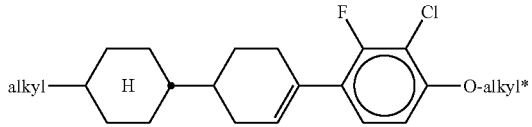
AY15
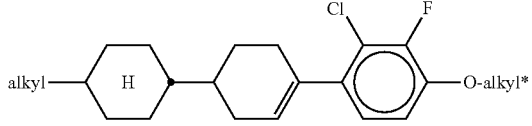
AY16
AY17

AY18
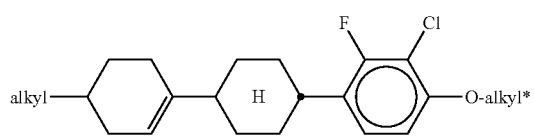

AY19
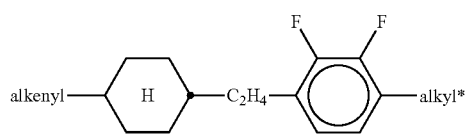

AY20
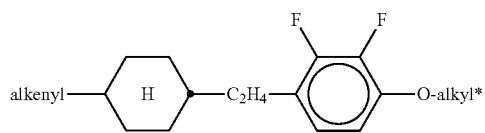

AY21
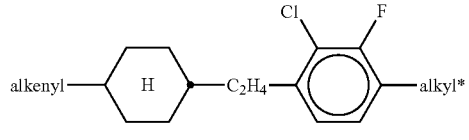

AY22
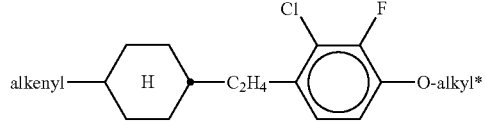

AY23
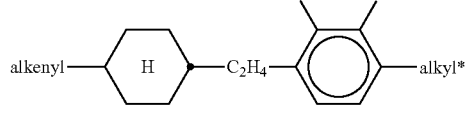

AY24
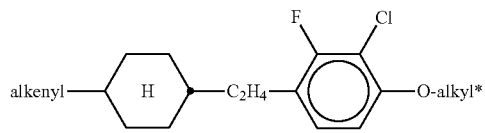

AY25
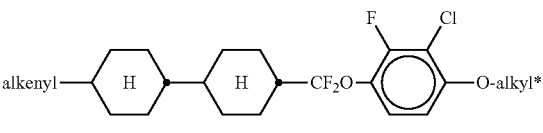

AY26
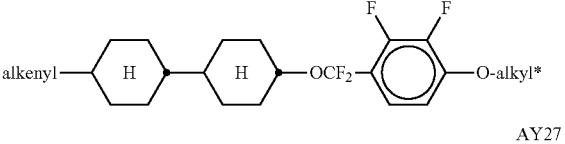

AY27
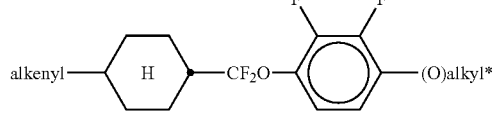

AY28
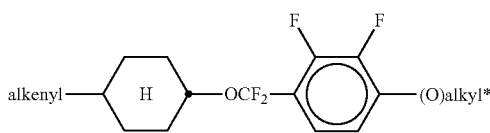

AY29
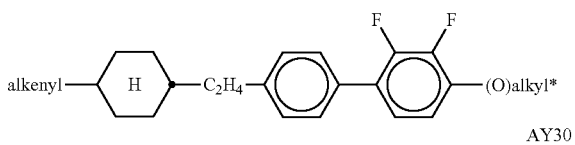

AY30
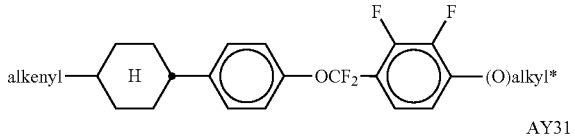

AY31
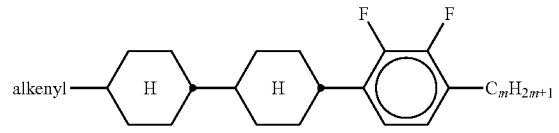

in which alkyl and alkyl* each, independently of one another, denote a straight-chain alkyl radical having 1-6 C atoms, "(O)" denotes an O-atom or a single bond, and alkenyl and alkenyl* each, independently of one another, denote a straight-chain alkenyl radical having 2-7 C atoms. Alkenyl and alkenyl* preferably denote $CH_2$=CH—, $CH_2$=CHCH$_2$CH$_2$—, $CH_3$—CH=CH—, $CH_3$—CH$_2$—CH=CH—, $CH_3$—(CH$_2$)$_2$—CH=CH—, $CH_3$—(CH$_2$)$_3$—CH=CH— or $CH_3$—CH=CH—(CH$_2$)$_2$—.

In another preferred embodiment the component B) or LC host mixture comprises one or more compounds of formula AY selected from the following sub-formulae:

AY5a
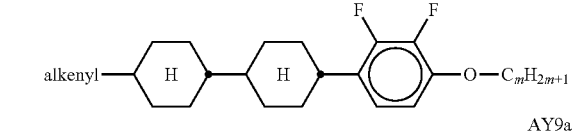

AY6a

AY9a
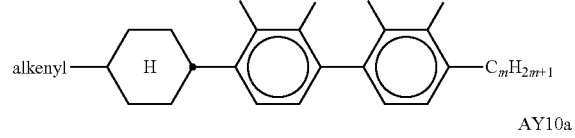

AY10a
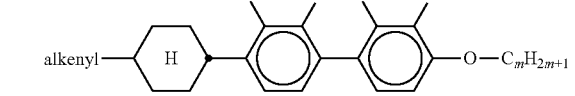

-continued

AY11a
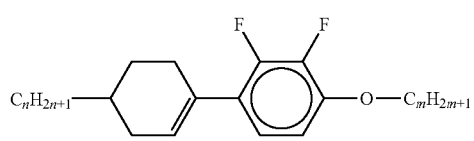

AY14a
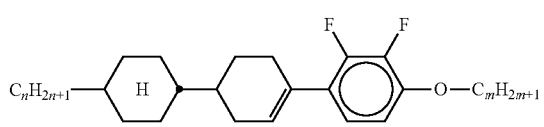

in which m and n each, independently of one another, denote 1, 2, 3, 4, 5 or 6, and alkenyl denotes $CH_2=CH-$, $CH_2=CHCH_2CH_2-$, $CH_3-CH=CH-$, $CH_3-CH_2-CH=CH-$, $CH_3-(CH_2)_2-CH=CH-$, $CH_3-(CH_2)_3-CH=CH-$ or $CH_3-CH=CH-(CH_2)_2-$.

Preferably the proportion of compounds of formula AN and AY in the LC medium is from 2 to 70% by weight, very preferably from 5 to 60% by weight, most preferably from 10 to 50% by weight.

Preferably the LC medium or LC host mixture contains 1 to 5, preferably 1, 2 or 3 compounds selected from formulae AN and AY.

The addition of alkenyl compounds of formula AN and/or AY enables a reduction of the viscosity and response time of the LC medium.

c) LC medium wherein the component B) or LC host mixture comprises one or more compounds of the following formula:

ZK
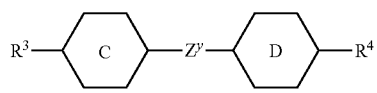

in which the individual radicals have the following meanings:

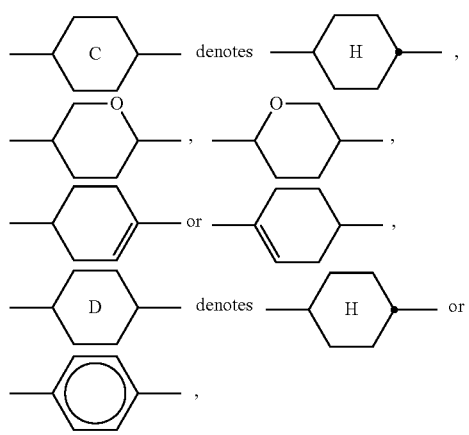

$R^3$ and $R^4$ each, independently of one another, denote alkyl having 1 to 12 C atoms, in which, in addition, one or two non-adjacent $CH_2$ groups may be replaced by $-O-$, $-CH=CH-$, $-CO-$, $-O-CO-$ or $-CO-O-$ in such a way that O atoms are not linked directly to one another, $Z^y$ denotes $-CH_2CH_2-$, $-CH=CH-$, $-CF_2O-$, $-OCF_2-$, $-CH_2O-$, $-OCH_2-$, $-CO-O-$, $-O-CO-$, $-C_2F_4-$, $-CF=CF-$, $-CH=CH-CH_2O-$ or a single bond, preferably a single bond.

The compounds of the formula ZK are preferably selected from the group consisting of the following sub-formulae:

ZK1
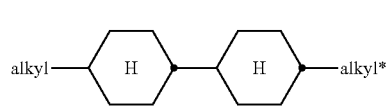

ZK2
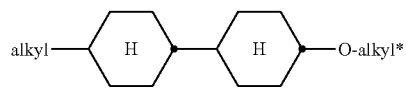

ZK3
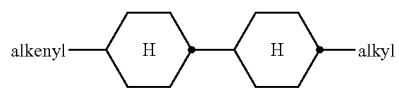

ZK4
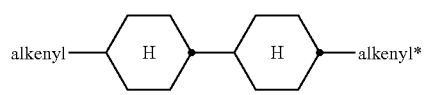

ZK5
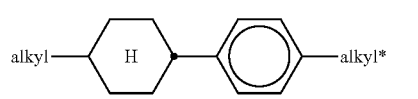

ZK6
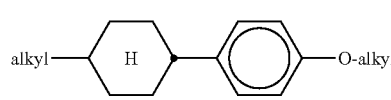

ZK7
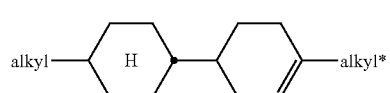

ZK8
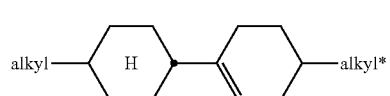

ZK9
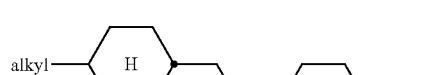

ZK10
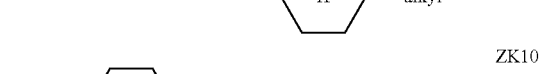

in which alkyl and alkyl* each, independently of one another, denote a straight-chain alkyl radical having 1-6 C atoms, and alkenyl denotes a straight-chain alkenyl radical having 2-6 C atoms. Alkenyl preferably denotes $CH_2=CH-$, $CH_2=CHCH_2CH_2-$, $CH_3-CH=CH-$, $CH_3-CH_2-CH=CH-$, $CH_3-(CH_2)_2-CH=CH-$, $CH_3-(CH_2)_3-CH=CH-$ or $CH_3-CH=CH-(CH_2)_2-$.

Especially preferred are compounds of formula ZK1.

Particularly preferred compounds of formula ZK are selected from the following sub-formulae:

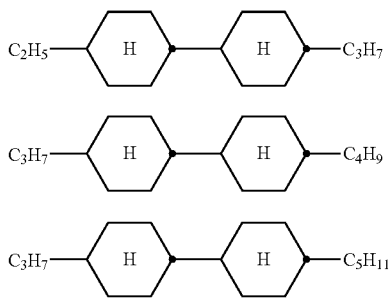

ZK1a, ZK1b, ZK1c wherein the propyl, butyl and pentyl groups are straight-chain groups.

Most preferred are compounds of formula ZK1a.

d) LC medium wherein component B) or the LC host mixture additionally comprises one or more compounds of the following formula:

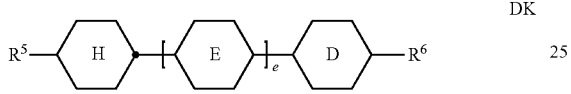

DK in which the individual radicals on each occurrence, identically or differently, have the following meanings:
$R^5$ and $R^6$ each, independently of one another, denote alkyl having 1 to 12 C atoms, where, in addition, one or two non-adjacent CH$_2$ groups may be replaced by —O—, —CH=CH—, —CO—, —OCO— or —COO— in such a way that O atoms are not linked directly to one another, preferably alkyl or alkoxy having 1 to 6 C atoms,

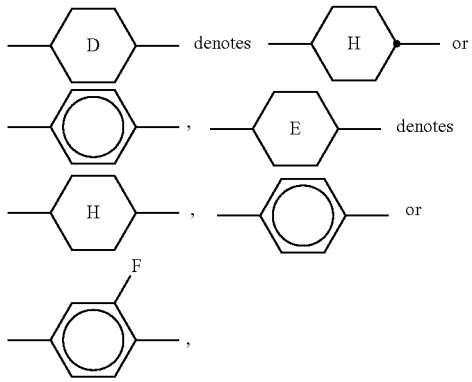

and e denotes 1 or 2.

The compounds of the formula DK are preferably selected from the group consisting of the following sub-formulae:

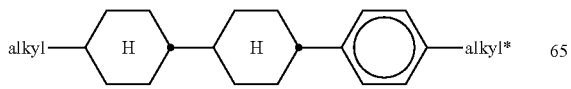

DK1

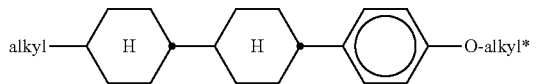

DK2

DK3

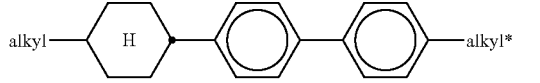

DK4

DK5

DK6

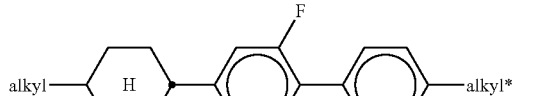

DK7

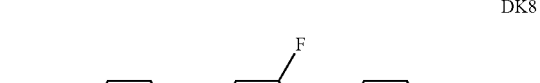

DK8

DK9

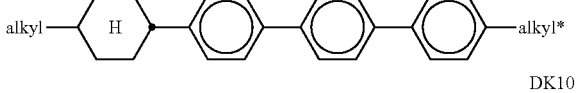

DK10

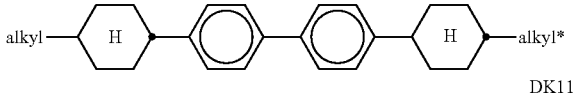

DK11

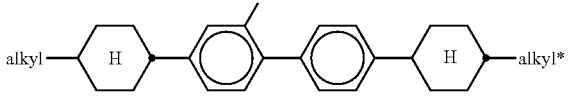

DK12

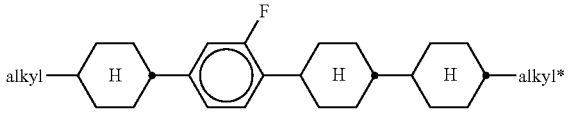

in which alkyl and alkyl* each, independently of one another, denote a straight-chain alkyl radical having 1-6 C atoms, and alkenyl denotes a straight-chain alkenyl radical having 2-6 C atoms. Alkenyl preferably denotes CH$_2$=CH—, CH$_2$=CHCH$_2$CH$_2$—, CH$_3$—CH=CH—, CH$_3$—CH$_2$—CH=CH—, CH$_3$—

(CH$_2$)$_2$—CH=CH—, CH$_3$—(CH$_2$)$_3$—CH=CH— or CH$_3$—CH=CH—(CH$_2$)$_2$—.

e) LC medium wherein component B) or the LC host mixture additionally comprises one or more compounds of the following formula:

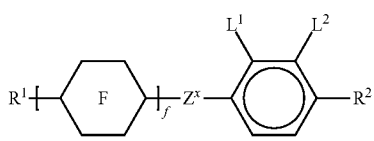
LY in which the individual radicals have the following meanings:

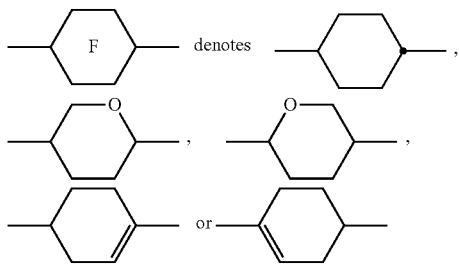

with at least one ring F being different from cyclohexylene, f denotes 1 or 2,

R$^1$ and R$^2$ each, independently of one another, denote alkyl having 1 to 12 C atoms, where, in addition, one or two non-adjacent CH$_2$ groups may be replaced by —O—, —CH=CH—, —CO—, —OCO— or —COO— in such a way that O atoms are not linked directly to one another, Z$^x$ denotes —CH$_2$CH$_2$-, —CH=CH—, —CF$_2$O—, —OCF$_2$—, —CH$_2$O—, —OCH$_2$—, —CO—O—, —O—CO—, —C$_2$F$_4$—, —CF=CF—, —CH=CH—CH$_2$O— or a single bond, preferably a single bond, L$^1$ and L$^2$ each, independently of one another, denote F, Cl, OCF$_3$, CF$_3$, CH$_3$, CH$_2$F, CHF$_2$.

Preferably, both radicals L$^1$ and L$^2$ denote F or one of the radicals L$^1$ and L$^2$ denotes F and the other denotes Cl.

The compounds of the formula LY are preferably selected from the group consisting of the following sub-formulae:

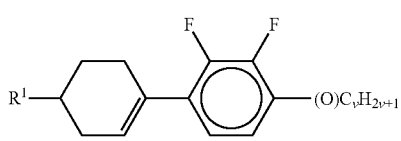
LY1

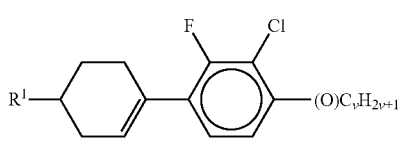
LY2

-continued

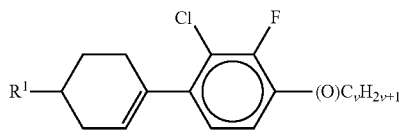
LY3

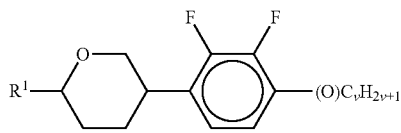
LY4

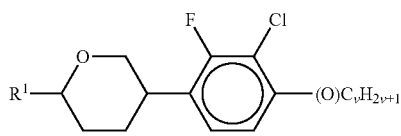
LY5

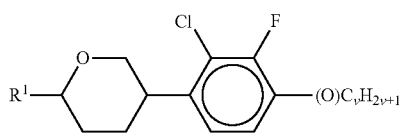
LY6

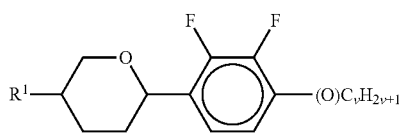
LY7

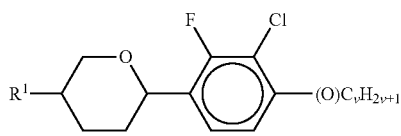
LY8

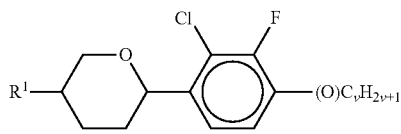
LY9

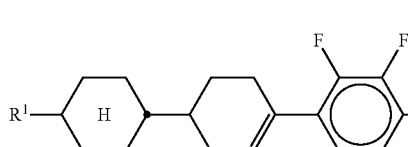
LY10

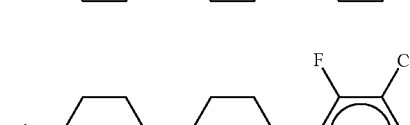
LY11

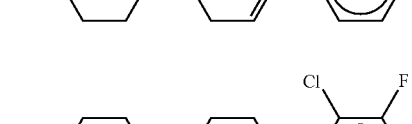
LY12

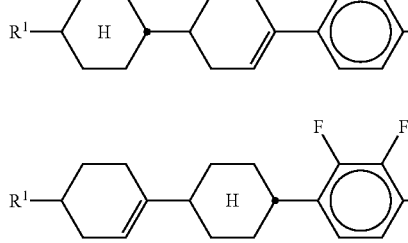
LY13

LY14 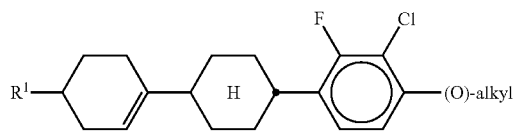

LY15 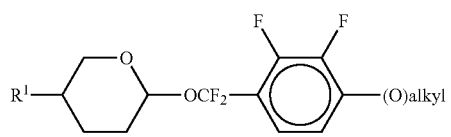

LY16 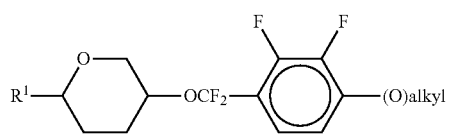

LY17 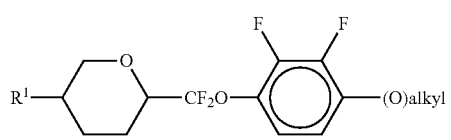

LY18 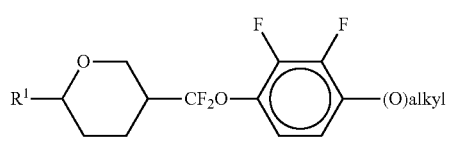

LY19 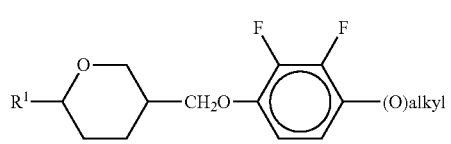

LY20 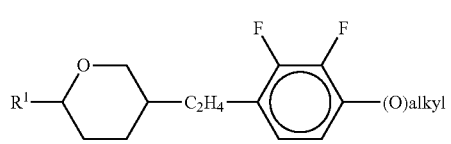

LY21 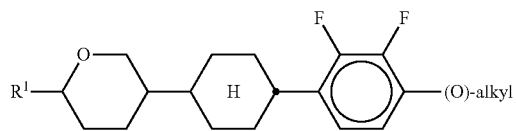

LY22 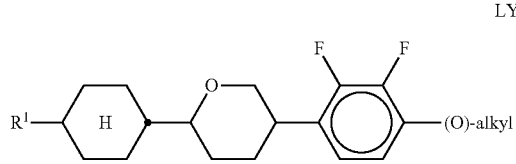

LY23 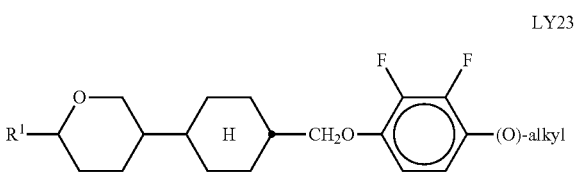

LY24 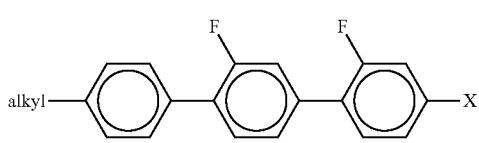

in which $R^1$ has the meaning indicated above, alkyl denotes a straight-chain alkyl radical having 1-6 C atoms, (O) denotes an oxygen atom or a single bond, and v denotes an integer from 1 to 6. $R^1$ preferably denotes straight-chain alkyl having 1 to 6 C atoms or straight-chain alkenyl having 2 to 6 C atoms, in particular $CH_3$, $C_2H_5$, $n\text{-}C_3H_7$, $n\text{-}C_4H_9$, $n\text{-}C_5H_{11}$, $CH_2=CH-$, $CH_2=CHCH_2CH_2-$, $CH_3-CH=CH-$, $CH_3-CH_2-CH=CH-$, $CH_3-(CH_2)_2-CH=CH-$, $CH_3-(CH_2)_3-CH=CH-$ or $CH_3-CH=CH-(CH_2)_2-$.

Especially preferably the component B) or LC host mixture comprises one or more compounds of formula LY10.

f) LC medium wherein component B) or the LC host mixture additionally comprises one or more compounds selected from the group consisting of the following formulae:

G1 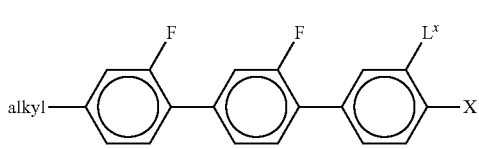

G2 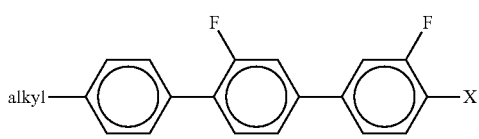

G3 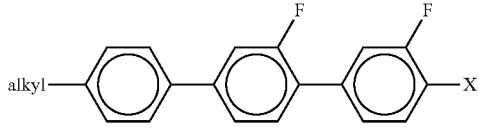

G4 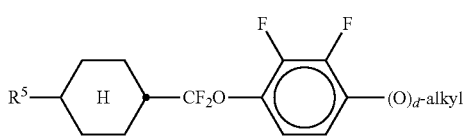

in which alkyl denotes $C_{1\text{-}6}$-alkyl, $L^x$ denotes H or F, and X denotes F, Cl, $OCF_3$, $OCHF_2$ or $OCH=CF_2$. Particular preference is given to compounds of the formula G1 in which X denotes F.

g) LC medium wherein component B) or the LC host mixture additionally comprises one or more compounds selected from the group consisting of the following formulae:

Y1

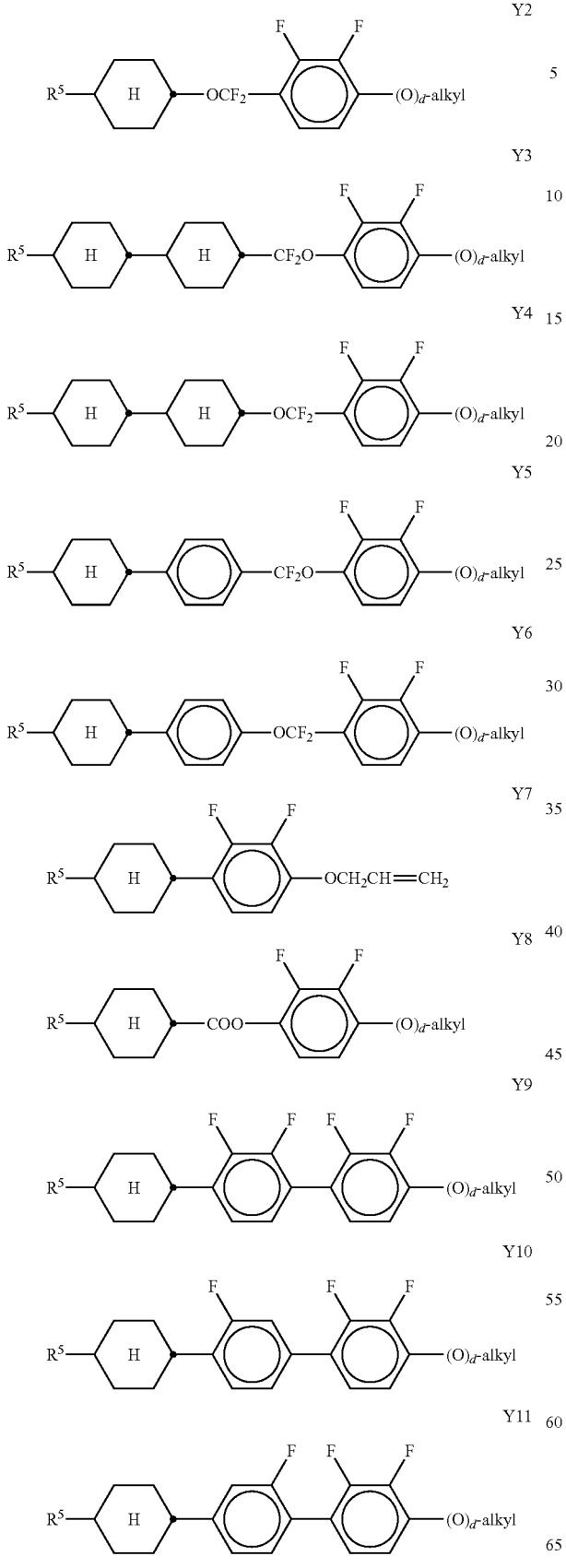

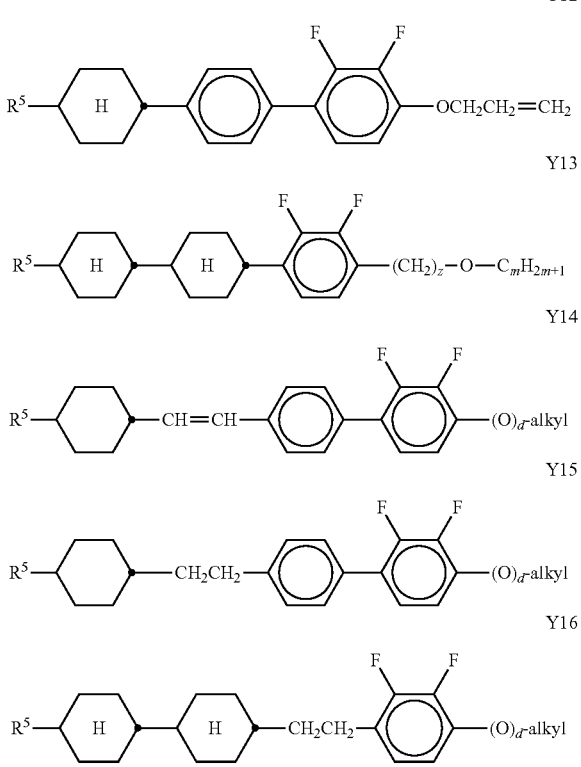

in which $R^5$ has one of the meanings indicated above for $R^1$, alkyl denotes $C_{1-6}$-alkyl, d denotes 0 or 1, and z and m each, independently of one another, denote an integer from 1 to 6. $R^5$ in these compounds is particularly preferably $C_{1-6}$-alkyl or -alkoxy or $C_{2-6}$-alkenyl, d is preferably 1. The LC medium according to the invention preferably comprises one or more compounds of the above-mentioned formulae in amounts of ≥5% by weight.

h) LC medium wherein component B) or the LC host mixture additionally comprises one or more biphenyl compounds selected from the group consisting of the following formulae:

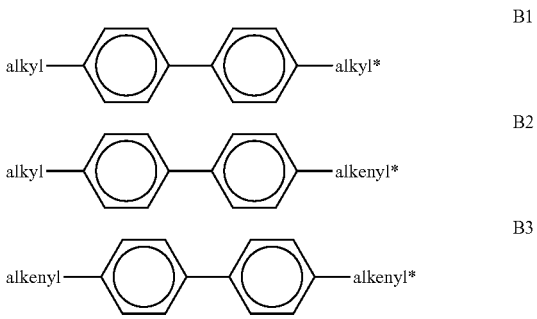

in which alkyl and alkyl* each, independently of one another, denote a straight-chain alkyl radical having 1-6 C atoms, and alkenyl and alkenyl* each, independently of one another, denote a straight-chain alkenyl radical having 2-6 C atoms. Alkenyl and alkenyl* preferably denote $CH_2$=CH—, $CH_2$=CHCH$_2$CH$_2$—, $CH_3$—

CH=CH—, CH₃—CH₂—CH=CH—, CH₃—(CH₂)₂—CH=CH—, CH₃—(CH₂)₃—CH=CH— or CH₃—CH=CH—(CH₂)₂—.

The proportion of the biphenyls of the formulae B1 to B3 in the LC host mixture is preferably at least 3% by weight, in particular ≥5% by weight.

The compounds of the formula B2 are particularly preferred.

The compounds of the formulae B1 to B3 are preferably selected from the group consisting of the following sub-formulae:

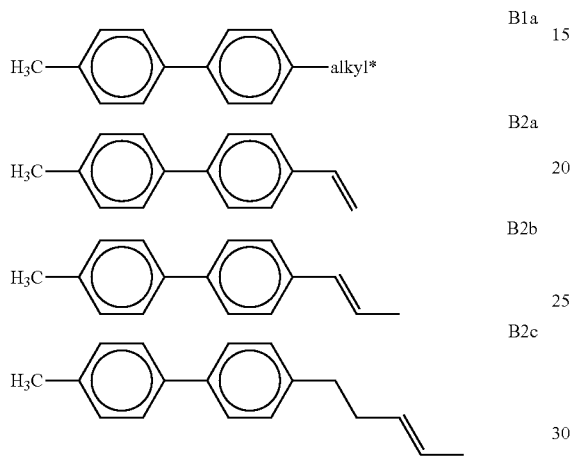

in which alkyl* denotes an alkyl radical having 1-6 C atoms. The medium according to the invention particularly preferably comprises one or more compounds of the formulae B1a and/or B2c.

i) LC medium wherein component B) or the LC host mixture additionally comprises one or more terphenyl compounds of the following formula:

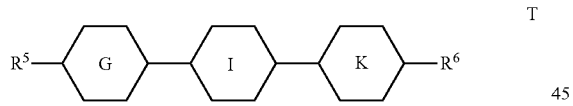

in which $R^5$ and $R^6$ each, independently of one another, have one of the meanings indicated above, and

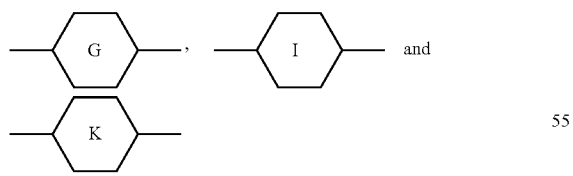

each, independently of one another, denote

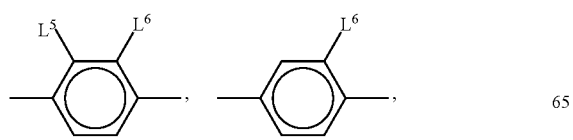

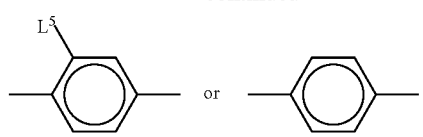

in which $L^5$ denotes F or Cl, preferably F, and $L^6$ denotes F, Cl, OCF₃, CF₃, CH₃, CH₂F or CHF₂, preferably F.

The compounds of the formula T are preferably selected from the group consisting of the following sub-formulae:

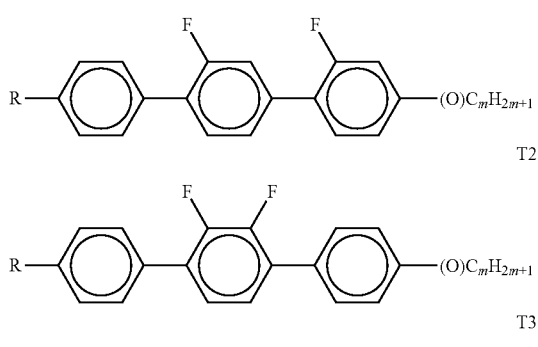

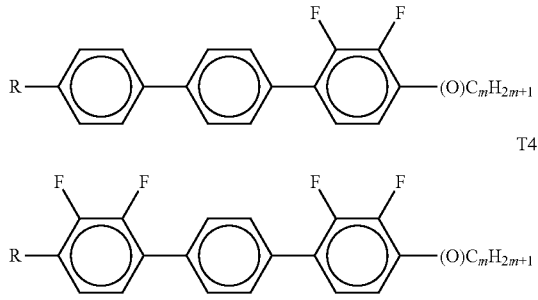

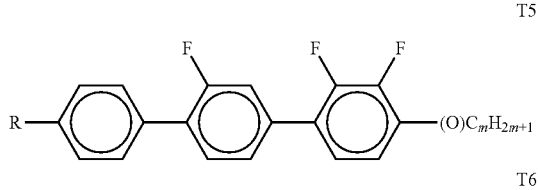

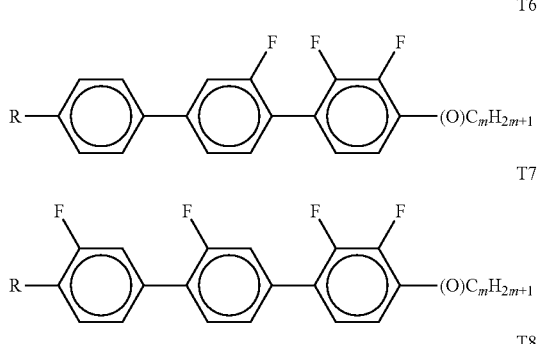

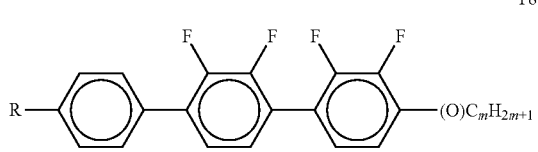

T9
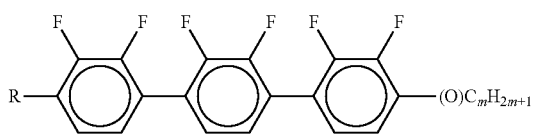

T10
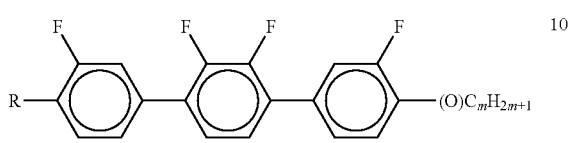

T11
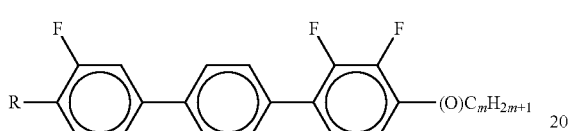

T12
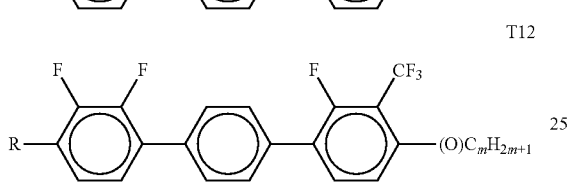

T13
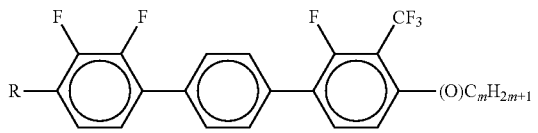

T14
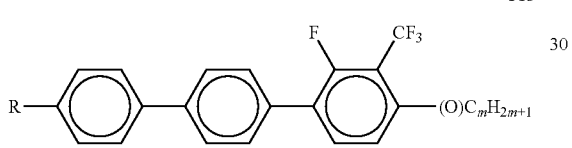

T15
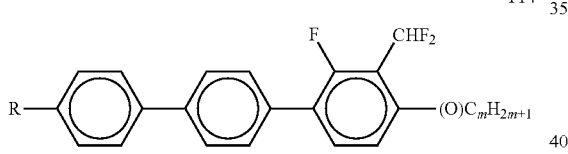

T16
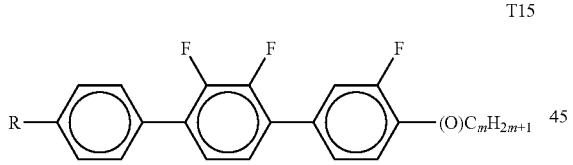

T17
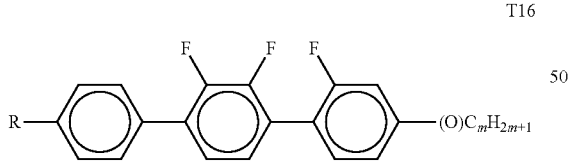

T18
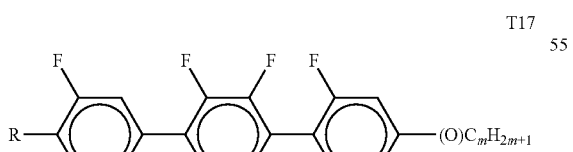

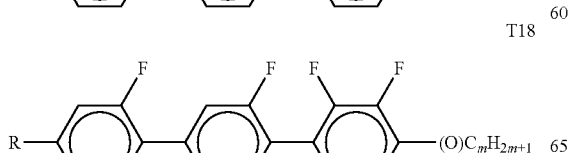

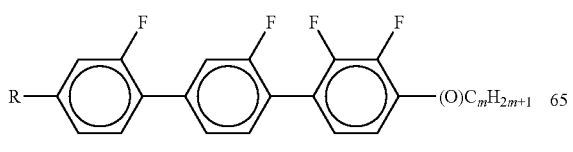

T19
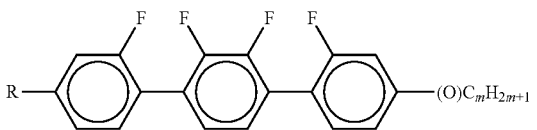

T20
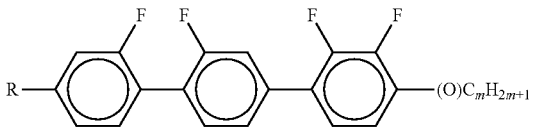

T21
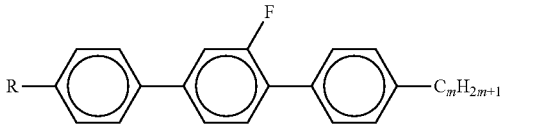

T22
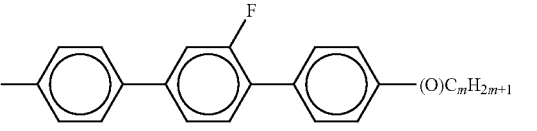

T23
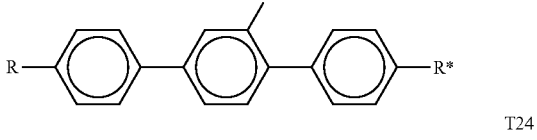

T24
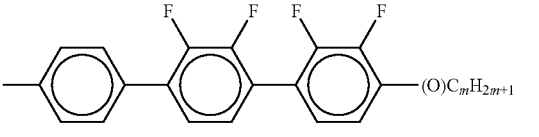

in which R denotes a straight-chain alkyl or alkoxy radical having 1-7 C atoms, R* denotes a straight-chain alkenyl radical having 2-7 C atoms, (O) denotes an oxygen atom or a single bond, and m denotes an integer from 1 to 6. R* preferably denotes $CH_2\!=\!CH\!-\!$, $CH_2\!=\!CHCH_2CH_2\!-\!$, $CH_3\!-\!CH\!=\!CH\!-\!$, $CH_3\!-\!CH_2\!-\!CH\!=\!CH\!-\!$, $CH_3\!-\!(CH_2)_2\!-\!CH\!=\!CH\!-\!$, $CH_3\!-\!(CH_2)_3\!-\!CH\!=\!CH\!-\!$ or $CH_3\!-\!CH\!=\!CH\!-\!(CH_2)_2\!-\!$.

R preferably denotes methyl, ethyl, propyl, butyl, pentyl, hexyl, methoxy, ethoxy, propoxy, butoxy or pentoxy.

The LC host mixture according to the invention preferably comprises the terphenyls of the formula T and the preferred sub-formulae thereof in an amount of 0.5-30% by weight, in particular 1-20% by weight.

Very preferred are compounds of formulae T1, T2, T3, T5 and T21, especially those of formula T1 and T2 and T5. In these compounds, R preferably denotes alkyl, furthermore alkoxy, each having 1-5 C atoms.

The terphenyls are preferably employed in LC media according to the invention if the Δn value of the mixture is to be ≥0.1. Preferred LC media comprise 2-20% by weight of one or more terphenyl compounds of the formula T, preferably selected from the group of compounds T1 to T24.

k) LC medium wherein component B) or the LC host mixture additionally comprises one or more quaterphenyl compounds selected from the group consisting of the following formulae:

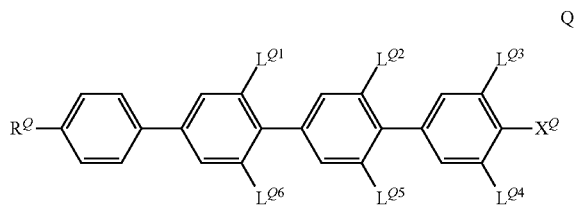

Q wherein
R$^Q$ is alkyl, alkoxy, oxaalkyl or alkoxyalkyl having 1 to 9 C atoms or alkenyl or alkenyloxy having 2 to 9 C atoms, all of which are optionally fluorinated,
X$^Q$ is F, Cl, halogenated alkyl or alkoxy having 1 to 6 C atoms or halogenated alkenyl or alkenyloxy having 2 to 6 C atoms,
L$^{Q1}$ to L$^{Q6}$ independently of each other are H or F, with at least one of L$^{Q1}$ to L$^{Q6}$ being F.
Preferred compounds of formula Q are those wherein R$^Q$ denotes straight-chain alkyl with 2 to 6 C-atoms, very preferably ethyl, n-propyl or n-butyl.
Preferred compounds of formula Q are those wherein L$^{Q3}$ and L$^{Q4}$ are F. Further preferred compounds of formula Q are those wherein L$^{Q3}$, L$^{Q4}$ and one or two of L$^{Q1}$ and L$^{Q2}$ are F.
Preferred compounds of formula Q are those wherein X$^Q$ denotes F or OCF$_3$, very preferably F.
The compounds of formula Q are preferably selected from the following subformulae

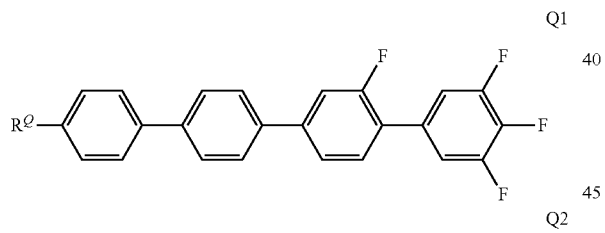

wherein R$^Q$ has one of the meanings of formula Q or one of its preferred meanings given above and below, and is preferably ethyl, n-propyl or n-butyl.
Especially preferred are compounds of formula Q1, in particular those wherein R$^Q$ is n-propyl.
Preferably the proportion of compounds of formula Q in the LC host mixture is from >0 to ≤5% by weight, very preferably from 0.1 to 2% by weight, most preferably from 0.2 to 1.5% by weight.
Preferably the LC host mixture contains 1 to 5, preferably 1 or 2 compounds of formula Q.
The addition of quaterphenyl compounds of formula Q to the LC host mixture enables to reduce ODF mura, whilst maintaining high UV absorption, enabling quick and complete polymerisation, enabling strong and quick tilt angle generation, and increasing the UV stability of the LC medium.
Besides, the addition of compounds of formula Q, which have positive dielectric anisotropy, to the LC medium with negative dielectric anisotropy allows a better control of the values of the dielectric constants ε$_∥$ and ε$_⊥$, and in particular enables to achieve a high value of the dielectric constant ε$_∥$ while keeping the dielectric anisotropy Δε constant, thereby reducing the kick-back voltage and reducing image sticking.

l) LC medium wherein component B) or the LC host mixture additionally comprises one or more compounds of formula C:

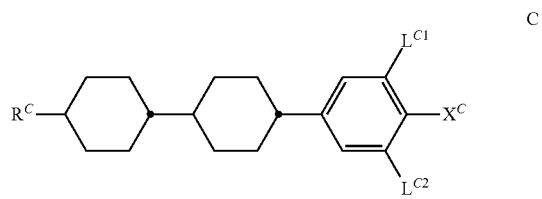

C wherein
R$^C$ denotes alkyl, alkoxy, oxaalkyl or alkoxyalkyl having 1 to 9 C atoms or alkenyl or alkenyloxy having 2 to 9 C atoms, all of which are optionally fluorinated,
X$^C$ denotes F, Cl, halogenated alkyl or alkoxy having 1 to 6 C atoms or halogenated alkenyl or alkenyloxy having 2 to 6 C atoms,
L$^{C1}$, L$^{C2}$ independently of each other denote H or F, with at least one of L$^{C1}$ and L$^{C2}$ being F.
Preferred compounds of formula C are those wherein R$^C$ denotes straight-chain alkyl with 2 to 6 C-atoms, very preferably ethyl, n-propyl or n-butyl.
Preferred compounds of formula C are those wherein L$^{C1}$ and L$^{C2}$ are F.
Preferred compounds of formula C are those wherein X$^C$ denotes F or OCF$_3$, very preferably F.
Preferred compounds of formula C are selected from the following formula

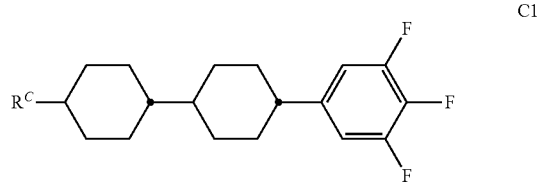

C1 wherein R$^C$ has one of the meanings of formula C or one of its preferred meanings given above and below, and is preferably ethyl, n-propyl or n-butyl, very preferably n-propyl.
Preferably the proportion of compounds of formula C in the LC host mixture is from >0 to ≤10% by weight, very preferably from 0.1 to 8% by weight, most preferably from 0.2 to 5% by weight.
Preferably the LC host mixture contains 1 to 5, preferably 1, 2 or 3 compounds of formula C.
The addition of compounds of formula C, which have positive dielectric anisotropy, to the LC medium with negative dielectric anisotropy allows a better control of the values of the dielectric constants $\varepsilon_\parallel$ and $\varepsilon_\perp$, and in particular enables to achieve a high value of the dielectric constant $\varepsilon_\parallel$ while keeping the dielectric anisotropy $\Delta\varepsilon$ constant, thereby reducing the kick-back voltage and reducing image sticking. Besides, the addition of compounds of formula C enables to reduce the viscosity and the response time of the LC medium.

m) LC medium wherein component B) or the LC host mixture additionally comprises one or more compounds selected from the group consisting of the following formulae:

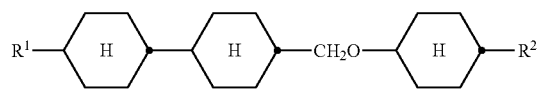

O1

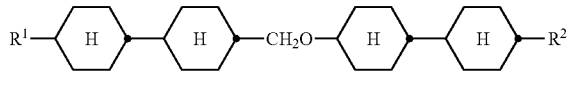

O2

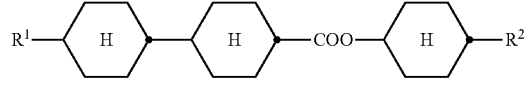

O3

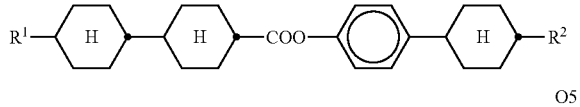

O4

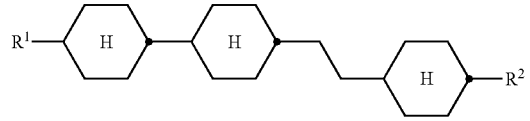

O5

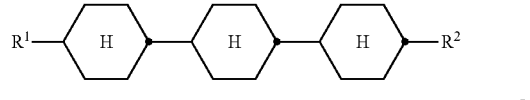

O6

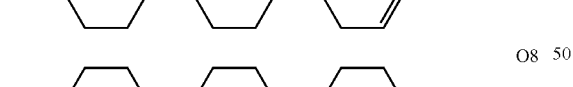

O7

O8

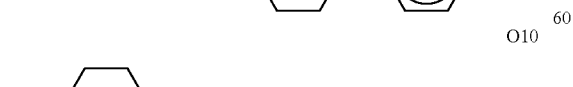

O9

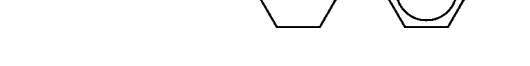

O10

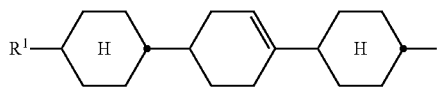

O11 in which $R^1$ and $R^2$ have the meanings indicated above and preferably each, independently of one another, denote straight-chain alkyl having 1 to 6 C atoms or straight-chain alkenyl having 2 to 6 C atoms.

Preferred media comprise one or more compounds selected from the formulae O1, O3 and O4.

n) LC medium wherein component B) or the LC host mixture additionally comprises one or more compounds of the following formula:

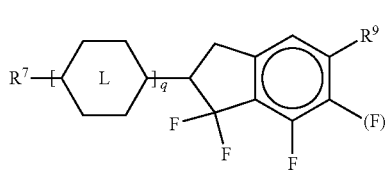

FI in which

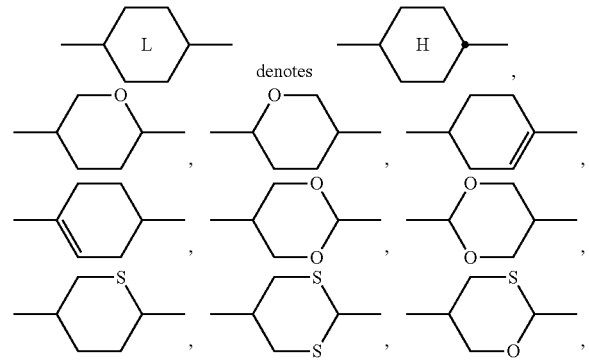

$R^9$ denotes H, $CH_3$, $C_2H_5$ or $n\text{-}C_3H_7$, (F) denotes an optional fluorine substituent, and q denotes 1, 2 or 3, and $R^7$ has one of the meanings indicated for $R^1$, preferably in amounts of >3% by weight, in particular ≥5% by weight and very particularly preferably 5-30% by weight.

Particularly preferred compounds of the formula FI are selected from the group consisting of the following sub-formulae:

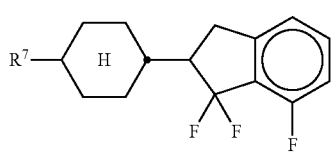

FI1

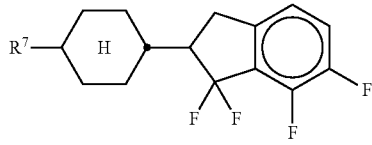

FI2

-continued

FI3
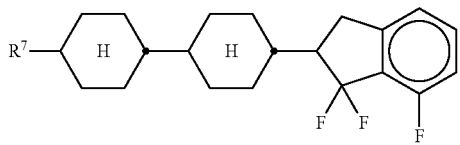

FI4
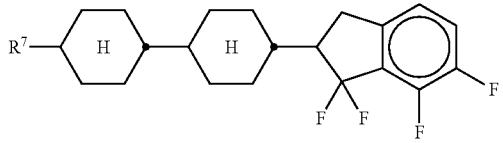

FI5
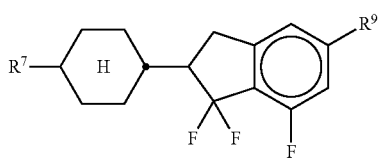

FI6
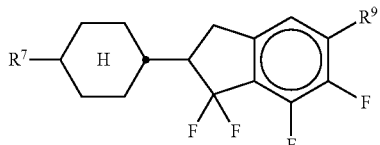

FI7
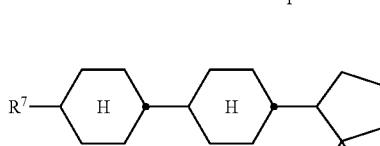

FI8
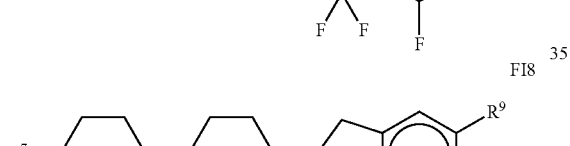

in which $R^7$ preferably denotes straight-chain alkyl, and $R^9$ denotes $CH_3$, $C_2H_5$ or n-$C_3H_7$. Particular preference is given to the compounds of the formulae FI1, FI2 and FI3.

o) LC medium wherein component B) or the LC host mixture additionally comprises one or more compounds selected from the group consisting of the following formulae:

VK1
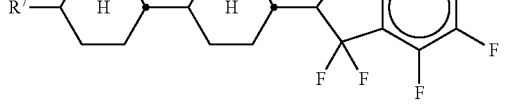

VK2

-continued

VK3
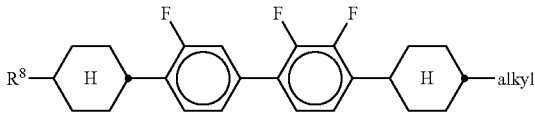

VK4
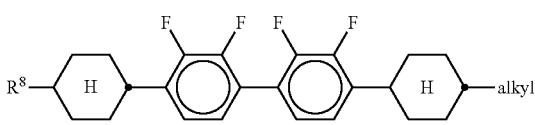

in which $R^8$ has the meaning indicated for $R^1$, and alkyl denotes a straight-chain alkyl radical having 1-6 C atoms.

p) LC medium wherein component B) or the LC host mixture additionally comprises one or more compounds which contain a tetrahydronaphthyl or naphthyl unit, such as, for example, the compounds selected from the group consisting of the following formulae:

N1
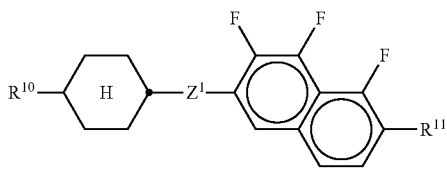

N2
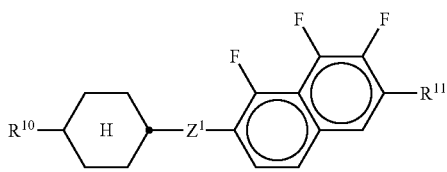

N3
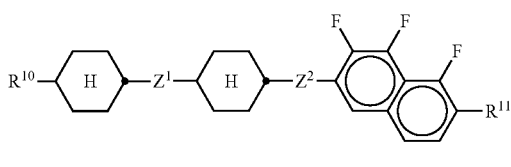

N4
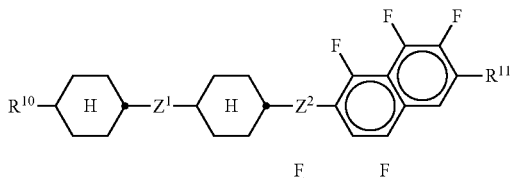

N5
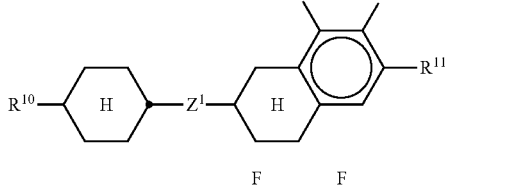

N6
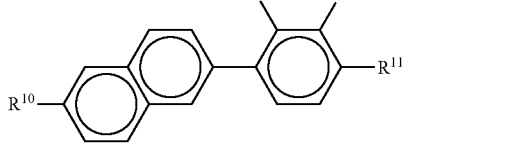

-continued

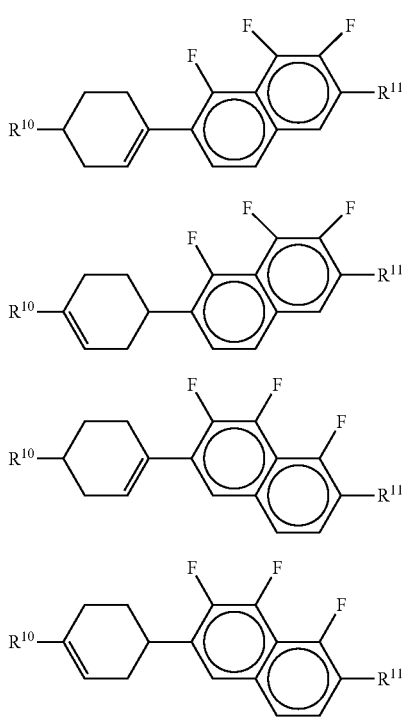

in which
R[10] and R[11] each, independently of one another, denote alkyl having 1 to 12 C atoms, where, in addition, one or two non-adjacent $CH_2$ groups may be replaced by —O—, —CH=CH—, —CO—, —OCO— or —COO— in such a way that O atoms are not linked directly to one another, preferably alkyl or alkoxy having 1 to 6 C atoms,
and R[10] and R[11] preferably denote straight-chain alkyl or alkoxy having 1 to 6 C atoms or straight-chain alkenyl having 2 to 6 C atoms, and
$Z^1$ and $Z^2$ each, independently of one another, denote —$C_2H_4$—, —CH=CH—, —$(CH_2)_4$—, —$(CH_2)_3O$—, —$O(CH_2)_3$—, —CH=CH—$CH_2CH_2$—, —$CH_2CH_2$CH=CH—, —$CH_2O$—, —$OCH_2$—, —CO—O—, —O—CO—, —$C_2F_4$—, —CF=CF—, —CF=CH—, —CH=CF—, —$CH_2$— or a single bond.

q) LC medium wherein component B) or the LC host mixture additionally comprises one or more difluorodibenzochromans and/or chromans of the following formulae:

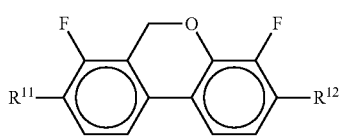

BC

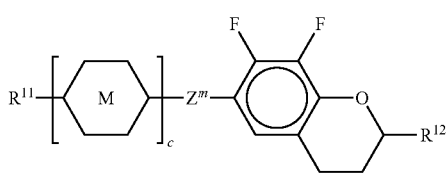

CR

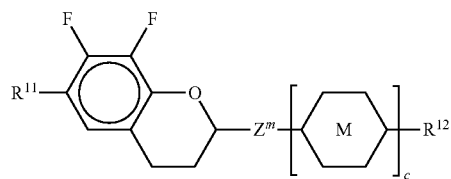

RC in which
R[11] and R[12] each, independently of one another, have one of the meanings indicated above for R[11],
ring M is trans-1,4-cyclohexylene or 1,4-phenylene,
$Z^m$ —$C_2H_4$—, —$CH_2O$—, —$OCH_2$—, —CO—O— or —O—CO—,
c is 0, 1 or 2,
preferably in amounts of 3 to 20% by weight, in particular in amounts of 3 to 15% by weight.

Particularly preferred compounds of the formulae BC, CR and RC are selected from the group consisting of the following sub-formulae:

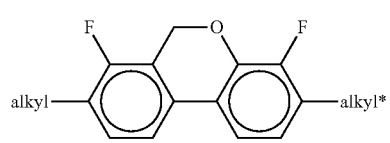

BC1

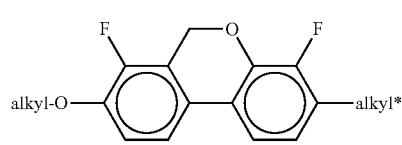

BC2

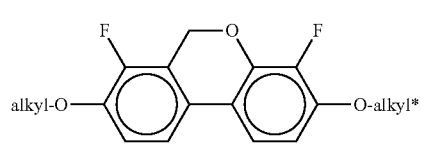

BC3

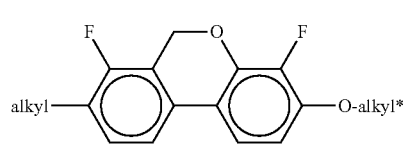

BC4

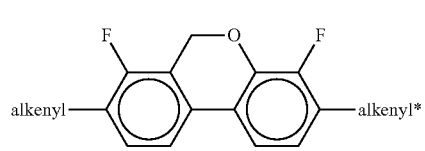

BC5

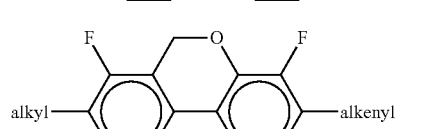

BC6

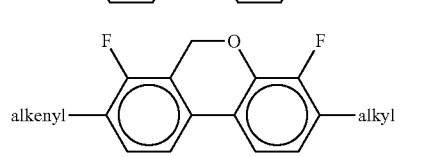

BC7

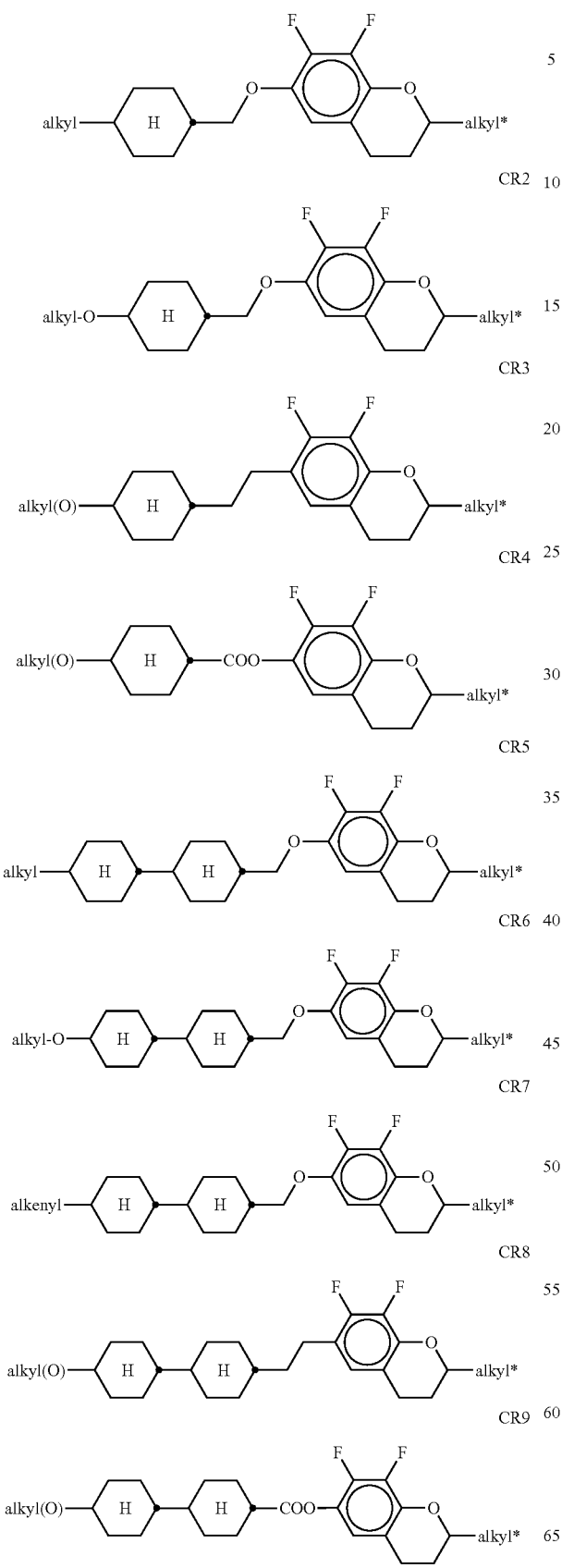

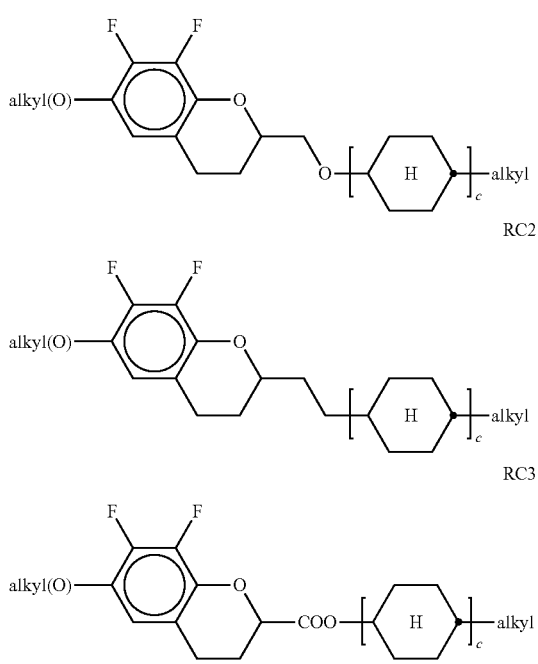

in which alkyl and alkyl* each, independently of one another, denote a straight-chain alkyl radical having 1-6 C atoms, (O) denotes an oxygen atom or a single bond, c is 1 or 2, and alkenyl and alkenyl* each, independently of one another, denote a straight-chain alkenyl radical having 2-6 C atoms. Alkenyl and alkenyl* preferably denote $CH_2=CH-$, $CH_2=CHCH_2CH_2-$, $CH_3-CH=CH-$, $CH_3-CH_2-CH=CH-$, $CH_3-(CH_2)_2-CH=CH-$, $CH_3-(CH_2)_3-CH=CH-$ or $CH_3-CH=CH-(CH_2)_2-$.

Very particular preference is given to LC host mixtures comprising one, two or three compounds of the formula BC-2.

r) LC medium wherein component B) or the LC host mixture additionally comprises one or more fluorinated phenanthrenes and/or dibenzofurans of the following formulae:

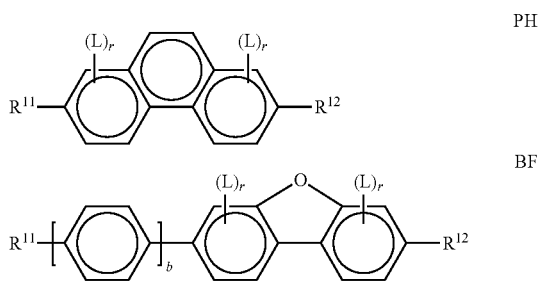

in which $R^{11}$ and $R^{12}$ each, independently of one another, have one of the meanings indicated above for $R^{11}$, b denotes 0 or 1, L denotes F, and r denotes 1, 2 or 3.

Particularly preferred compounds of the formulae PH and BF are selected from the group consisting of the following sub-formulae:

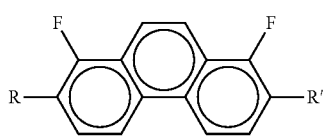
PH1

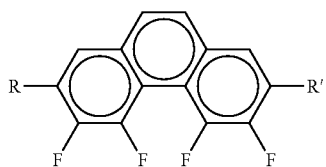
PH2

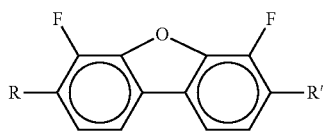
BF1

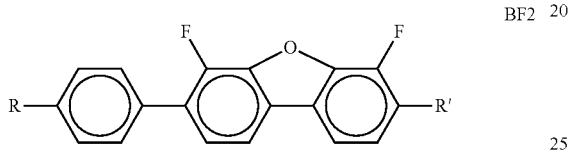
BF2 in which R and R' each, independently of one another, denote a straight-chain alkyl or alkoxy radical having 1-7 C atoms.

Preferably the component B) or the LC host mixture comprises one or more compounds of formula BF1, preferably selected of subformula BF1a

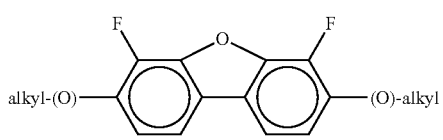
BF1a wherein alkyl denotes a straight-chain alkyl radical having 1-6 C atoms, and (O) denotes an oxygen atom or a single bond. Very preferred are compounds of formula BF1a wherein both groups (O) denote an oxygen atom and alkyl is methyl, ethyl, propyl, butyl of pentyl or hexyl, which are preferably straight-chained.

Preferably the proportion of compounds of formula BF1 or B1 Fa in the LC medium is from 0.5 to 20%, very preferably from 0.5 to 10%, most preferably from 1 to 5%.

Preferably the LC medium contains 1 to 5, preferably 1, 2 or 3 compounds of formula BF1 or BF1a.

s) LC medium wherein component B) or the LC host mixture additionally comprises one or more monocyclic compounds of the following formula

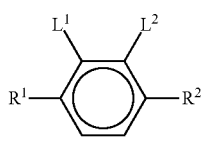
Y wherein $R^1$ and $R^2$ each, independently of one another, denote alkyl having 1 to 12 C atoms, where, in addition, one or two non-adjacent $CH_2$ groups may be replaced by —O—, —CH=CH—, —CO—, —OCO— or —COO— in such a way that O atoms are not linked directly to one another, preferably alkyl or alkoxy having 1 to 6 C atoms, $L^1$ and $L^2$ each, independently of one another, denote F, Cl, $OCF_3$, $CF_3$, $CH_3$, $CH_2F$, $CHF_2$.

Preferably, both $L^1$ and $L^2$ denote F or one of $L^1$ and $L^2$ denotes F and the other denotes Cl, The compounds of the formula Y are preferably selected from the group consisting of the following sub-formulae:

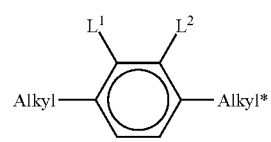
Y1

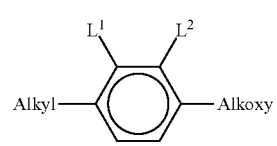
Y2

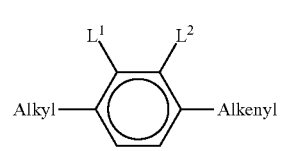
Y3

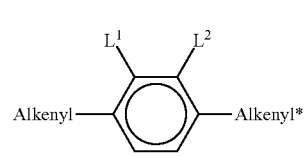
Y4

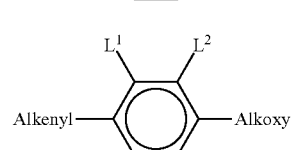
Y5

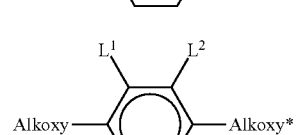
Y6

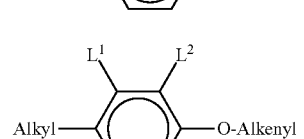
Y7

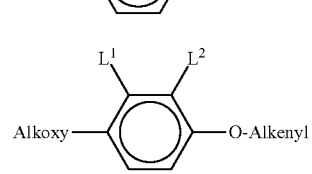
Y8

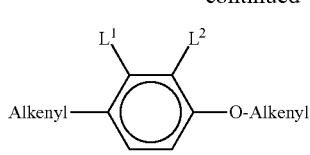

Y9

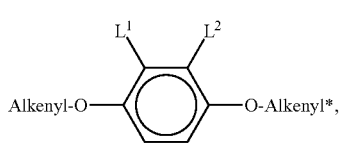

Y10 in which, Alkyl and Alkyl* each, independently of one another, denote a straight-chain alkyl radical having 1-6 C atoms, Alkoxy denotes a straight-chain alkoxy radical having 1-6 C atoms, Alkenyl and Alkenyl* each, independently of one another, denote a straight-chain alkenyl radical having 2-6 C atoms, and O denotes an oxygen atom or a single bond. Alkenyl and Alkenyl* preferably denote $CH_2=CH-$, $CH_2=CHCH_2CH_2-$, $CH_3-CH=CH-$, $CH_3-CH_2-CH=CH-$, $CH_3-(CH_2)_2-CH=CH-$, $CH_3-(CH_2)_3-CH=CH-$ or $CH_3-CH=CH-(CH_2)_2-$.

Particularly preferred compounds of the formula Y are selected from the group consisting of the following sub-formulae:

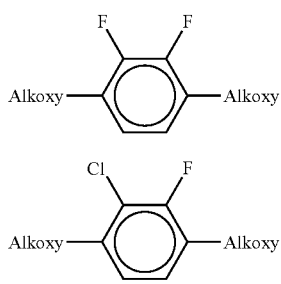

wherein Alkoxy preferably denotes straight-chain alkoxy with 3, 4, or 5 C atoms.

t) LC medium which, apart from the polymerisable compounds as described above and below, does not contain a compound which contains a terminal vinyloxy group ($-O-CH=CH_2$).

u) LC medium wherein component B) or the LC host mixture comprises 1 to 8, preferably 1 to 5, compounds of the formulae CY1, CY2, PY1 and/or PY2. The proportion of these compounds in the LC host mixture as a whole is preferably 5 to 70%, particularly preferably 10 to 35%. The content of these individual compounds is preferably in each case 2 to 20%.

v) LC medium wherein component B) or the LC host mixture comprises 1 to 8, preferably 1 to 5, compounds of the formulae CY9, CY10, PY9 and/or PY10. The proportion of these compounds in the LC host mixture as a whole is preferably 5 to 60%, particularly preferably 10 to 35%. The content of these individual compounds is preferably in each case 2 to 20%.

w) LC medium wherein component B) or the LC host mixture comprises 1 to 10, preferably 1 to 8, compounds of the formula ZK, in particular compounds of the formulae ZK1, ZK2 and/or ZK6. The proportion of these compounds in the LC host mixture as a whole is preferably 3 to 25%, particularly preferably 5 to 45%. The content of these individual compounds is preferably in each case 2 to 20%.

x) LC medium in which the proportion of compounds of the formulae CY, PY and ZK in the LC host mixture as a whole is greater than 70%, preferably greater than 80%.

y) LC medium in which the LC host mixture contains one or more compounds containing an alkenyl group, preferably selected from formulae AN and AY, very preferably selected from formulae AN1, AN3 and AN6, most preferably from formulae AN1a, AN3a and AN6a. The concentration of these compounds in the LC host mixture is preferably from 2 to 70%, very preferably from 3 to 55%.

z1) LC medium wherein component B) or the LC host mixture contains one or more, preferably 1 to 5, compounds selected of formula PY1-PY8, very preferably of formula PY2. The proportion of these compounds in the LC host mixture as a whole is preferably 1 to 30%, particularly preferably 2 to 20%. The content of these individual compounds is preferably in each case 1 to 20%.

z2) LC medium wherein component B) or the LC host mixture contains one or more, preferably 1, 2 or 3, compounds selected from formulae T1, T2, T3, T5 and T21, very preferably from formula T2. The content of these compounds in the LC host mixture as a whole is preferably 1 to 20%.

z3) LC medium in which the LC host mixture contains one or more compounds selected from formulae CY and PY, one or more compounds selected from formulae AN and AY, and one or more compounds of formula ZK.

z4) LC medium in which the LC host mixture contains one or more, preferably 1, 2 or 3, compounds of formula AY14, preferably of formula AY14a, one or more, preferably 1, 2 or 3, compounds of formula BF1, preferably of formula BF1a, and one or more, preferably 1, 2 or 3, compounds of formula PY2. The proportion of the compounds of formula AY14 or AY14a in the LC host mixture is preferably from 0.05 to 2%, very preferably from 0.1 to 1%. The proportion of the compounds of formula BF1 or BF1a in the LC host mixture is preferably from 0.5 to 10%, very preferably from 1 to 5%. The proportion of the compounds of formula PY2 in the LC host mixture is preferably from 1 to 20%, very preferably from 10 to 20%.

The combination of compounds of the preferred embodiments mentioned above with the polymerised compounds described above causes low threshold voltages, low rotational viscosities and very good low-temperature stabilities in the LC media according to the invention at the same time as constantly high clearing points and high HR values, and allows the rapid establishment of a particularly low pretilt angle in PSA displays. In particular, the LC media exhibit significantly shortened response times, in particular also the grey-shade response times, in PSA displays compared with the media from the prior art.

The LC media and LC host mixtures of the present invention preferably have a nematic phase range of at least 80 K, particularly preferably at least 100 K, and a rotational viscosity ≤250 mPa·s, preferably ≤200 mPa·s, at 20° C.

In the VA-type displays according to the invention, the molecules in the layer of the LC medium in the switched-off state are aligned perpendicular to the electrode surfaces (homeotropically) or have a a tilted homeotropic alignment. On application of an electrical voltage to the electrodes, a realignment of the LC molecules takes place with the longitudinal molecular axes parallel to the electrode surfaces.

LC media according to the invention based on compounds with negative dielectric anisotropy, in particular for use in displays of the PS-VA and PS-UB-FFS type, have a negative dielectric anisotropy Δε, preferably from −0.5 to −10, in particular from −2.5 to −7.5, at 20° C. and 1 kHz.

The birefringence Δn in LC media according to the invention for use in displays of the PS-VA and PS-UB-FFS type is preferably below 0.16, particularly preferably from 0.06 to 0.14, very particularly preferably from 0.07 to 0.12.

The LC media according to the invention may also comprise further additives which are known to the person skilled in the art and are described in the literature, such as, for example, polymerisation initiators, inhibitors, stabilisers, surface-active substances or chiral dopants. These may be polymerisable or non-polymerisable. Polymerisable additives are accordingly ascribed to the polymerisable component or component A). Non-polymerisable additives are accordingly ascribed to the non-polymerisable component or component B).

In a preferred embodiment the LC media contain one or more chiral dopants, preferably in a concentration from 0.01 to 1%, very preferably from 0.05 to 0.5%. The chiral dopants are preferably selected from the group consisting of compounds from Table B below, very preferably from the group consisting of R- or S-1011, R- or S-2011, R- or S-3011, R- or S-4011, and R- or S-5011.

In another preferred embodiment the LC media contain a racemate of one or more chiral dopants, which are preferably selected from the chiral dopants mentioned in the previous paragraph.

Furthermore, it is possible to add to the LC media, for example, 0 to 15% by weight of pleochroic dyes, furthermore nanoparticles, conductive salts, preferably ethyldimethyldodecylammonium 4-hexoxybenzoate, tetrabutylammonium tetraphenylborate or complex salts of crown ethers (cf., for example, Haller et al., Mol. Cryst. Liq. Cryst. 24, 249-258 (1973)), for improving the conductivity, or substances for modifying the dielectric anisotropy, the viscosity and/or the alignment of the nematic phases. Substances of this type are described, for example, in DE-A 22 09 127, 22 40 864, 23 21 632, 23 38 281, 24 50 088, 26 37 430 and 28 53 728.

The individual components of the preferred embodiments a)-z) of the LC media according to the invention are either known or methods for the preparation thereof can readily be derived from the prior art by the person skilled in the relevant art, since they are based on standard methods described in the literature. Corresponding compounds of the formula CY are described, for example, in EP-A-0 364 538. Corresponding compounds of the formula ZK are described, for example, in DE-A-26 36 684 and DE-A-33 21 373.

The LC media which can be used in accordance with the invention are prepared in a manner conventional per se, for example by mixing one or more of the above-mentioned compounds with one or more polymerisable compounds as defined above, and optionally with further liquid-crystalline compounds and/or additives. In general, the desired amount of the components used in lesser amount is dissolved in the components making up the principal constituent, advantageously at elevated temperature. It is also possible to mix solutions of the components in an organic solvent, for example in acetone, chloroform or methanol, and to remove the solvent again, for example by distillation, after thorough mixing. The invention furthermore relates to the process for the preparation of the LC media according to the invention.

It goes without saying to the person skilled in the art that the LC media according to the invention may also comprise compounds in which, for example, H, N, O, Cl, F have been replaced by the corresponding isotopes like deuterium etc.

The following examples explain the present invention without restricting it. However, they show the person skilled in the art preferred mixture concepts with compounds preferably to be employed and the respective concentrations thereof and combinations thereof with one another. In addition, the examples illustrate which properties and property combinations are accessible.

The following abbreviations are used:

(n, m, z: in each case, independently of one another, 1, 2, 3, 4, 5 or 6)

TABLE A

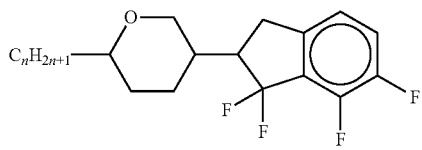

AIK-n-F

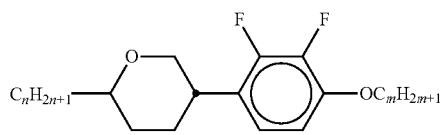

AIY-n-Om

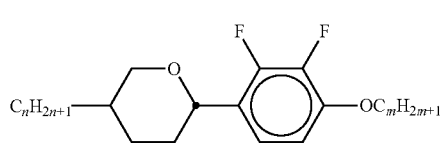

AY-n-Om

TABLE A-continued
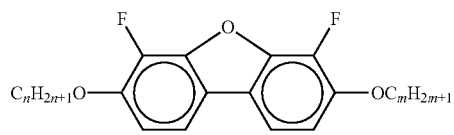
B-nO-Om
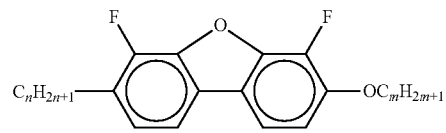
B-n-Om
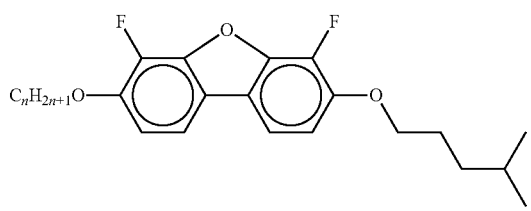
B-nO-O5i
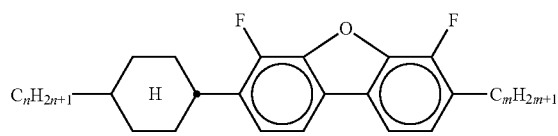
CB-n-m
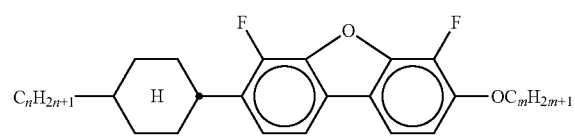
CB-n-Om
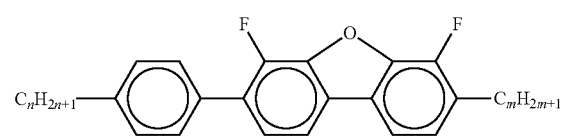
PB-n-m
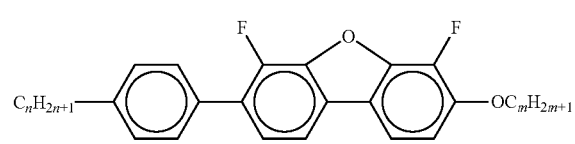
PB-n-Om
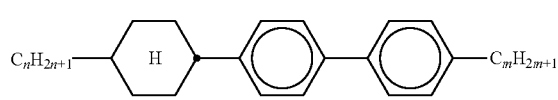
BCH-nm TABLE A-continued
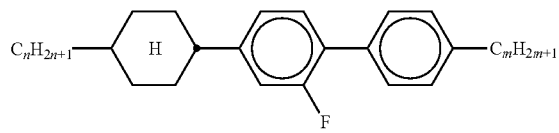
BCH-nmF
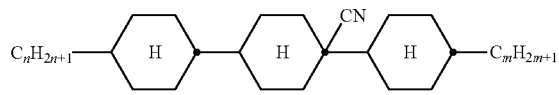
BCN-nm
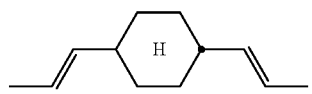
C-1V-V1
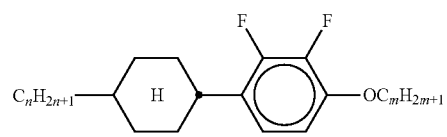
CY-n-Om
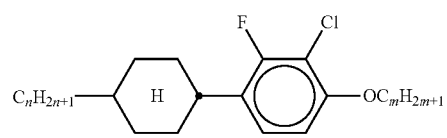
CY(F,Cl)-n-Om
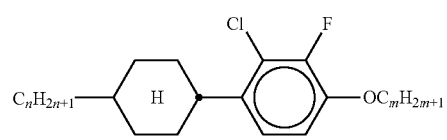
CY(Cl,F)-n-Om
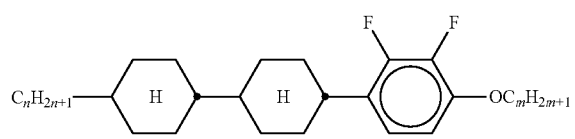
CCY-n-Om
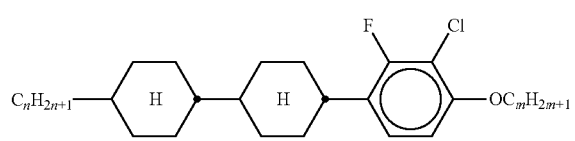
CCY(F,Cl)-n-Om
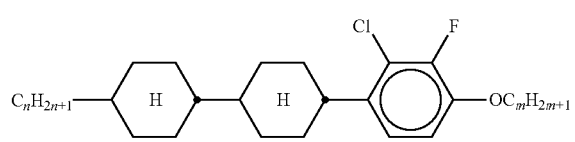
CCY(Cl,F)-n-Om TABLE A-continued
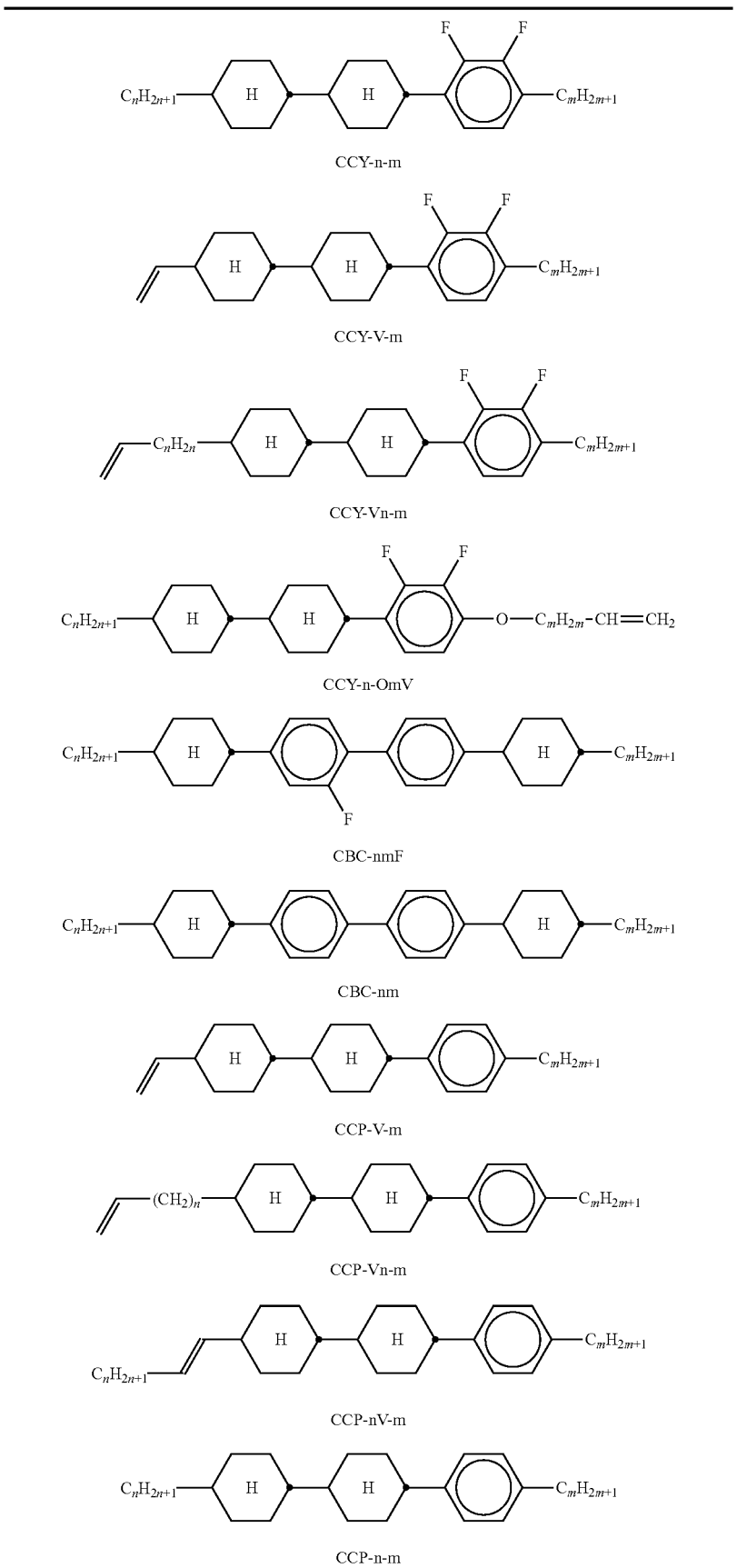

TABLE A-continued
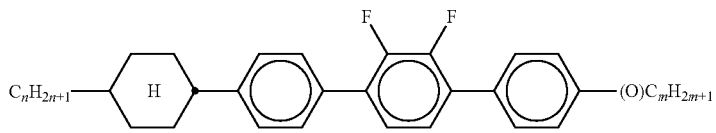
CPYP-n-(O)m
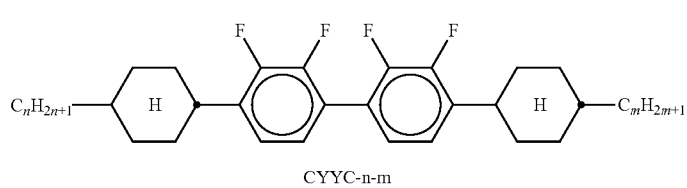
CYYC-n-m
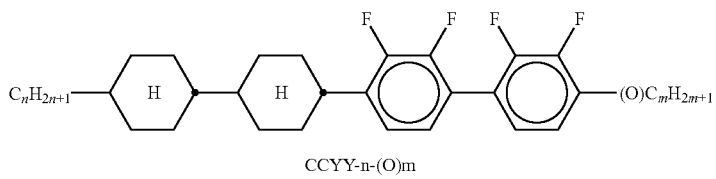
CCYY-n-(O)m
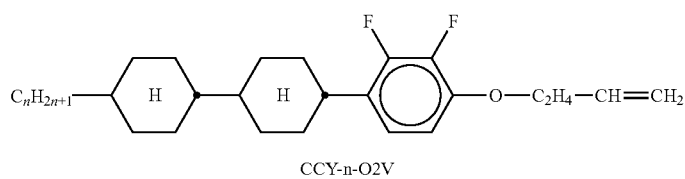
CCY-n-O2V
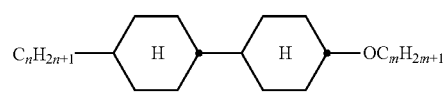
CCH-nOm
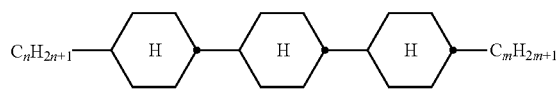
CCC-n-m
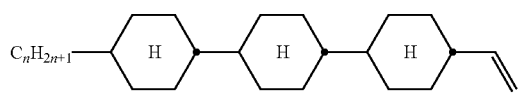
CCC-n-V
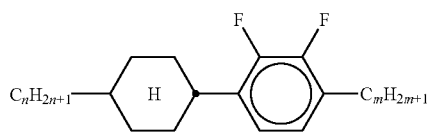
CY-n-m
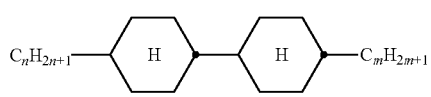
CCH-nm
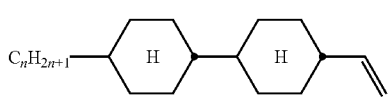
CC-n-V TABLE A-continued
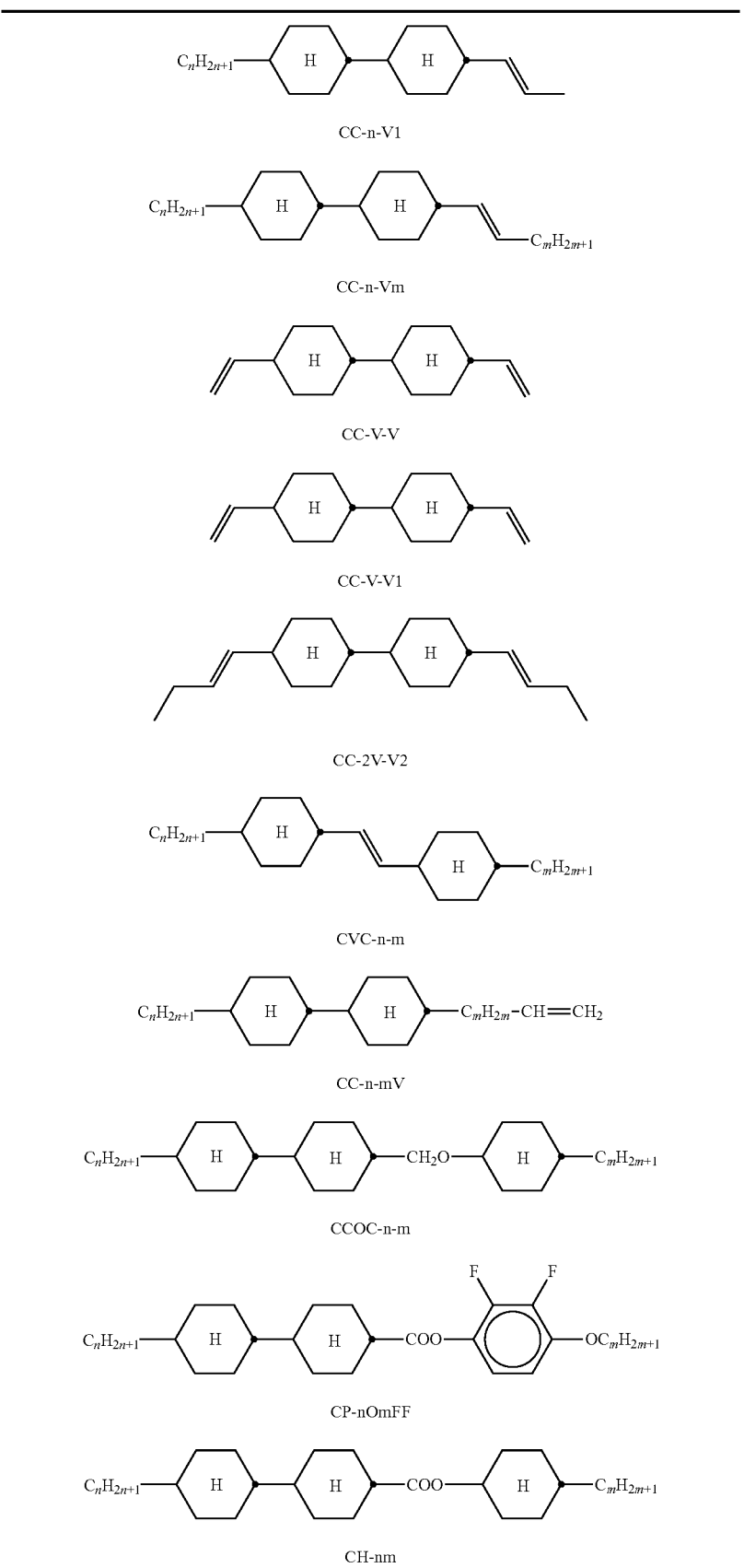

TABLE A-continued
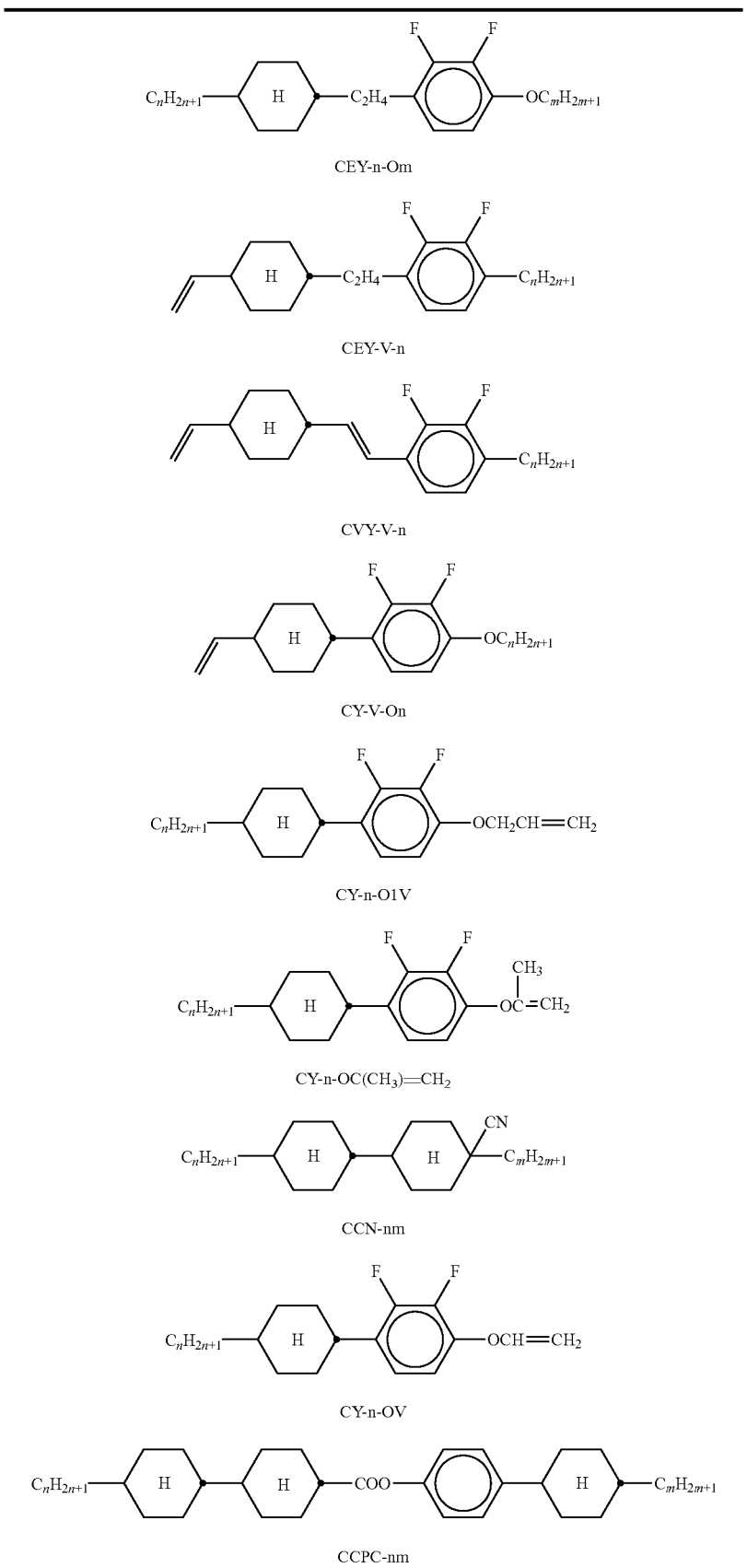

TABLE A-continued
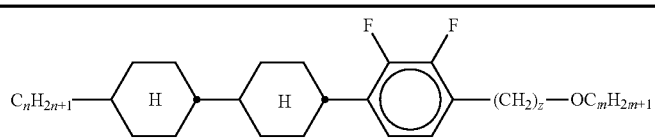
CCY-n-zOm
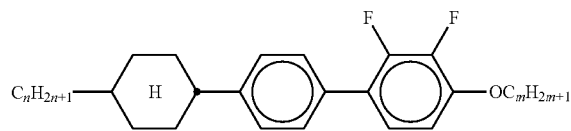
CPY-n-Om
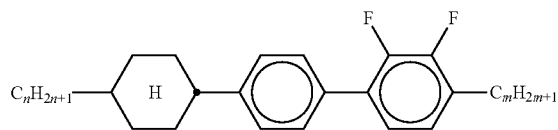
CPY-n-m
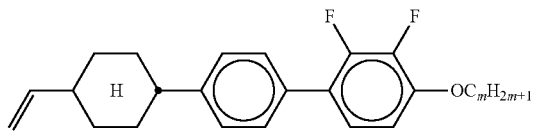
CPY-V-Om
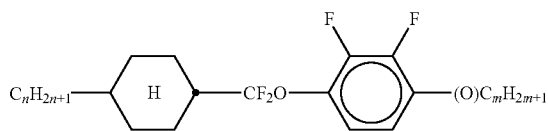
CQY-n-(O)m
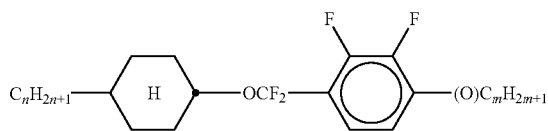
CQIY-n-(O)m
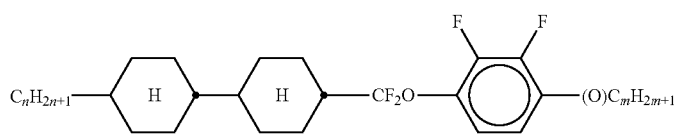
CCQY-n-(O)m
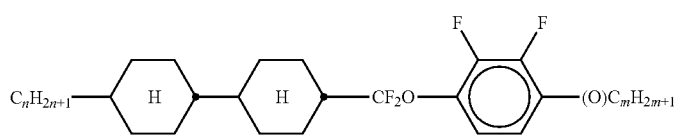
CCQIY-n-(O)m
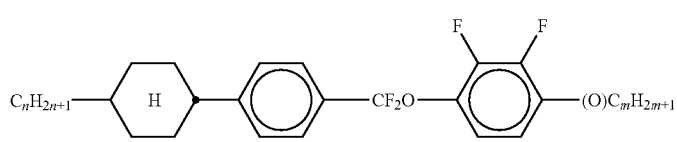
CPQY-n-(O)m TABLE A-continued
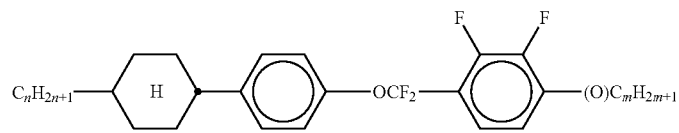
CPQIY-n-(O)m
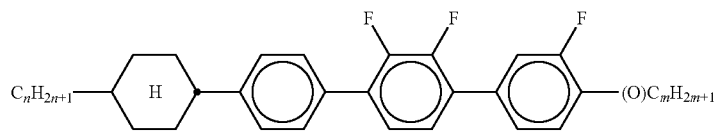
CPYG-n-(O)m
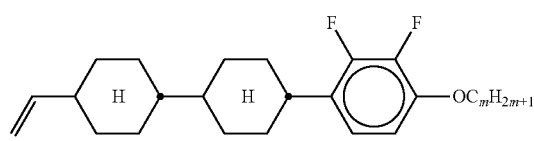
CCY-V-Om
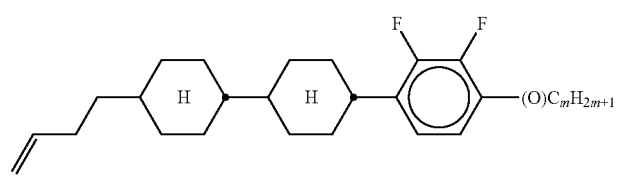
CCY-V2-(O)m
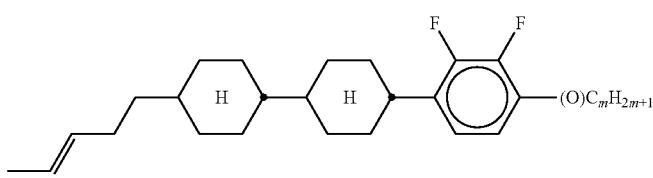
CCY-1V2-(O)m
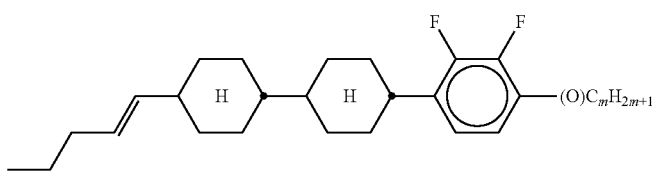
CCY-3V-(O)m
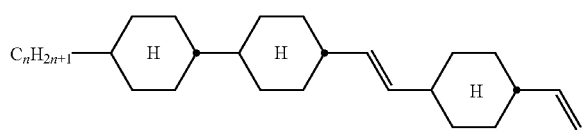
CCVC-n-V
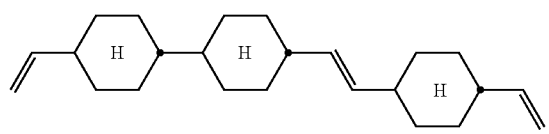
CCVC-V-V TABLE A-continued
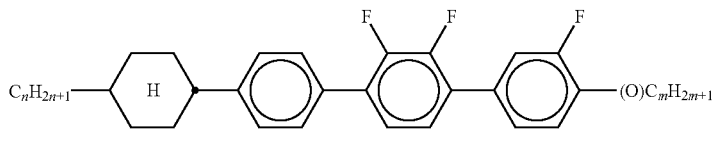
CPYG-n-(O)m
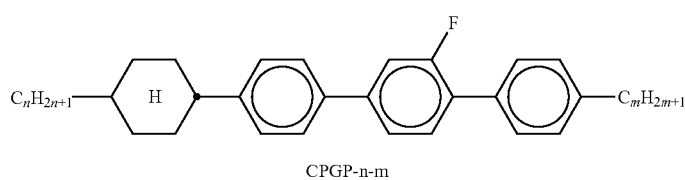
CPGP-n-m
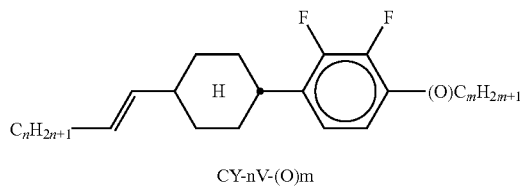
CY-nV-(O)m
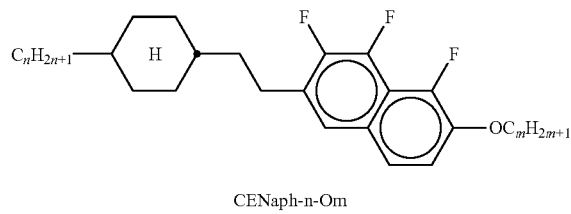
CENaph-n-Om
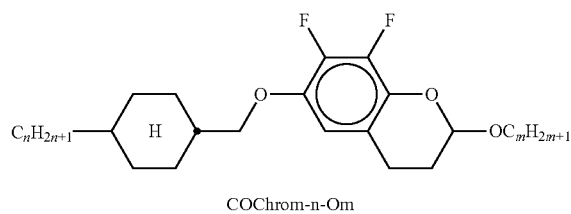
COChrom-n-Om
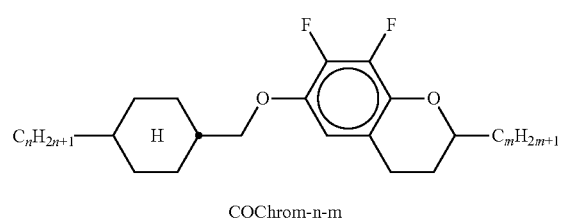
COChrom-n-m
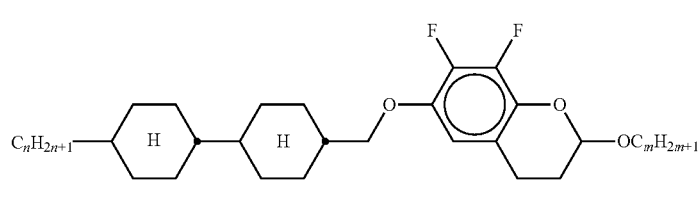
CCOChrom-n-Om
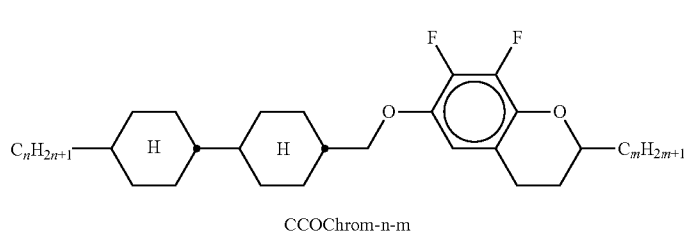
CCOChrom-n-m TABLE A-continued
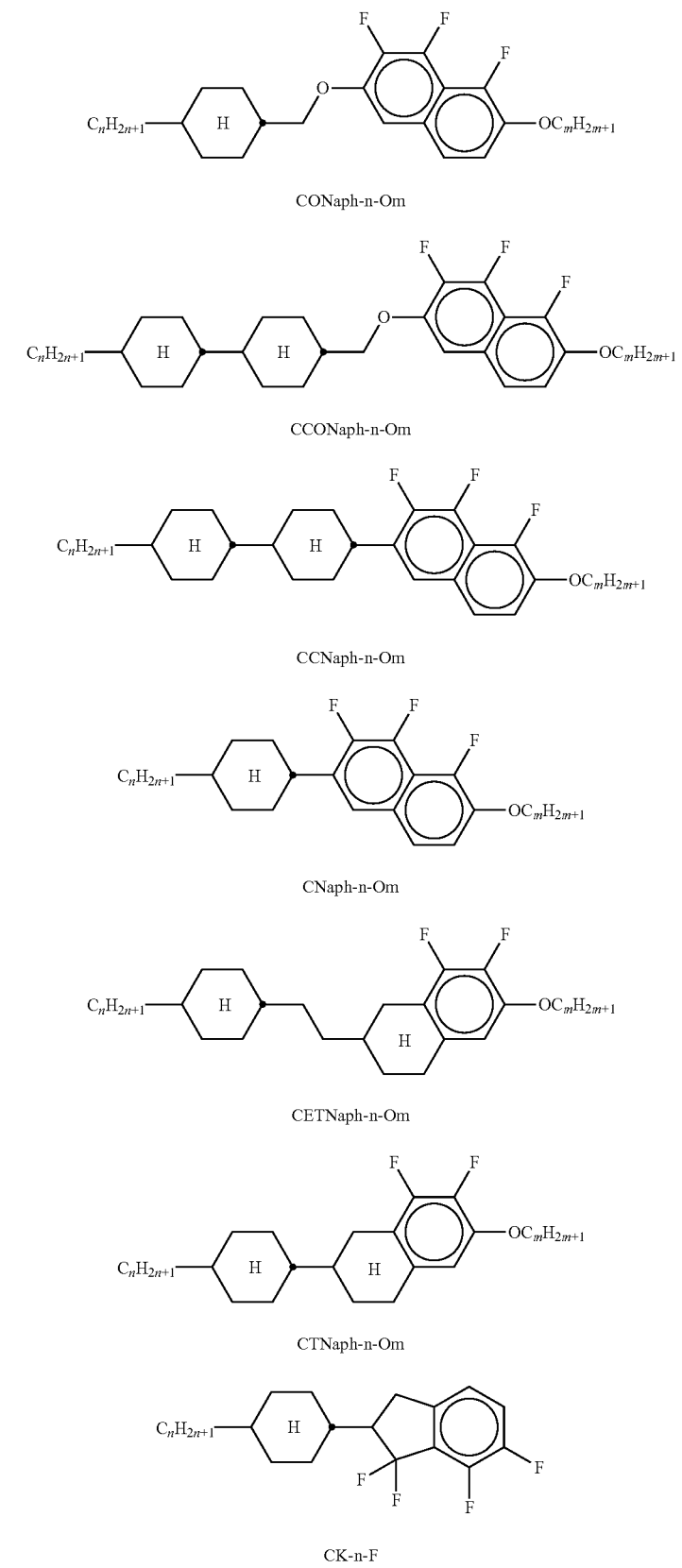

TABLE A-continued
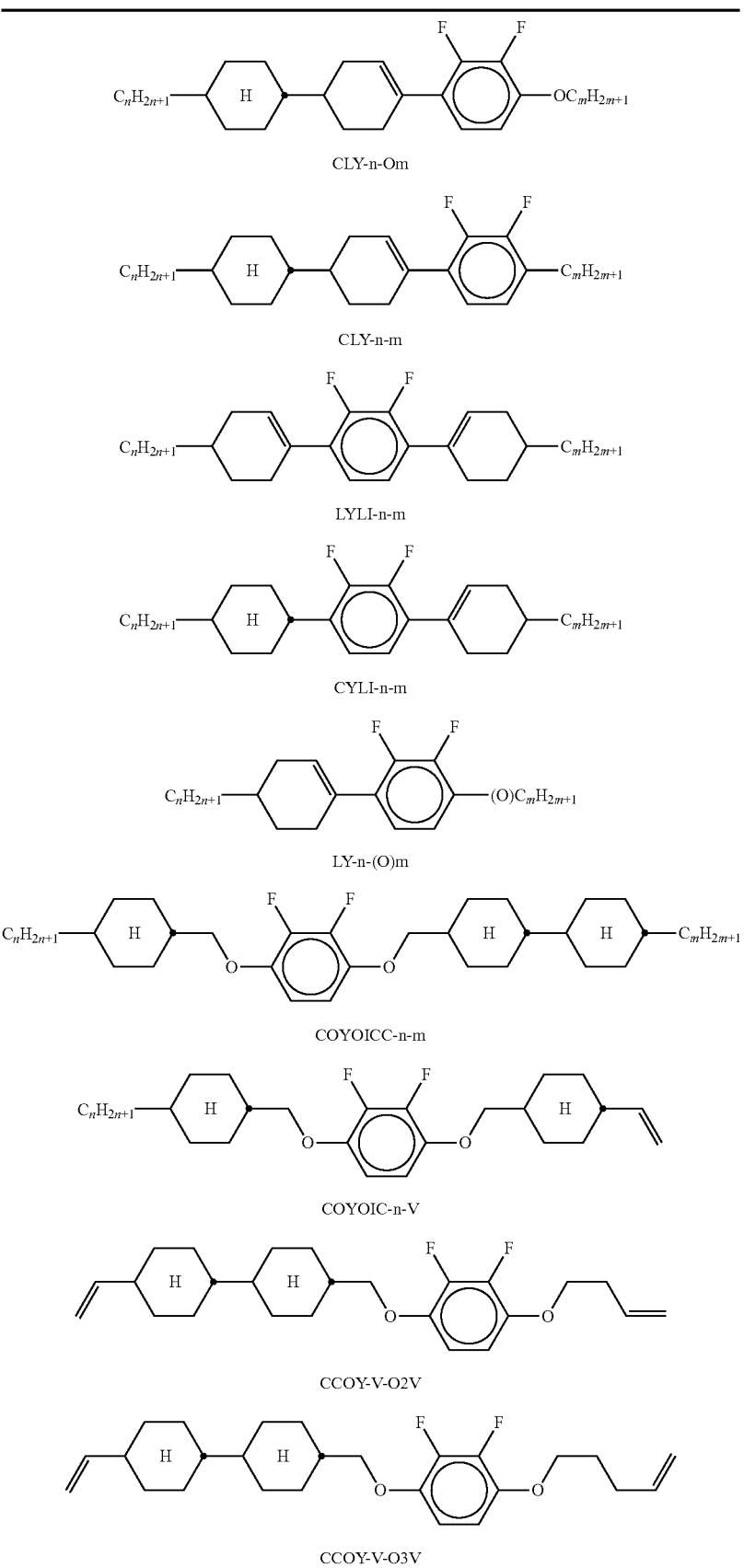

TABLE A-continued
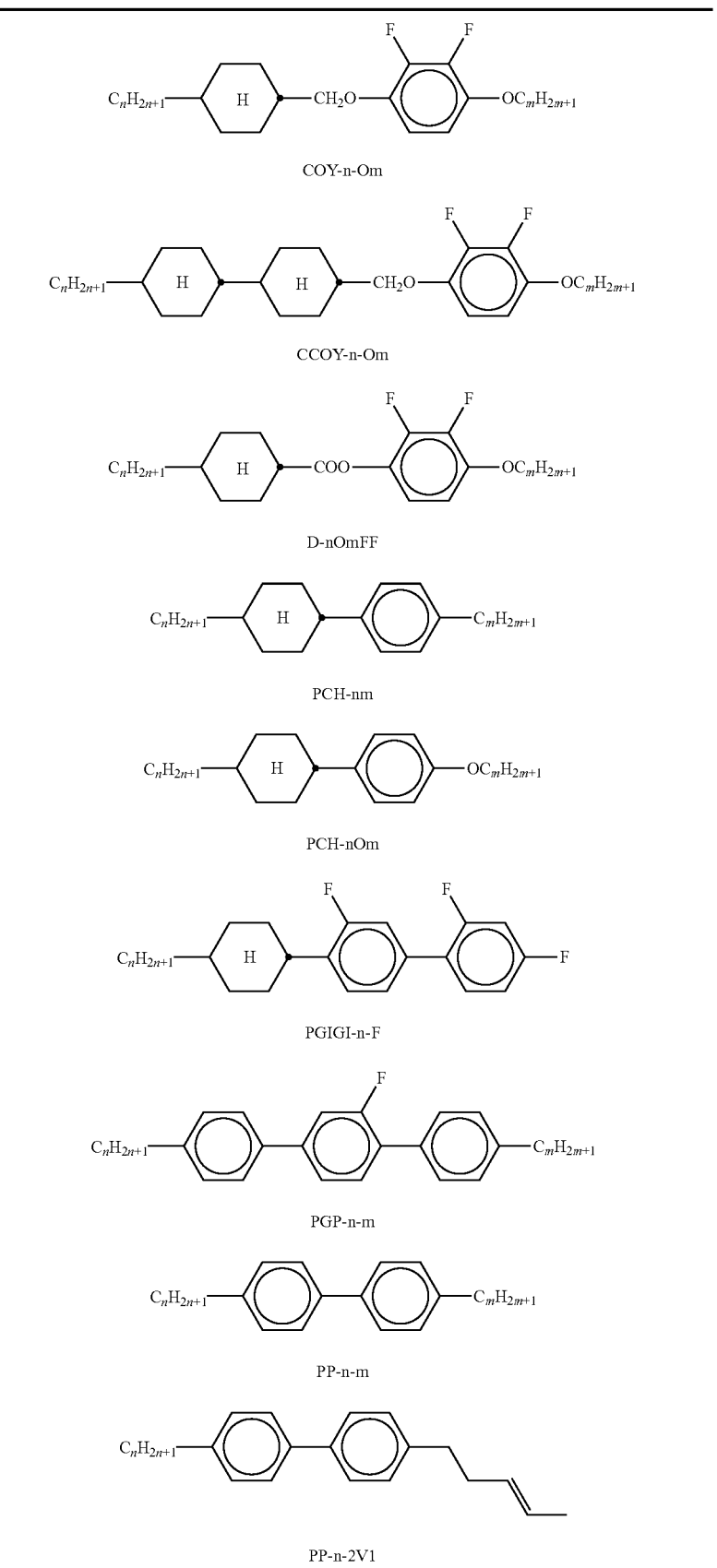

TABLE A-continued
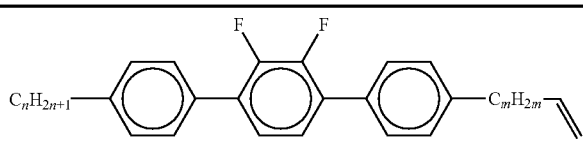
PYP-n-mV
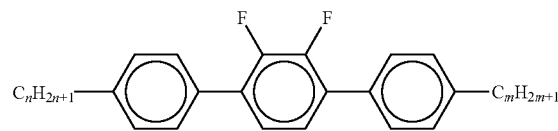
PYP-n-m
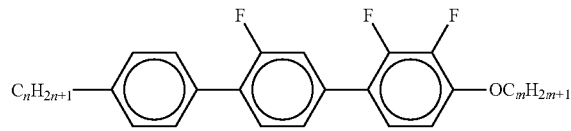
PGIY-n-Om
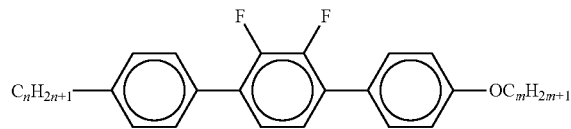
PYP-n-Om
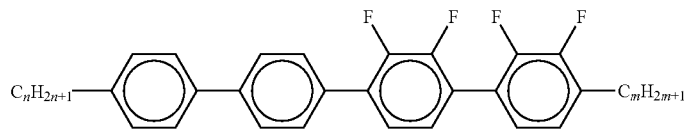
PPYY-n-m
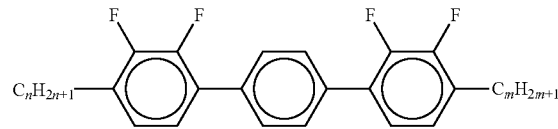
YPY-n-m
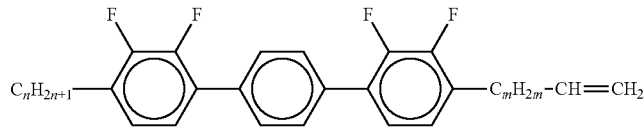
YPY-n-mV
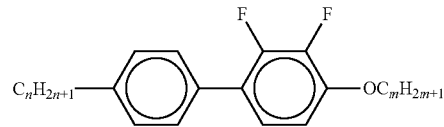
PY-n-Om
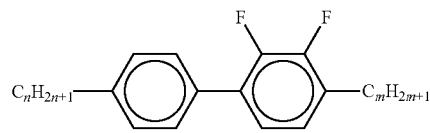
PY-n-m TABLE A-continued
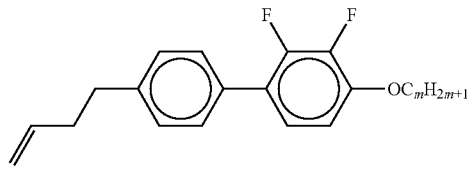
PY-V2-Om
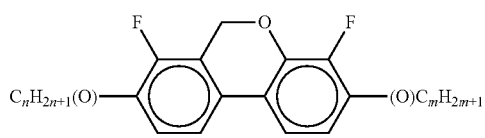
DFDBC-n(O)-(O)m
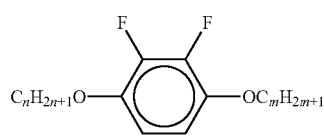
Y-nO-Om
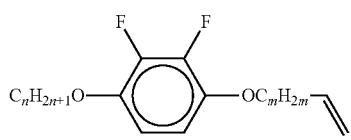
Y-nO-OmV
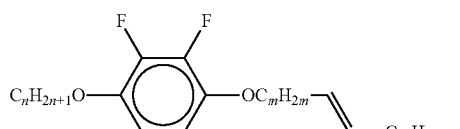
Y-nO-OmVm'
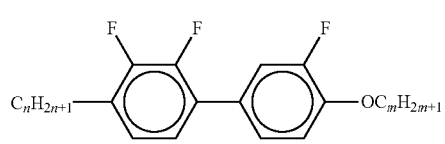
YG-n-Om
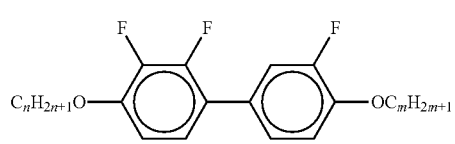
YG-nO-Om
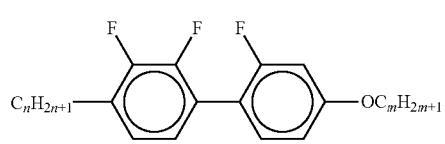
YGI-n-Om TABLE A-continued
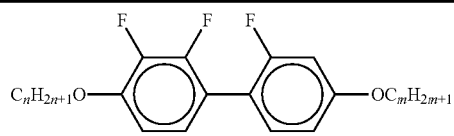
YGI-nO-Om
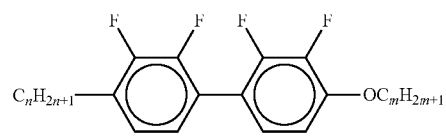
YY-n-Om
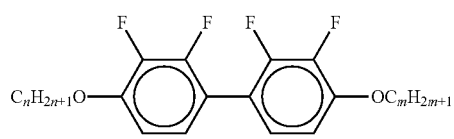
YY-nO-Om
In a preferred embodiment of the present invention, the LC media according to the invention comprise one or more compounds selected from the group consisting of compounds from Table A.
TABLE B
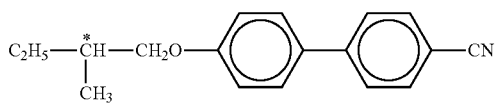
C15
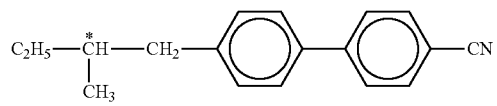
CB 15
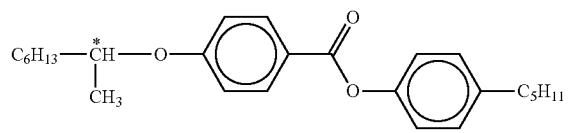
CM 21
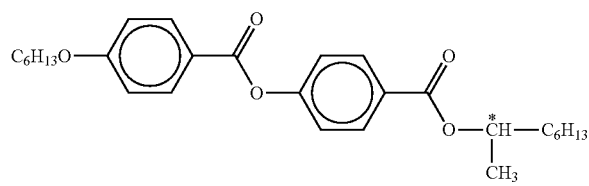
R/S-811
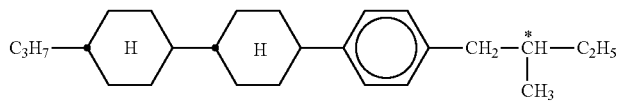
CM 44

TABLE B-continued
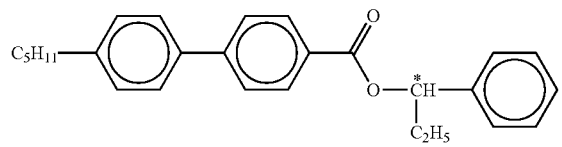
CM 45
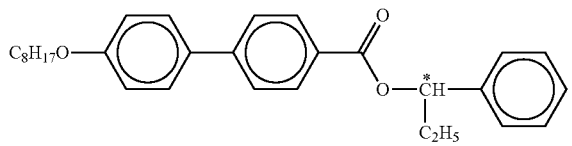
CM 47
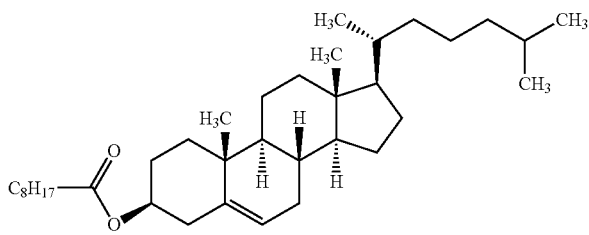
CN
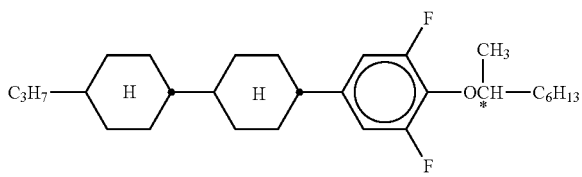
R/S-2011
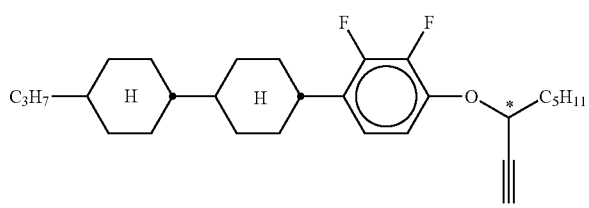
R/S-3011
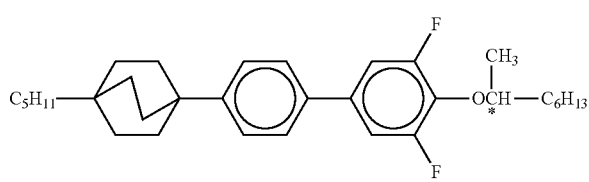
R/S-4011
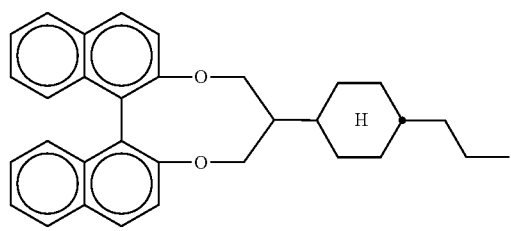
R/S-5011

TABLE B-continued

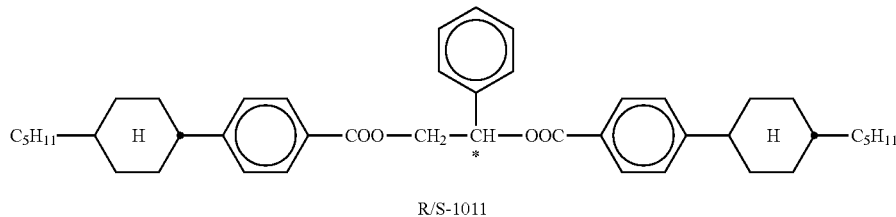

R/S-1011

Table B shows possible chiral dopants which can be added to the LC media according to the invention.

The LC media preferably comprise 0 to 10% by weight, in particular 0.01 to 5% by weight, particularly preferably 0.1 to 3% by weight, of dopants. The LC media preferably comprise one or more dopants selected from the group consisting of compounds from Table B.

TABLE C

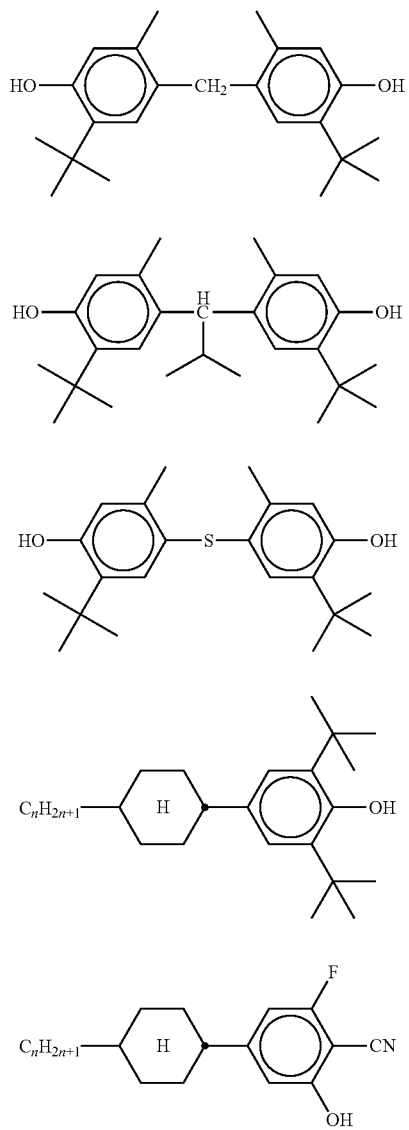

TABLE C-continued
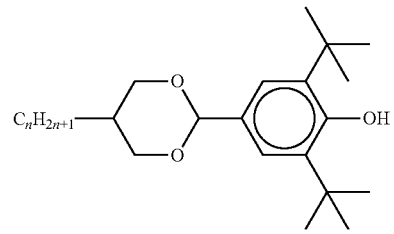
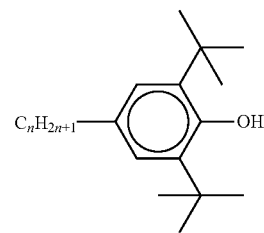
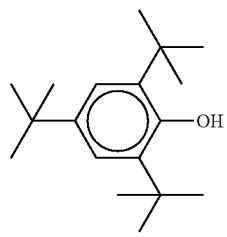
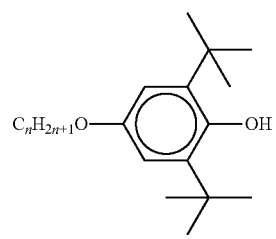
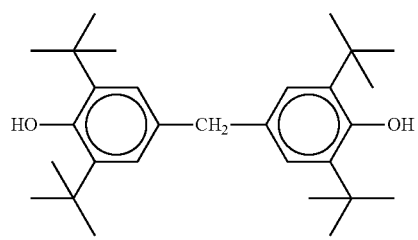
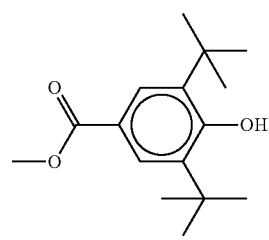

TABLE C-continued
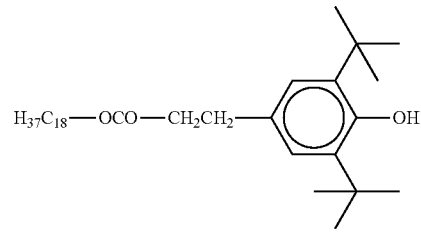
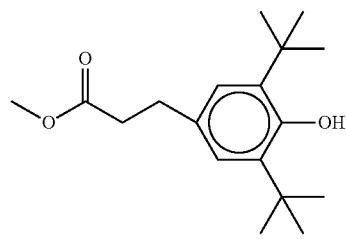
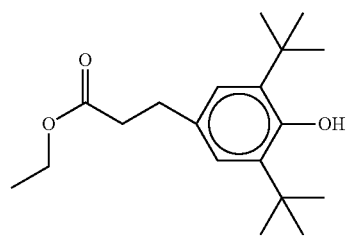
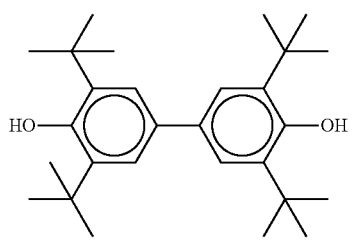
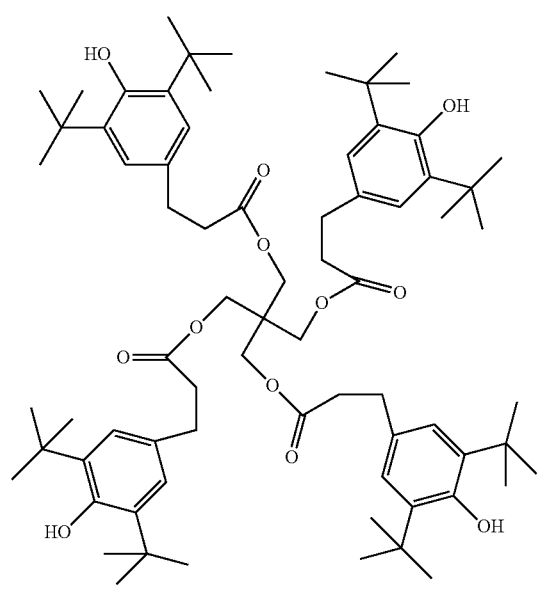 [SMILES: CC(C)(C)c1cc(CCC(=O)OCC(COC(=O)CCc2cc(C(C)(C)C)c(O)c(C(C)(C)C)c2)(COC(=O)CCc2cc(C(C)(C)C)c(O)c(C(C)(C)C)c2)COC(=O)CCc2cc(C(C)(C)C)c(O)c(C(C)(C)C)c2)cc(C(C)(C)C)c1O]

TABLE C-continued
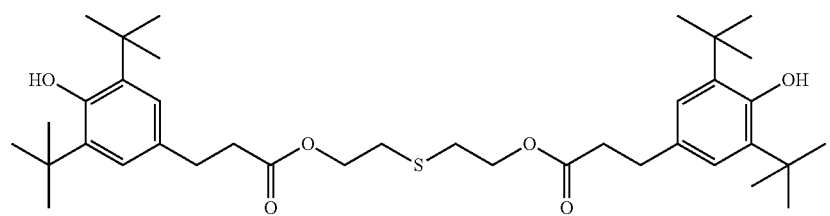 [SMILES: CC(C)(C)c1cc(CCC(=O)OCCSCCOC(=O)CCc2cc(C(C)(C)C)c(O)c(C(C)(C)C)c2)cc(C(C)(C)C)c1O]
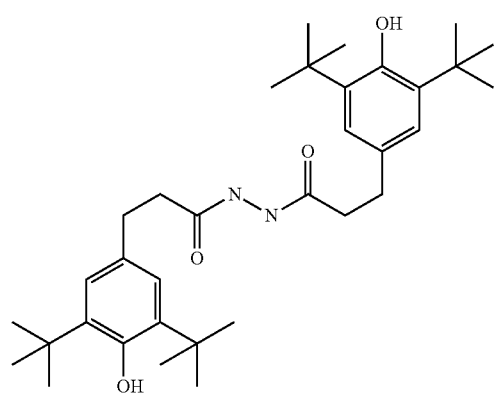 [SMILES: CC(C)(C)c1cc(CCC(=O)NNC(=O)CCc2cc(C(C)(C)C)c(O)c(C(C)(C)C)c2)cc(C(C)(C)C)c1O]
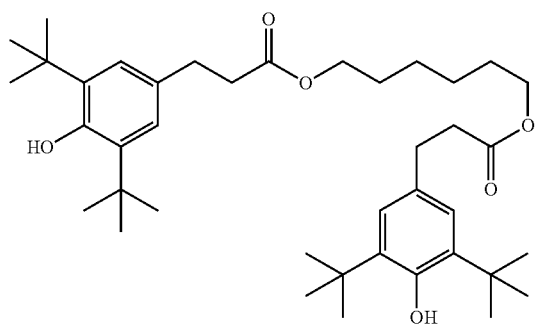 [SMILES: CC(C)(C)c1cc(CCC(=O)OCCCCCCOC(=O)CCc2cc(C(C)(C)C)c(O)c(C(C)(C)C)c2)cc(C(C)(C)C)c1O]
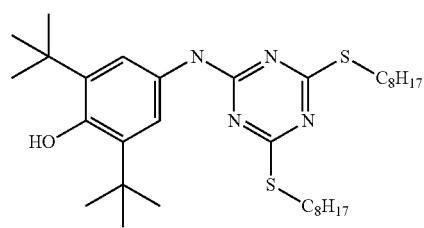

TABLE C-continued
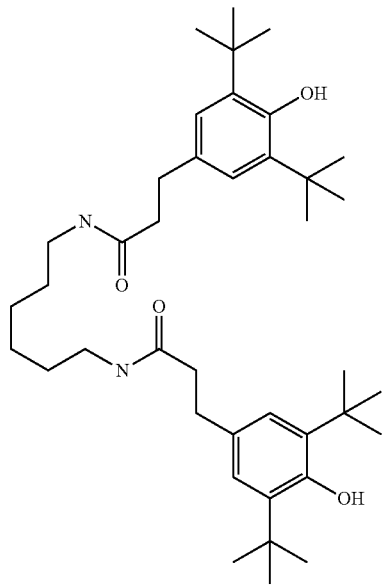 [SMILES: CC(C)(C)c1cc(CCC(=O)NCCCCCCNC(=O)CCc2cc(C(C)(C)C)c(O)c(C(C)(C)C)c2)cc(C(C)(C)C)c1O]
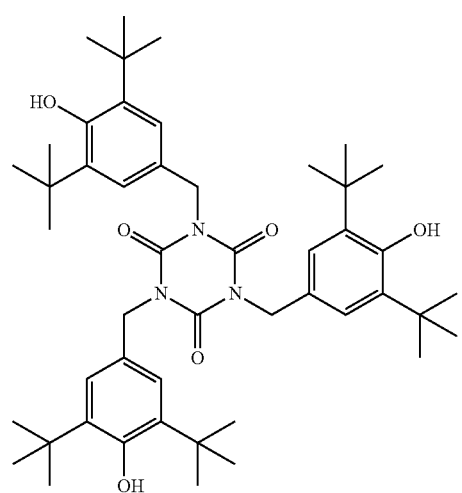 [SMILES: CC(C)(C)c1cc(Cn2c(=O)n(Cc3cc(C(C)(C)C)c(O)c(C(C)(C)C)c3)c(=O)n(Cc3cc(C(C)(C)C)c(O)c(C(C)(C)C)c3)c2=O)cc(C(C)(C)C)c1O]
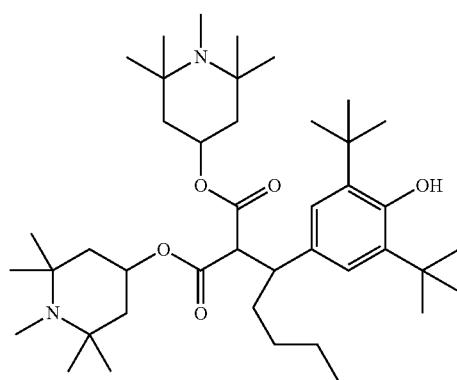 [SMILES: CCCCC(c1cc(C(C)(C)C)c(O)c(C(C)(C)C)c1)C(C(=O)OC1CC(C)(C)N(C)C(C)(C)C1)C(=O)OC1CC(C)(C)N(C)C(C)(C)C1]

TABLE C-continued
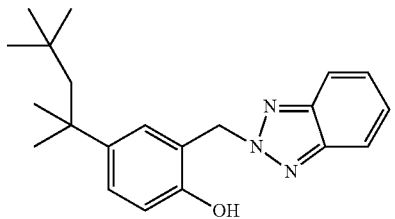 [SMILES: CC(C)(C)CC(C)(C)c1ccc(O)c(Cn2nc3ccccc3n2)c1]
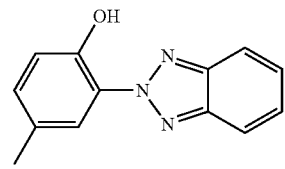 [SMILES: Cc1ccc(O)c(-n2nc3ccccc3n2)c1]
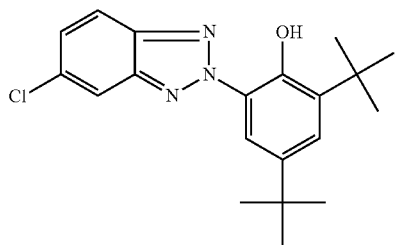 [SMILES: CC(C)(C)c1cc(-n2nc3ccc(Cl)cc3n2)c(O)c(C(C)(C)C)c1]
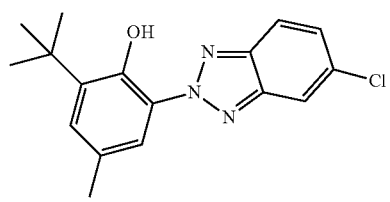 [SMILES: Cc1cc(-n2nc3ccc(Cl)cc3n2)c(O)c(C(C)(C)C)c1]
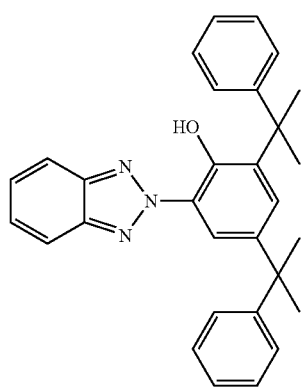 [SMILES: CC(C)(c1ccccc1)c1cc(-n2nc3ccccc3n2)c(O)c(C(C)(C)c2ccccc2)c1]
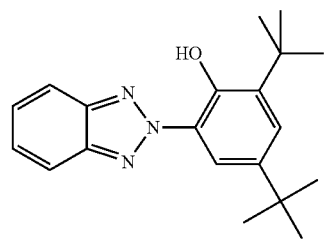 [SMILES: CC(C)(C)c1cc(-n2nc3ccccc3n2)c(O)c(C(C)(C)C)c1]

TABLE C-continued
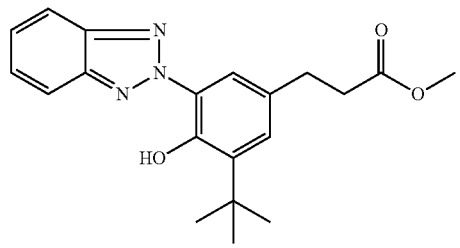 [SMILES: COC(=O)CCc1cc(-n2nc3ccccc3n2)c(O)c(C(C)(C)C)c1]
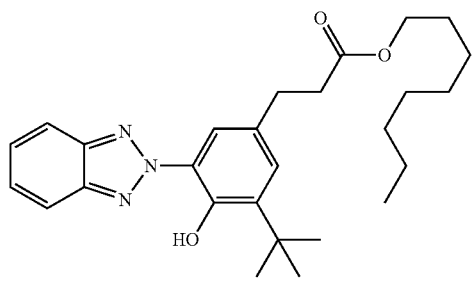 [SMILES: CCCCCCCCOC(=O)CCc1cc(-n2nc3ccccc3n2)c(O)c(C(C)(C)C)c1]
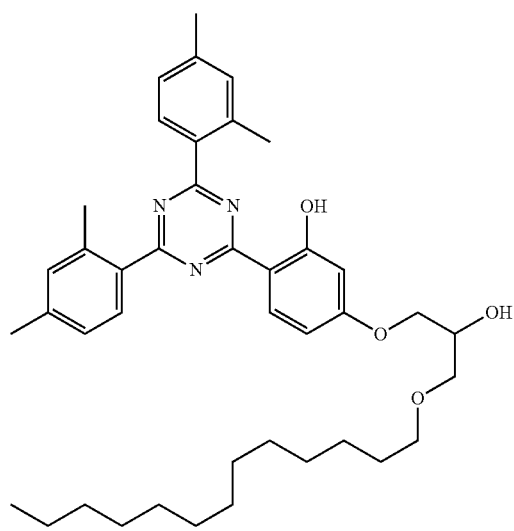 [SMILES: CCCCCCCCCCCCCOCC(O)COc1ccc(-c2nc(-c3ccc(C)cc3C)nc(-c3ccc(C)cc3C)n2)c(O)c1]
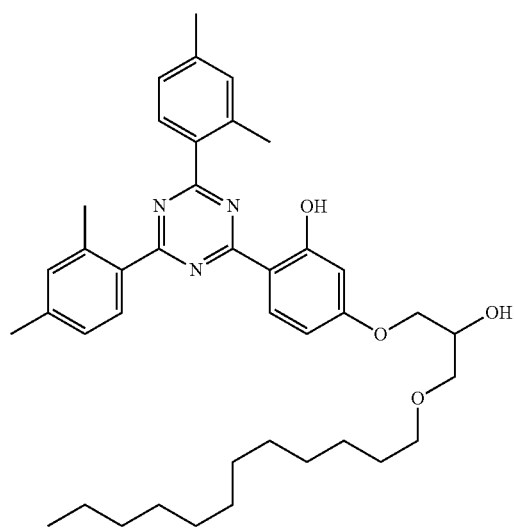 [SMILES: CCCCCCCCCCCCOCC(O)COc1ccc(-c2nc(-c3ccc(C)cc3C)nc(-c3ccc(C)cc3C)n2)c(O)c1]

TABLE C-continued
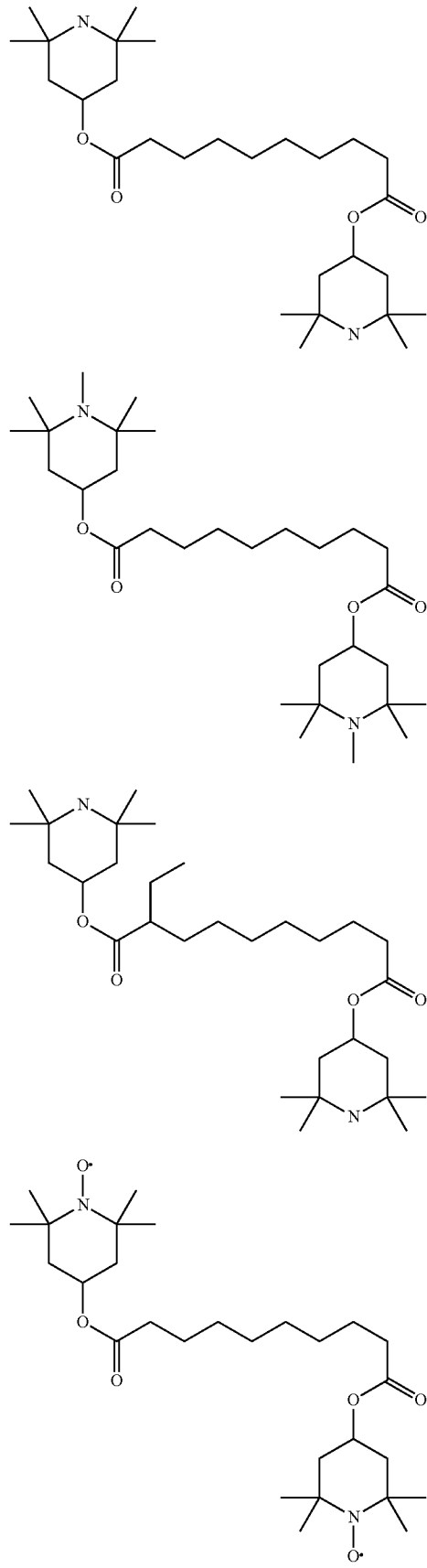

TABLE C-continued
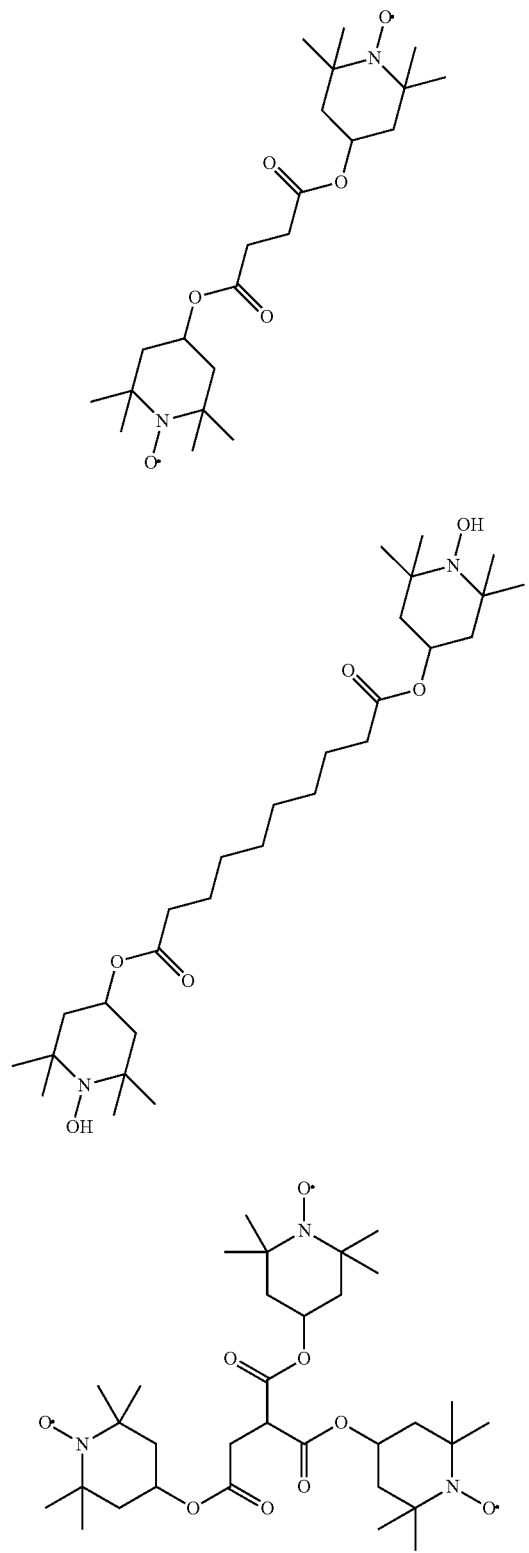

TABLE C-continued

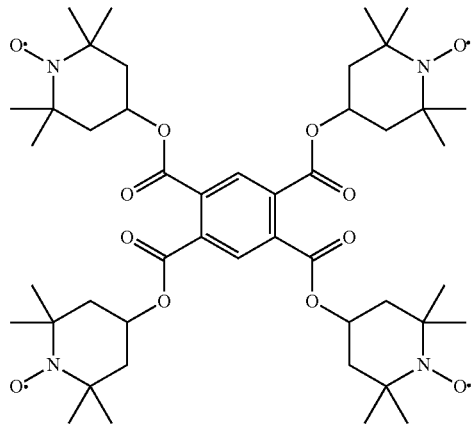

Table C shows possible stabilisers which can be added to the LC media according to the invention.

(n here denotes an integer from 1 to 12, preferably 1, 2, 3, 4, 5, 6, 7 or 8, terminal methyl groups are not shown).

The LC media preferably comprise 0 to 10% by weight, in particular 1 ppm to 5% by weight, particularly preferably 1 ppm to 1% by weight, of stabilisers. The LC media preferably comprise one or more stabilisers selected from the group consisting of compounds from Table C.

In addition, the following abbreviations and symbols are used:

$V_0$ threshold voltage, capacitive [V] at 20° C.,
$n_e$ extraordinary refractive index at 20° C. and 589 nm,
$n_o$ ordinary refractive index at 20° C. and 589 nm,
$\Delta n$ optical anisotropy at 20° C. and 589 nm,
$\varepsilon_\perp$ dielectric permittivity perpendicular to the director at 20° C. and 1 kHz,
$\varepsilon_\parallel$ dielectric permittivity parallel to the director at 20° C. and 1 kHz,
$\Delta\varepsilon$ dielectric anisotropy at 20° C. and 1 kHz,
cl.p., T(N,I) clearing point [° C.],
$\gamma_1$ rotational viscosity at 20° C. [mPa·s],
$K_1$ elastic constant, "splay" deformation at 20° C. [pN],
$K_2$ elastic constant, "twist" deformation at 20° C. [pN],
$K_3$ elastic constant, "bend" deformation at 20° C. [pN].

Unless explicitly noted otherwise, all concentrations in the present application are quoted in percent by weight and relate to the corresponding mixture as a whole, comprising all solid or liquid-crystalline components, without solvents.

Unless explicitly noted otherwise, all temperature values indicated in the present application, such as, for example, for the melting point T(C,N), the transition from the smectic (S) to the nematic (N) phase T(S,N) and the clearing point T(N,I), are quoted in degrees Celsius (° C.). M.p. denotes melting point, cl.p.=clearing point. Furthermore, C=crystalline state, N=nematic phase, S=smectic phase and I=isotropic phase. The data between these symbols represent the transition temperatures.

All physical properties are and have been determined in accordance with "Merck Liquid Crystals, Physical Properties of Liquid Crystals", Status November 1997, Merck KGaA, Germany, and apply for a temperature of 20° C., and $\Delta n$ is determined at 589 nm and $\Delta\varepsilon$ at 1 kHz, unless explicitly indicated otherwise in each case.

The term "threshold voltage" for the present invention relates to the capacitive threshold ($V_0$), also known as the Freedericks threshold, unless explicitly indicated otherwise. In the examples, the optical threshold may also, as generally usual, be quoted for 10% relative contrast ($V_{10}$).

Unless stated otherwise, the process of polymerising the polymerisable compounds in the PSA displays as described above and below is carried out at a temperature where the LC medium exhibits a liquid crystal phase, preferably a nematic phase, and most preferably is carried out at room temperature.

Unless stated otherwise, methods of preparing test cells and measuring their electrooptical and other properties are carried out by the methods as described hereinafter or in analogy thereto.

The display used for measurement of the capacitive threshold voltage consists of two plane-parallel glass outer plates at a separation of 25 μm, each of which has on the inside an electrode layer and an unrubbed polyimide alignment layer on top, which effect a homeotropic edge alignment of the liquid-crystal molecules.

The display or test cell used for measurement of the tilt angles consists of two plane-parallel glass outer plates at a separation of 4 μm, each of which has on the inside an electrode layer and a polyimide alignment layer on top, where the two polyimide layers are rubbed antiparallel to one another and effect a homeotropic edge alignment of the liquid-crystal molecules.

The polymerisable compounds are polymerised in the display or test cell by irradiation with UVA light of defined intensity for a prespecified time, with a voltage simultaneously being applied to the display (usually 10 V to 30 V alternating current, 1 kHz). In the examples, unless indicated otherwise, a metal halide lamp and an intensity of 50 mW/cm² is used for polymerisation. The intensity is measured using a standard UVA meter (Hoenle UV-meter high end with UVA sensor).

The tilt angle is determined by crystal rotation experiment (Autronic-Melchers TBA-105). A low value (i.e. a large deviation from the 90° angle) corresponds to a large tilt here.

The VHR value is measured as follows: 0.3% of a polymerisable monomeric compound is added to the LC host mixture, and the resultant mixture is introduced into VA-VHR test cells which comprise an unrubbed VA-polyimide alignment layer. The LC-layer thickness d is approx. 6 μm, unless stated otherwise. The VHR value is determined before and after UV exposure at 1 V, 60 Hz, 64 μs pulse (measuring instrument: Autronic-Melchers VHRM-105).

The amount of residual RM in the LC medium after polymerization is determined as follows: The LC medium is rinsed out of the test cell using MEK (methyl ethyl ketone) and the residual amount of unreacted RM is measured by HPLC.

Example 1

The nematic LC host mixture N1 is formulated as follows.

| | | | |
|---|---|---|---|
| CC-3-V1 | 8.00% | cl.p. | 75.5° C. |
| CCH-23 | 18.00% | Δn | 0.0978 |
| CCH-34 | 4.00% | Δε | −3.5 |
| CCH-35 | 7.00% | ε$_{\parallel}$ | 3.5 |
| CCP-3-1 | 5.00% | γ$_1$ | 111 mPa s |
| CCY-3-O2 | 12.50% | K$_{11}$ | 14.9 |
| CPY-2-O2 | 8.00% | K$_{33}$ | 15.8 |
| CPY-3-O2 | 11.00% | γ$_1$/K$_{33}$ | 7.03 |
| CY-3-O2 | 15.50% | | |
| PY-3-O2 | 11.00% | | |

Polymerisable mixtures are prepared by adding one or more of the following reactive mesogens to nematic LC host mixture N1.

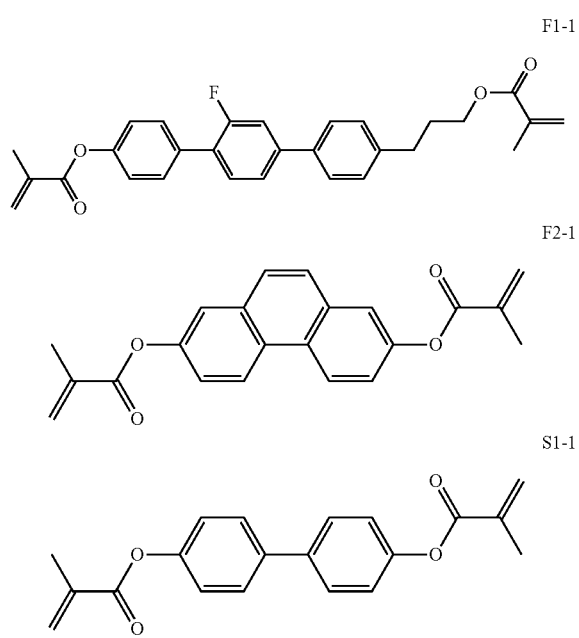

F1-1

F2-1

S1-1

The composition of the polymerisable mixtures is shown in Table 1 below.

TABLE 1

Polymerisable Mixture Composition

| Mix. No. | LC Host | 1$^{st}$ RM | 2$^{nd}$ RM |
|---|---|---|---|
| C1 | N1 99.7% | S1-1 0.3% | none |
| P1 | N1 99.7% | S1-1 0.29% | F1-1 0.01% |
| P2 | N1 99.7% | S1-1 0.29% | F2-1 0.01% |

Polymerisable mixtures P1 and P2 are mixtures according to the present invention, which contain a small amount of a first polymerisable compound F1-1 or F2-1 with faster polymerisation speed, and contain a second polymerisable compound S1-1 with slower polymerisation speed. Polymerisable mixture C1 is a comparative mixture according to prior art, which contains only the second polymerisable compound S1-1 having slower polymerisation speed.

USE EXAMPLES

For each of the polymerisable mixtures C1, P1 and P2 a PSVA-test cell is manufactured by the ODF method as follows (see also FIG. 1):

Droplets of the polymerisable LC mixture are dispensed on a first substrate of 10×10 cm in an equidistant array of 3×3 droplets of 2.35 mg with a micro plunger pump (maker: Musashi). After dispensing, the first substrate is transferred to a vacuum assembly tool. A vacuum of approximately 0.6 Pa is applied and a second substrate is provided on top of the first substrate and the LC droplets, and coupled and fixed to the first substrate by controlled pressing of the second substrate onto the first substrate under vacuum. The first and the second substrates are held together by the sealant material in the boundary region. Subsequently, the sealant is cured for 30 seconds by UV light using a long pass filter (λ>340 nm) at 100 mW/cm$^2$ measured with a UV intensity meter with the sensitivity around the central wavelength of 365 nm (Ushio UIT and detector UVD-365PD), followed by a heat treatment at 120° C. for 1 h. During the UV curing the area between sealant line is covered by metal mask to prevent UV exposure of the polymerisable LC mixture.

The first and second substrates are glass substrates which are coated, on the side facing the LC medium, with a patterned ITO electrodes and a VA-polyimide alignment layer (JALS-2347-R6). The final LC-layer thickness is approx. 3.2 μm.

After vacuum assembly, the tilt is stabilized by the UV polymerization process of the RMs in the usual way. For this purpose, each test cell is irradiated with UV light from a metal-halide lamp for 30 s emitting 1.8 mW/cm$^2$ (measured with an OCR Intensity meter with the central sensitivity at 313 nm) with application of a DC voltage of 10 V. In a second UV irradiation step, the RM concentration is reduced in 2 h to a non-detectable level using a Harison-Toshiba lamp of type C emitting 0.28 mW/cm$^2$ (measured with an OCR Intensity meter with the central sensitivity at 313 nm).

The mura level is determined from a line scan of the light transmission of the test cell over the LC drop and non-drop area mounted in an LCD Evaluation System (Otsuka LCD-5200). The test cell is driven by square-wave signal at 60 Hz with an amplitude corresponding to gray level 32 on computer display systems. The mura level is defined as the ratio of the difference of the transmission between at the drop area and the area between the drops according to equation 1:

$$\text{Mura Level}(\%) \frac{T(\text{drop area}) - T(\text{non-drop area})}{T(\text{non-drop area})} \times 100\%$$

The ODF mura level for the three mixtures is shown in Table 2.

TABLE 2

| | ODF Mura Level | | |
|---|---|---|---|
| | C1 | P1 | P2 |
| ODF mura level (%) | 118.3 | 75.9 | 52.5 |

From Table 2 it can be seen that for the test cells manufactured from polymerisable mixtures P1 and P2 according to the present invention the ODF mura level could be significantly reduced compared to the test cells manufactured from polymerisable mixture C1 according to prior art.

The invention claimed is:

1. A method of reducing the One Drop Filling (ODF) mura in a liquid crystal display (LCD) of the polymer stabilised alignment (PSA) mode, comprising providing or using in the PSA display an LC medium, comprising
   a polymerisable component A) comprising 0.005 to 0.02% of a first polymerisable compound and 0.2 to 0.3% of a second polymerisable compound, wherein the first polymerisable compound has faster polymerisation speed than the second polymerisable compound, the first polymerisable compound is one or more compounds of formulae F1-F6, and the second polymerisable compound is one or more compounds of formulae S1-S3, and
   a liquid-crystalline component B), comprising one or more mesogenic or liquid-crystalline compounds

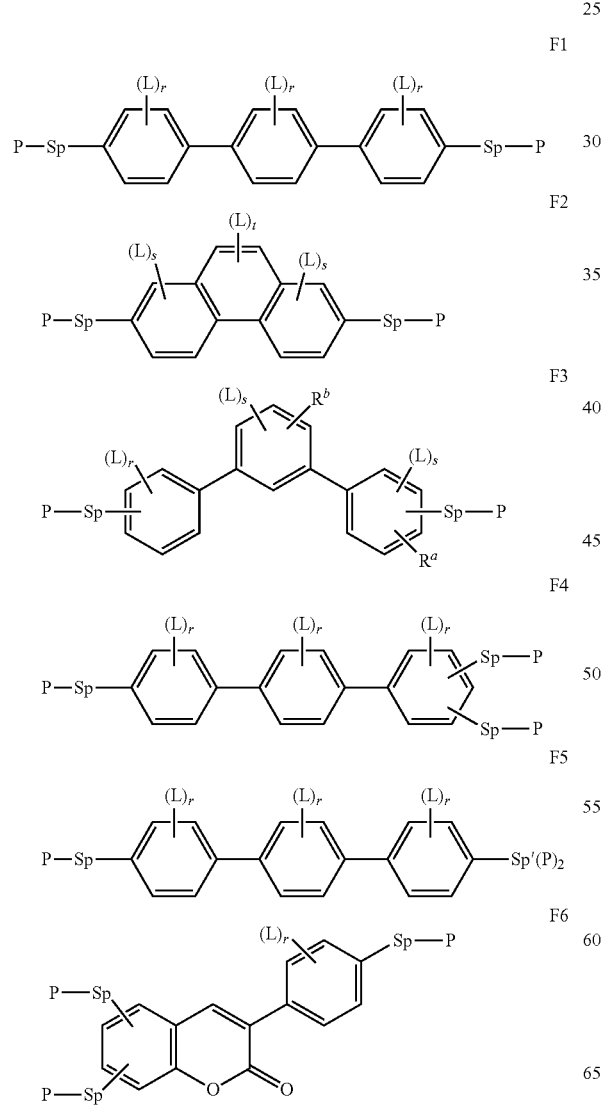

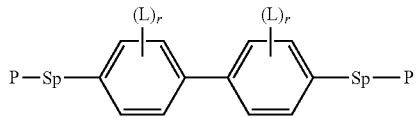

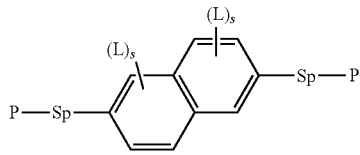

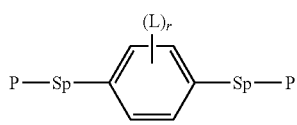

in which

P each, independently, is a polymerisable group,

Sp each, independently, is a spacer group or a single bond,

Sp' is a spacer group,

L each, independently, is F, Cl, CN or straight-chain or branched, optionally mono- or polyfluorinated alkyl, alkoxy, alkenyl, alkynyl, alkylcarbonyl, alkoxycarbonyl, alkylcarbonyloxy or alkoxycarbonyloxy having 1 to 12 C atoms, $R^a$, $R^b$ each, independently, is -Sp-P, -Sp'(P)$_2$, H or one of the meanings given for L, r is 0, 1, 2, 3 or 4, s is 0, 1, 2 or 3, and t is 0, 1 or 2.

2. The method of claim 1, wherein in the one or more compounds of formulae F1-F6 and S1-S3 the group P denotes CH$_2$=CW$^1$—CO—O—, wherein W$^1$ is H, F, CF$_3$ or alkyl having 1 to 5 C atoms.

3. The method of claim 1, wherein the one or more compounds of formulae F1-F6 are selected from compounds of the following formulae

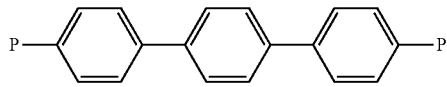

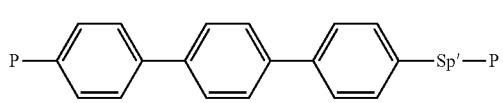

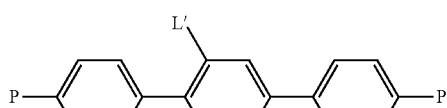

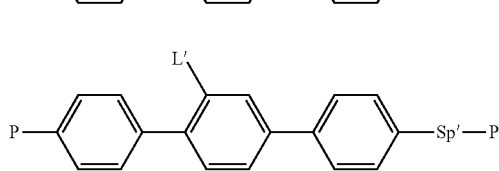

-continued
F1e
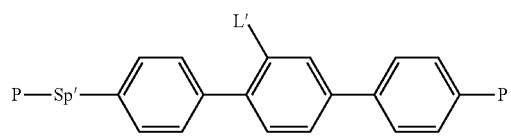
F1f
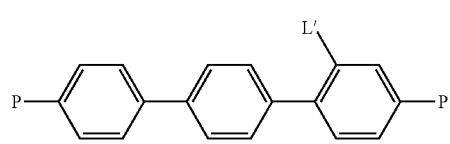
F1g
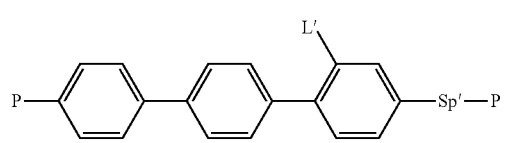
F1h
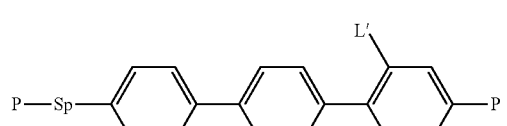
F1i
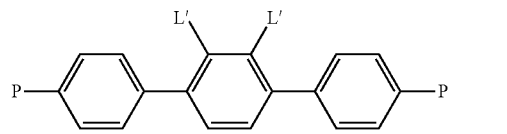
F1k
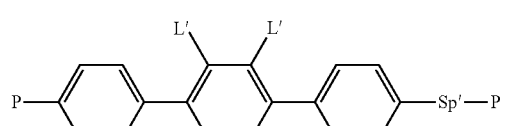
F2a
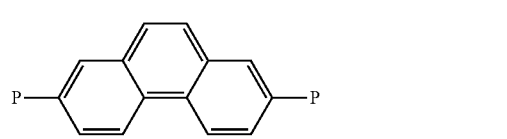
F2b
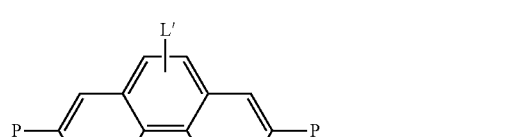
F2c
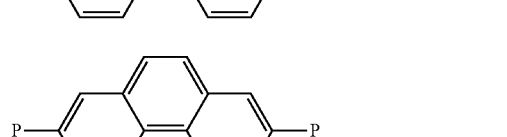
F2d
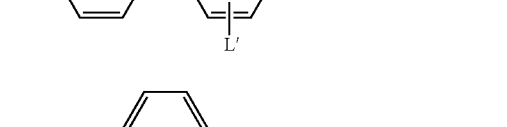
F2e
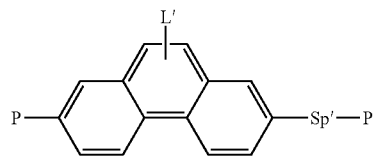
F2f
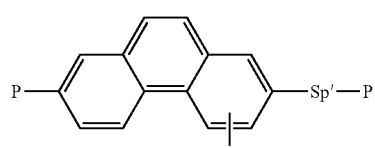
F2g
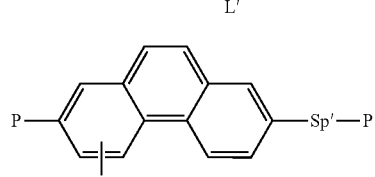
F2h
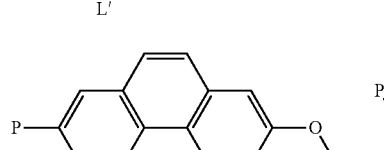
F2i
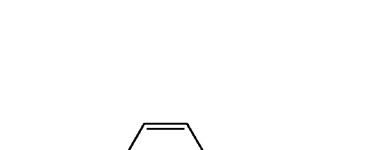
F3a
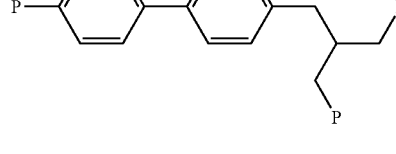
F3b
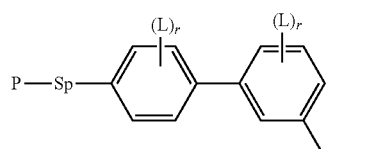

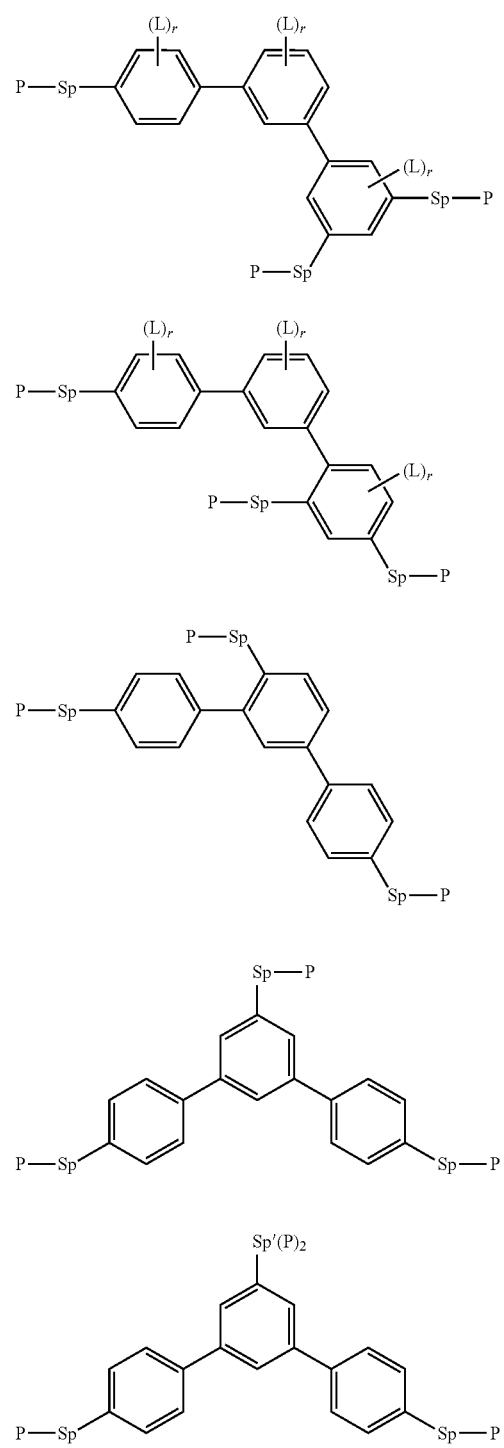
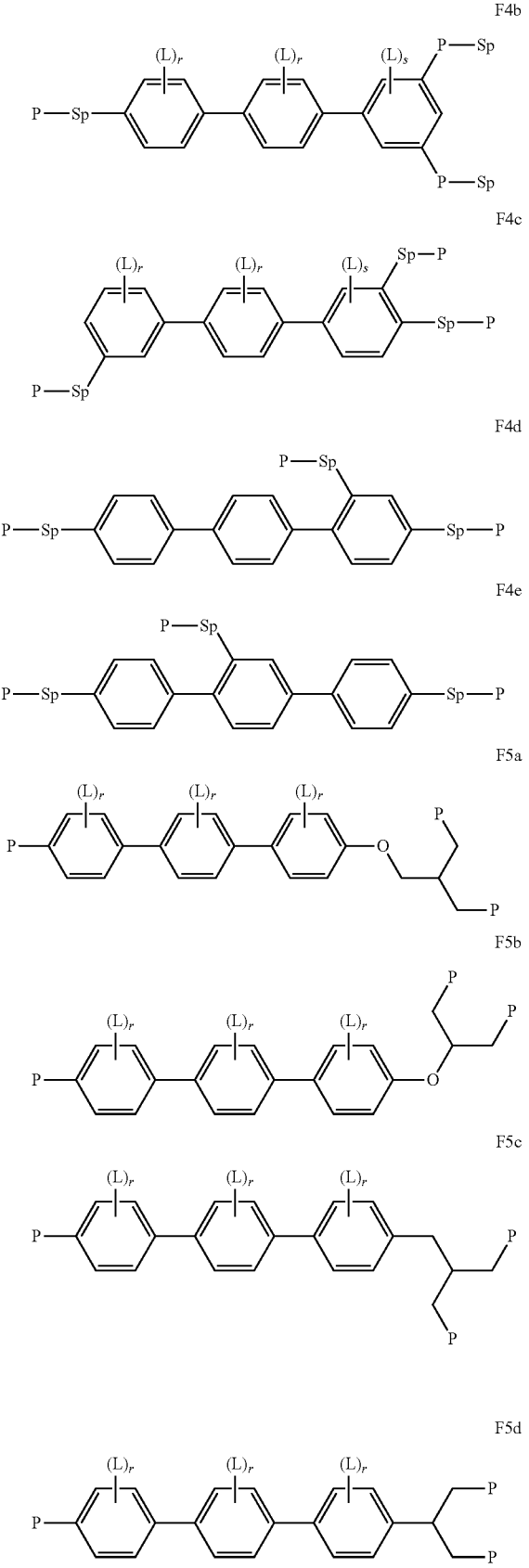

-continued

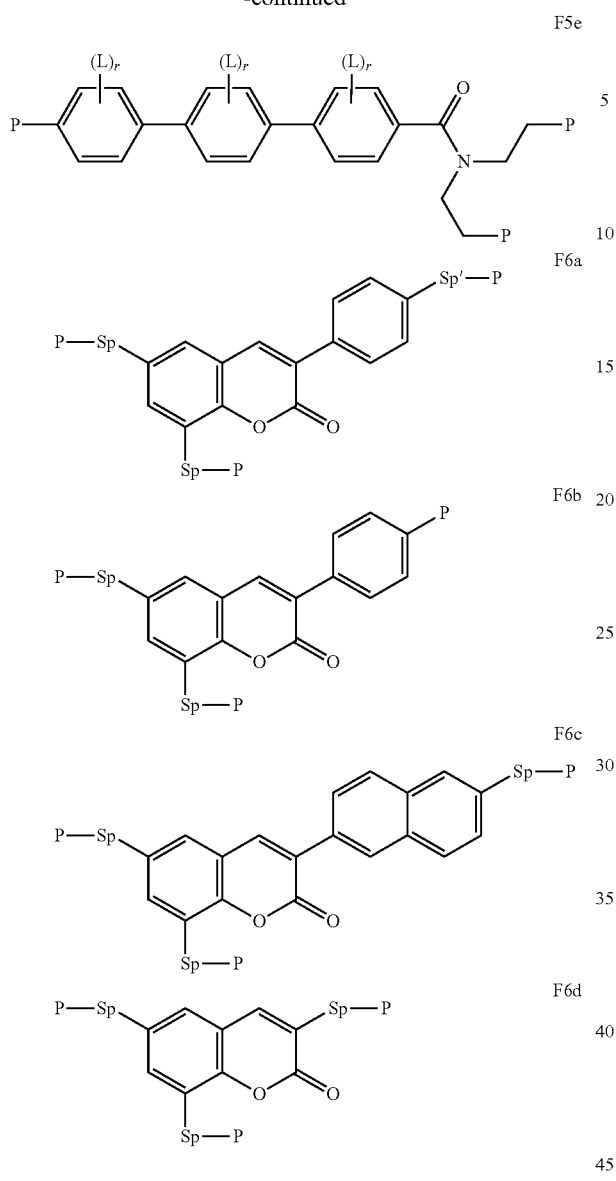

wherein
P each, independently, is a polymerisable group,
Sp each, independently, is a spacer group or a single bond,
Sp' is a spacer group,
L, L' each, independently, is F, Cl, CN or straight-chain or branched, optionally mono- or polyfluorinated alkyl, alkoxy, alkenyl, alkynyl, alkylcarbonyl, alkoxycarbonyl, alkylcarbonyloxy or alkoxycarbonyloxy having 1 to 12 C atoms,
r is 0, 1, 2, 3 or 4,
s is 0, 1, 2 or 3, and
t is 0, 1 or 2.

4. The method according to claim 1, wherein the one or more compounds of formulae S1-S3 are selected from compounds of the following formulae

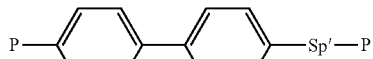
S1a

-continued

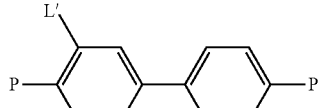
S1b

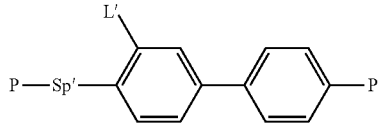
S1c

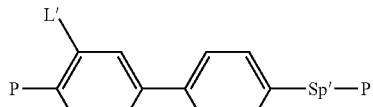
S1d

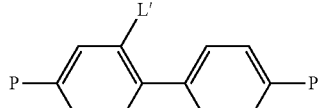
S1e

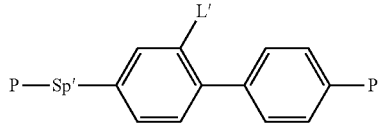
S1f

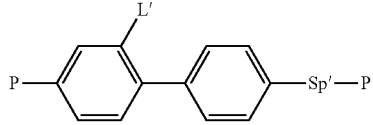
S1g

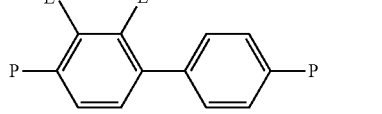
S1h

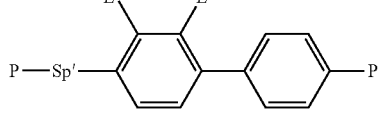
S1i

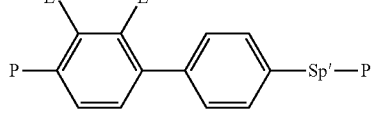
S1k

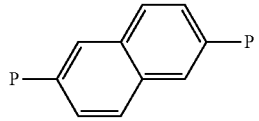
S1l

S2a

-continued

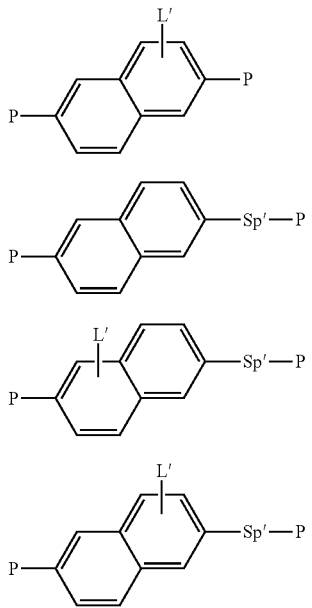

wherein
P each, independently, is a polymerisable group,
Sp' is a spacer group,
L' is F, Cl, CN or straight-chain or branched, optionally mono- or poly-fluorinated alkyl, alkoxy, alkenyl, alkynyl, alkylcarbonyl, alkoxycarbonyl, alkylcarbonyloxy or alkoxycarbonyloxy having 1 to 12 C atoms.

5. The method according to claim 1, wherein in the one or more compounds of formulae F1-F6 and S1-S3 the group Sp', and those groups Sp that are not a single bond, each independently, denote —(CH$_2$)$_{p1}$—, —(CH$_2$)$_{p1}$—O—, —(CH$_2$)$_{p1}$—O—CO—, —(CH$_2$)$_{p1}$—CO—O—, or —(CH$_2$)$_{p1}$—O—CO—O—, in which p1 denotes an integer from 1 to 6, and wherein these groups Sp' and Sp that are not a single bond are linked to the polymerisable group P such that two O-atoms are not directly adjacent to each other.

6. The method according to claim 1, wherein in the one or more compounds of formula F1-F6 and S1-S3 the group L' denotes F.

7. The method according to claim 1, wherein the LC method comprises 0.3% of the second polymerisable compound.

8. The method according to claim 1, wherein component B) comprises one or more compounds of formulae AN and/or AY:

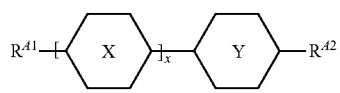

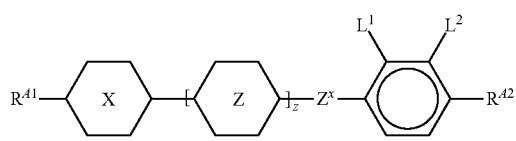

in which

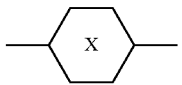

each, independently, is

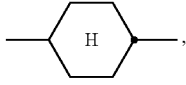

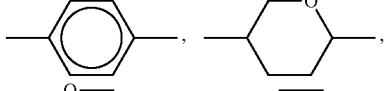

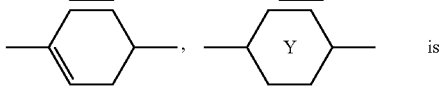

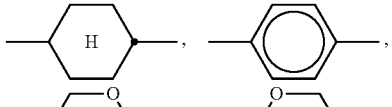

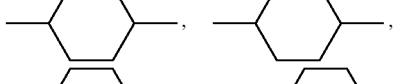

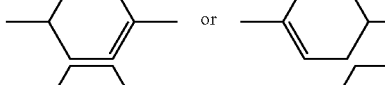

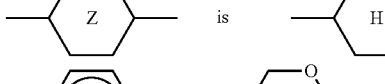

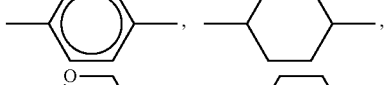

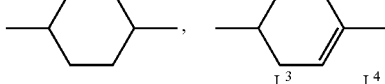

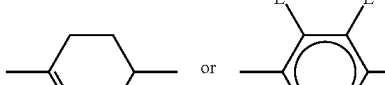

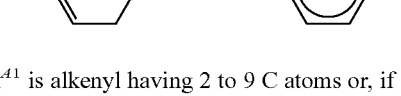

$R^{A1}$ is alkenyl having 2 to 9 C atoms or, if at least one of the rings X, Y and Z denotes cyclohexenyl, also one of the meanings of $R^{A2}$,
$R^{A2}$ is alkyl having 1 to 12 C atoms, in which one or two non-adjacent CH$_2$ groups may be replaced by —O—, —CH=CH—, —CO—, —OCO— or —COO— in such a way that O atoms are not linked directly to one another,
$Z^x$ is —CH$_2$CH$_2$—, —CH=CH—, —CF$_2$O—, —OCF$_2$—, —CH$_2$O—, —OCH$_2$—, —CO—O—, —O—CO—, —C$_2$F$_4$—, —CF=CF—, —CH=CH—CH$_2$O—, or a single bond,
$L^{1-4}$ each, independently, is H, F, Cl, OCF$_3$, CF$_3$, CH$_3$, CH$_2$F or CHF$_2$H,
x 1 or 2, and
z 0 or 1.

9. The method according to claim 1, wherein component B) comprises one or more compounds of formulae CY and/or PY:

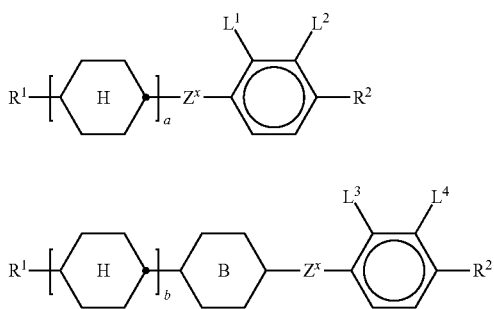
CY

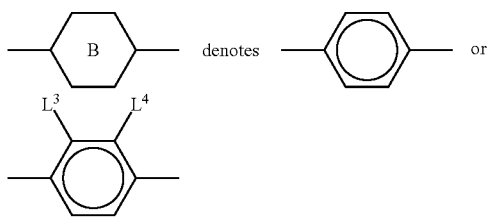
PY in which
a denotes 1 or 2,
b denotes 0 or 1,

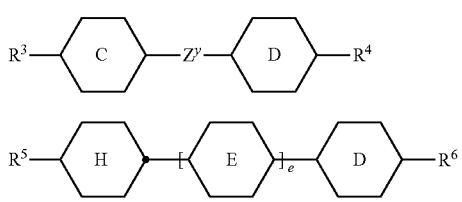

$R^1$ and $R^2$ each, independently of one another, denote alkyl having 1 to 12 C atoms, in which one or two non-adjacent $CH_2$ groups may be replaced by —O—, —CH=CH—, —CO—, —O—CO— or —CO—O— in such a way that O atoms are not linked directly to one another, $Z^x$ denotes —CH=CH—, —$CH_2O$—, —$OCH_2$—, —$CF_2O$—, —$OCF_2$—, —O—, —$CH_2$—, —$CH_2CH_2$— or a single bond, $L^{1-4}$ each, independently of one another, denote F, Cl, $OCF_3$, $CF_3$, $CH_3$, $CH_2F$, or $CHF_2$.

10. The method according to claim 1, wherein component B) comprises one or more compounds of formulae ZK and/or DK:

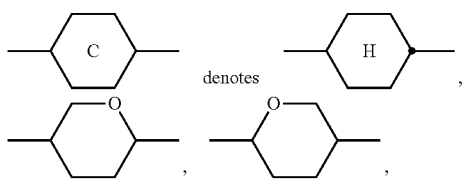

ZK

DK in which

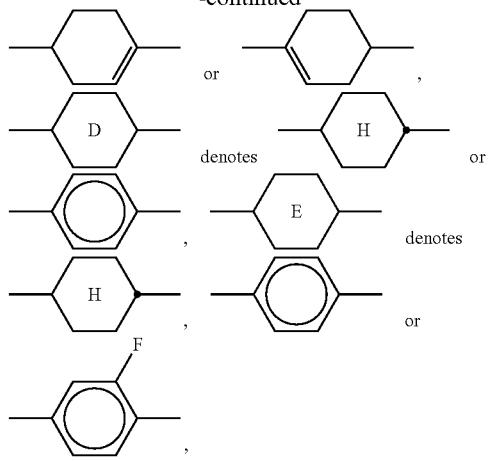

each, independently, denotes

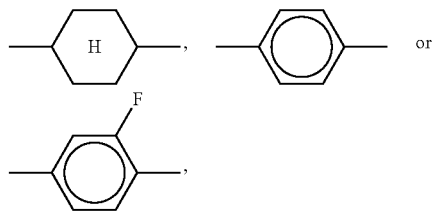

and $R^3$ and $R^4$ each, independently of one another, denote alkyl having 1 to 12 C atoms, in which one or two non-adjacent $CH_2$ groups may be replaced by —O—, —CH=CH—, —CO—, —O—CO— or —CO—O— in such a way that O atoms are not linked directly to one another, $Z^y$ denotes —$CH_2CH_2$—, —CH=CH—, —$CF_2O$—, —$OCF_2$—, —$CH_2O$—, —$OCH_2$—, —COO—, —OCO—, —$C_2F_4$—, —CF=CF— or a single bond, $R^5$ and $R^6$ each, independently of one another, denote alkyl having 1 to 12 C atoms, in which one or two non-adjacent $CH_2$ groups may be replaced by —O—, —CH=CH—, —CO—, —OCO— or —COO— in such a way that O atoms are not linked directly to one another, and e denotes 1 or 2.

11. The method according to claim 1, wherein the polymerisable compounds of component A) are polymerised.

12. A method of manufacturing an LCD of the PSA mode, comprising
a) dispensing an array of droplets (2) of an LC medium comprising components A) and B) on a first substrate (1),
wherein component A) is polymerisable and comprises 0.005 to 0.02% of a first polymerisable compound and 0.2 to 0.3% of a second polymerisable compound, wherein the first polymerisable compound has faster polymerisation speed than the second polymerisable compound, the first polymerisable compound is one or more compounds of formulae $F_1$-$F_6$, and the second polymerisable compound is one or more compounds of formulae S1-S3, and component B) is liquid-crystalline and comprises one or more mesogenic or liquid-crystalline compounds

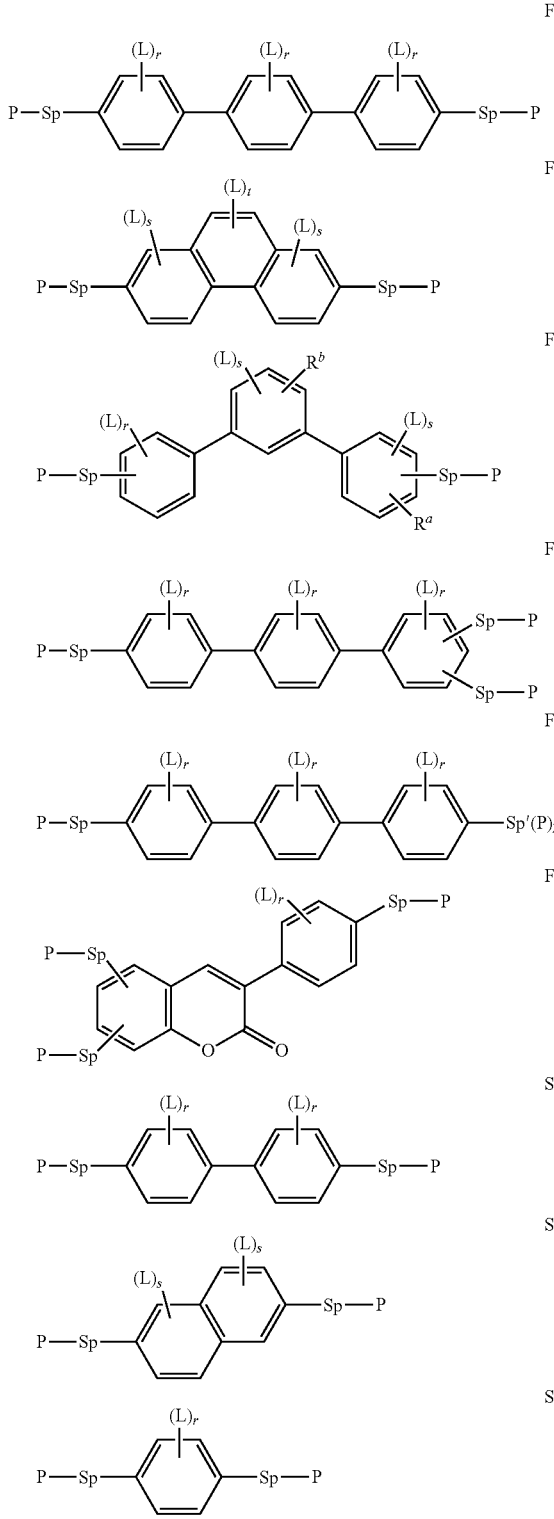

in which
P each, independently, is a polymerisable group,
Sp each, independently, is a spacer group or a single bond,
Sp' is a spacer group, L each, independently, is F, Cl, CN or straight-chain or branched, optionally mono- or polyfluorinated alkyl, alkoxy, alkenyl, alkynyl, alkylcarbonyl, alkoxycarbonyl, alkylcarbonyloxy or alkoxycarbonyloxy having 1 to 12 C atoms, $R^a$, $R^b$ each, independently, is -Sp-P, -Sp'(P)$_2$, H or one of the meanings given for L, r is 0, 1, 2, 3 or 4, s is 0, 1, 2 or 3, and t is 0, 1 or 2;

b) providing a second substrate (4) on top of the surface of the first substrate (1) that is covered by the LC medium, optionally under vacuum condition, causing the droplets (2) of the LC medium to spread and form a continuous layer between the first substrate (1) and the second substrate (4), and c) exposing the LC medium to UV radiation that causes photopolymerisation of the polymerisable compounds of component A).

13. The method according to claim 12, wherein the first and second substrates (1,4) are glass substrates.

14. The method according to claim 12, wherein the first substrate (1) is equipped with a first electrode structure and the second substrate (4) is equipped with a second electrode structure.

15. The method according to claim 12, wherein one of the two substrates (1, 4) is equipped with a first and a second electrode structure, and the other of the two substrates (1, 4) is not equipped with an electrode structure.

16. The method according to claim 12, wherein the first substrate (1) and the second substrate (4) are each equipped with an alignment layer that is in contact with the LC medium (2).

17. The method according to claim 12, wherein a sealant material (3) is provided between the first substrate (1) and the second substrate (4), and the first substrate (1) and second substrate (4) are glued together by curing the sealant material (3).

18. The method according to claim 17, wherein the sealant material (3) is cured by exposure to photoradiation, wherein the photoradiation is such that it does not cause polymerisation of the polymerisable component A) of the LC medium, and/or the LC medium is protected from the photoradiation for curing the sealant material (3).

19. The method according to claim 18, wherein the LC medium is protected from the photoradiation for curing the sealant material (3) by a photomask.

20. The method according to claim 12, wherein in step c) a voltage is applied to the first and second electrode.

21. An LC display prepared by a method according to claim 12.

22. The LC display of claim 21, which is a PS-VA, PS-OCB, PS-IPS, PS-FFS, PS-UB-FFS, PS-posi-VA or PS-TN display.

23. An LC medium comprising components A) and B), wherein
component A) is polymerizable and comprises 0.005 to 0.02% of a first polymerisable compound and 0.2 to 0.3% of a second polymerisable compound, wherein the first polymerisable compound has faster polymerisation speed than the second polymerisable compound, the first polymerisable compound is one or more compounds of formulae F1-F6, and the second polymerisable compound is one or more compounds of formulae S1-S3, and
component B) is a liquid-crystalline and comprises one or more mesogenic or liquid-crystalline compounds

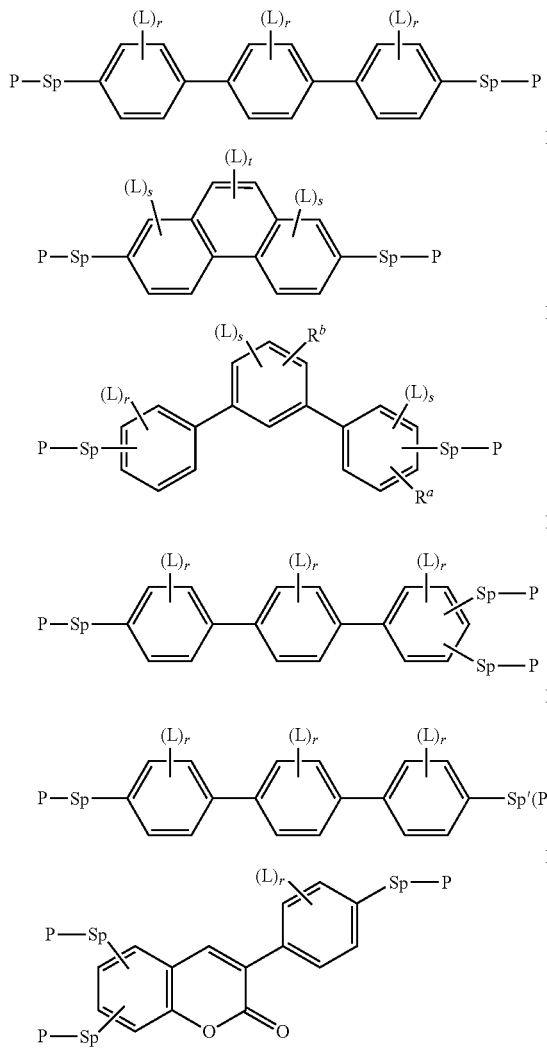

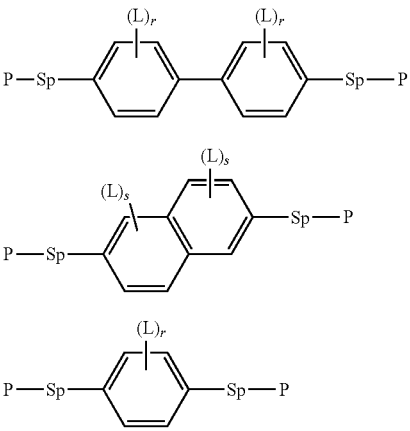

in which
P each, independently, is a polymerisable group,
Sp each, independently, is a spacer group or a single bond,
Sp' is a spacer group,
L each, independently, is F, Cl, CN or straight-chain or branched, optionally mono- or polyfluorinated alkyl, alkoxy, alkenyl, alkynyl, alkylcarbonyl, alkoxycarbonyl, alkylcarbonyloxy or alkoxycarbonyloxy having 1 to 12 C atoms,
$R^a$, $R^b$ each, independently, is -Sp-P, -Sp'(P)$_2$, H or one of the meanings given for L,
r is 0, 1, 2, 3 or 4,
s is 0, 1, 2 or 3, and
t is 0, 1 or 2.

24. A process of preparing an LC medium comprising components A) and B) according to claim 23, comprising mixing component B) with the one or more first and second polymerisable compounds or with polymerisable component A), and optionally with further LC compounds and/or additives.

25. The method of claim 1, wherein component A) comprises either one or more compounds of formulae F2-F6 and/or one or more compounds of formulae S2-S3.

* * * * *